United States Patent
Nakahara et al.

(10) Patent No.: US 11,514,628 B2
(45) Date of Patent: Nov. 29, 2022

(54) DISPLAY APPARATUS, SYSTEM, AND SCREEN GENERATION METHOD FOR DISPLAYING BINARY DIGITAL LOG DATA TO FACILITATE ANOMALY DETECTION

(71) Applicant: Mitsubishi Electric Corporation, Tokyo (JP)

(72) Inventors: Daiki Nakahara, Tokyo (JP); Satoshi Mii, Tokyo (JP); Hirohiko Higuchi, Tokyo (JP); So Satoh, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 254 days.

(21) Appl. No.: 16/997,531

(22) Filed: Aug. 19, 2020

(65) Prior Publication Data

US 2020/0380743 A1 Dec. 3, 2020

Related U.S. Application Data

(63) Continuation of application No. PCT/JP2018/010940, filed on Mar. 20, 2018.

(51) Int. Cl.
*G06N 20/00* (2019.01)
*G06T 11/20* (2006.01)
(Continued)

(52) U.S. Cl.
CPC .............. *G06T 11/206* (2013.01); *G06F 3/14* (2013.01); *G06N 20/00* (2019.01);
(Continued)

(58) Field of Classification Search
CPC ... G06T 11/206; G06T 2210/62; G06N 20/00; G06F 3/14; G06F 3/04817; G06F 2203/04804
See application file for complete search history.

(56) References Cited

U.S. PATENT DOCUMENTS

| 11,301,773 B2* | 4/2022 | Lei .......................... G06N 20/00 |
| 2013/0132000 A1* | 5/2013 | Tamaki .............. G05B 23/0281 702/35 |

(Continued)

FOREIGN PATENT DOCUMENTS

| JP | 9-22308 A | 1/1997 |
| JP | 2005-115426 A | 4/2005 |

(Continued)

OTHER PUBLICATIONS

Indian Office Action dated Nov. 25, 2021 issued in corresponding Indian Application No. 202047037790, pp. 2-4.

(Continued)

*Primary Examiner* — Hua Lu
(74) *Attorney, Agent, or Firm* — Birch, Stewart, Kolasch & Birch, LLP

(57) ABSTRACT

A display apparatus that displays log data which indicates when the log data deviates from a normal state and a deviation degree is provided. The display apparatus comprises: a memory to store prediction data including a signal value of a prediction value of the log data and accuracy degree of the prediction value, and a signal value of an actual measurement value of the log data; a control unit to generate a display screen on which a prediction value area indicating an area of the log data in normal state is depicted based on the prediction data and on which a signal wavelength of the signal value of the actual measurement value is depicted based on the signal value of the actual measurement value; and a display unit to display the display screen.

12 Claims, 30 Drawing Sheets

(51) Int. Cl.
*G06F 3/14* (2006.01)
*G06F 3/04817* (2022.01)

(52) U.S. Cl.
CPC .............. *G06F 3/04817* (2013.01); *G06F 2203/04804* (2013.01); *G06T 2210/62* (2013.01)

(56) References Cited

U.S. PATENT DOCUMENTS

| | | | | |
|---|---|---|---|---|
| 2014/0280193 | A1* | 9/2014 | Cronin | G06N 20/00 |
| | | | | 707/741 |
| 2014/0325425 | A1* | 10/2014 | Milam | G06F 3/0482 |
| | | | | 715/777 |
| 2015/0141043 | A1* | 5/2015 | Abramson | G01C 21/34 |
| | | | | 455/456.1 |
| 2015/0277416 | A1* | 10/2015 | Nikovski | G05B 23/0232 |
| | | | | 700/110 |
| 2016/0026253 | A1* | 1/2016 | Bradski | H04N 13/128 |
| | | | | 345/8 |
| 2018/0293377 | A1* | 10/2018 | Tomonaga | G06F 21/6218 |
| 2018/0357334 | A1* | 12/2018 | Chao | G05B 19/4185 |
| 2019/0043184 | A1* | 2/2019 | Bovik | G06T 5/002 |
| 2019/0258223 | A1* | 8/2019 | Oota | G05B 19/406 |
| 2020/0094737 | A1* | 3/2020 | Furukawa | B60W 30/09 |

FOREIGN PATENT DOCUMENTS

| | | | | |
|---|---|---|---|---|
| JP | 2005-128721 A | | 5/2005 | |
| JP | 2007-102388 A | | 4/2007 | |
| JP | 2010-272043 A | | 12/2010 | |
| JP | 2011-243118 A | | 12/2011 | |
| JP | 2012-128583 A | | 7/2012 | |
| JP | 2013025367 A | * | 2/2013 | ........... G05B 23/024 |
| JP | 2015-103218 A | | 6/2015 | |
| WO | WO 2015/011807 A1 | | 1/2015 | |
| WO | WO 2016/143072 A1 | | 9/2016 | |

OTHER PUBLICATIONS

International Search Report issued in PCT/JP2018/010940 (PCT/ISA/210), dated Jun. 12, 2018, pp. 1-2.
Notice of Examination Opinion, Taiwanese Office Action issued in the corresponding TW application No. 107116581, dated Jun. 17, 2020, pp. 1-9.

\* cited by examiner

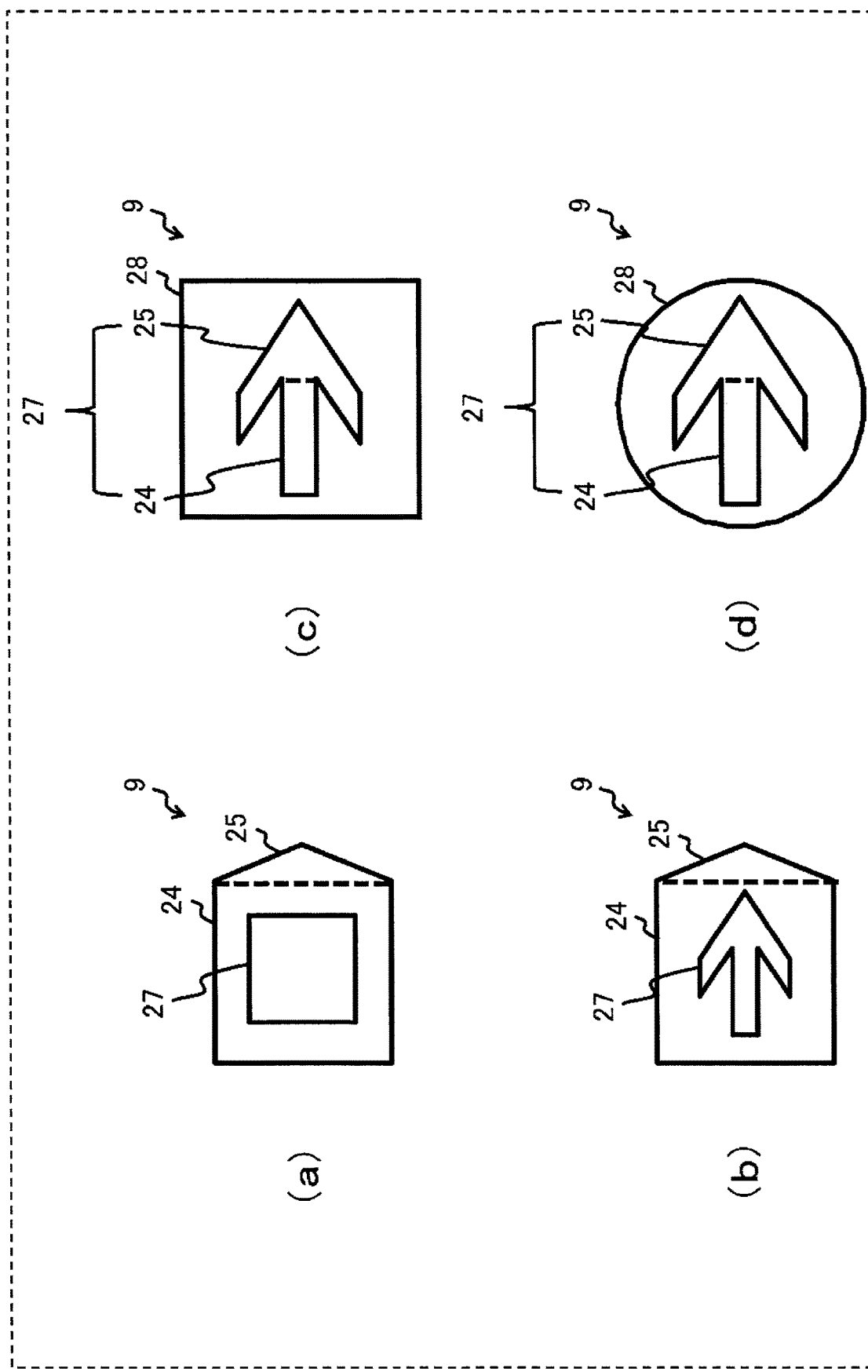

DISPLAY APPARATUS, SYSTEM, AND SCREEN GENERATION METHOD FOR DISPLAYING BINARY DIGITAL LOG DATA TO FACILITATE ANOMALY DETECTION

CROSS REFERENCE TO RELATED APPLICATIONS

This application is a Continuation of PCT International Application No. PCT/JP2018/010940, filed on Mar. 20, 2018, which is hereby expressly incorporated by reference into the present application.

TECHNICAL FIELD

The present invention relates to a display apparatus for displaying log data, which is a binary digital signal composed of input data to a driving apparatus such as an actuator incorporated in a processing apparatus in a factory or output data from an output apparatus such as a sensor.

BACKGROUND ART

In recent years, in a situation where a plurality of apparatuses are operating, such as a production site in a factory, there is an increasing demand for anomaly detection for early detection of apparatus anomalies. As a method for achieving this, there is a display method that facilitates detection of the anomaly by a user who uses the apparatus, by displaying log data acquired from the apparatus while separating the log data in a normal state from the log data in an anomalous state.

As such a display method, Patent Literature 1 suggests a display method that displays a display screen depicting steady state sensor data which is a normal state, and anomalous state sensor data which is an anomalous state, simultaneously in one time-series graph. Thereby, the display method of Patent Literature 1 displays that the anomalous state sensor data deviates from distribution of the steady state sensor data, displays deviation degree indicating how much the anomalous state sensor data deviates from the steady state sensor data, and displays a change timing to the anomalous state from the steady state.

CITATION LIST

Patent Literature

Patent Literature 1: JP 2011-243118 A (FIGS. 9 and 10)

SUMMARY OF INVENTION

Technical Problem

Patent Literature 1 targets the sensor data which is a multivalued analog signal including values other than 0 and 1. Therefore, by depicting the acquired sensor data in one time-series graph, when the sensor data is in the anomalous state, it is possible to display that the sensor data deviates from the distribution of the normal state sensor data, display the deviation degree, and display the timing of the change to the anomalous state.

However, in a production site in a general factory and the like, as data displayed by the display apparatus, there is a binary digital signal value which is a value consisting of only 0 and 1, such as ON/OFF related signals input to an actuator incorporated in a processing apparatus or output from a sensor. For the log data which is the binary digital signal, according to the display method of depicting the acquired log data in one time-series graph like the display apparatus of Patent Literature 1, it is possible to display the change timing to the anomalous state from the normal state. However, there is a problem that since only the values of 0 and 1 are depicted, it is difficult to display that the log data deviates from the normal state and display its deviation degree, when the log data is in the anomalous state.

The present invention has been conceived to solve the above-described problems. The present invention aims to realize a display apparatus which displays a display screen targeting log data of a device which is a binary digital signal and is capable of displaying that the log data deviates from a normal state and displaying its degree of deviation, when the log data is in an anomalous state.

Solution to Problem

In order to solve the above-mentioned problem and realize the object, a display apparatus of the present invention is a display apparatus displaying log data having at least one of input data to a device or output data from the device, the log data being a binary digital signal, the display apparatus includes:

a memory to store prediction data including a signal value of a prediction value of the log data and accuracy degree of the prediction value, and a signal value of an actual measurement value of the log data;

a control unit to generate a display screen on which a prediction value area indicating an area of the log data in normal state is depicted based on the prediction data and on which a signal wavelength of the signal value of the actual measurement value is depicted based on the signal value of the actual measurement value; and a display unit to display the display screen.

Advantageous Effects of Invention

According to the display apparatus of the present invention, since the above-described configuration is provided, in the display apparatus which displays a display screen targeting log data that is a binary digital signal, it is possible to display that the log data deviates from normal state and display its deviation degree, when the log data is in an anomalous state.

BRIEF DESCRIPTION OF DRAWINGS

FIG. 30 is an explanatory diagram illustrating an example of an anomaly icon according to a fifth embodiment of the present invention.

DESCRIPTION OF EMBODIMENTS

Figure 1:
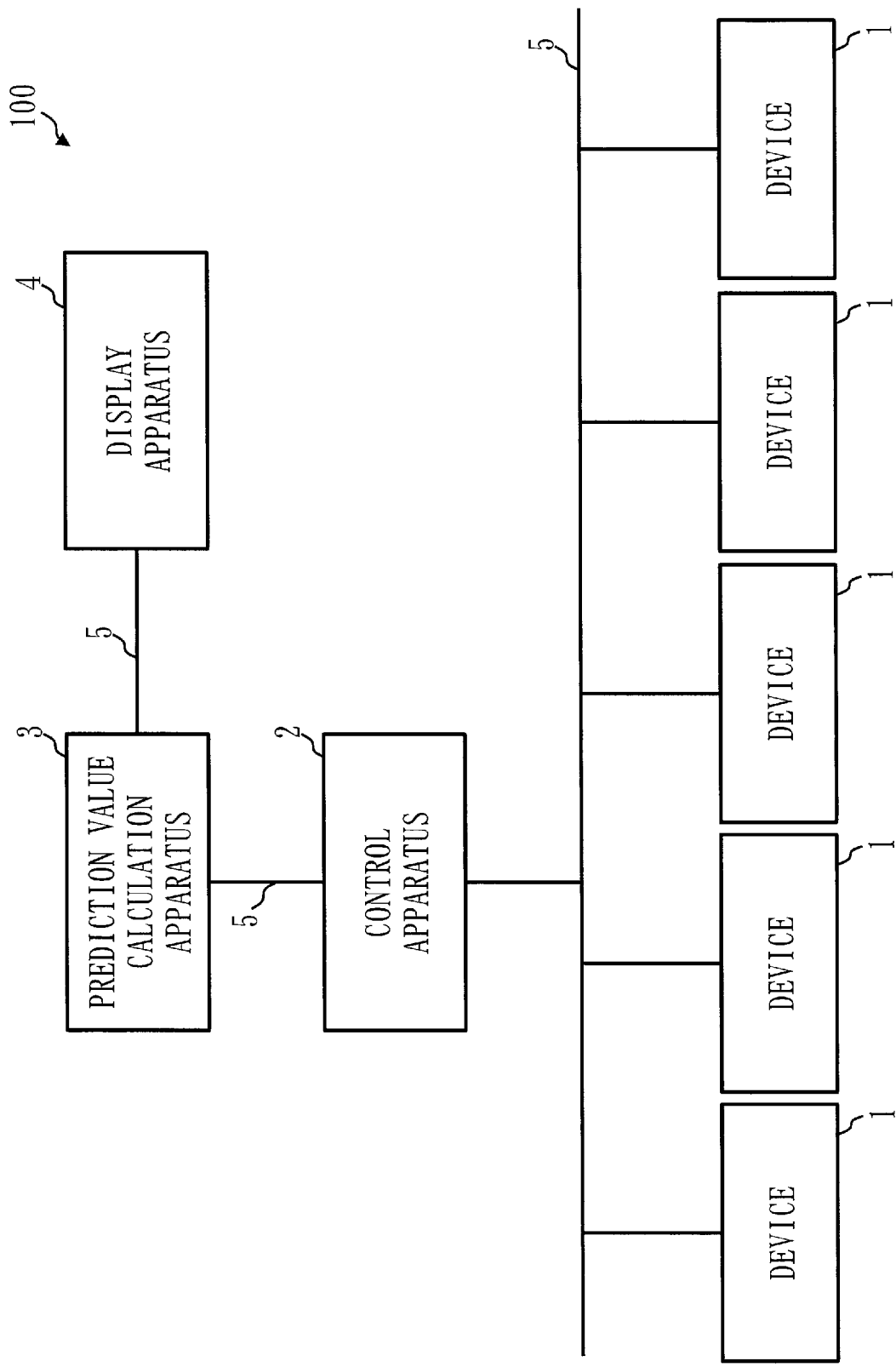
FIG. 1 is a configuration diagram illustrating an example of a display system according to a first embodiment of the present invention.

Embodiments of a display apparatus according to the present invention will be described below in detail with reference to the drawings. In the drawings referred to below, the same reference numerals are assigned to the same or corresponding parts. Besides, the present invention is not limited to the embodiments.

First Embodiment

FIG. 1 is a configuration diagram illustrating an example of a display system according to a first embodiment of the present invention. As illustrated in FIG. 1, a display system 100 includes five devices 1, a control apparatus 2, a prediction value calculation apparatus 3, a display apparatus 4, and a network 5. Besides, although a case where the display system 100 includes the five devices 1 is described, it is not limited to the case where the five devices 1 are included. Four or less or six or more optional devices 1 may be included.

The device 1 is a driving apparatus that drives using a binary digital signal as input data or an output apparatus that outputs a binary digital signal as output data. For example, the device is a driving apparatus such as an actuator, or an output apparatus such as a sensor, a switch, a relay, and a digital circuit. The device 1 is a device incorporated in any apparatuses such as an injection molding machine, an extrusion molding machine, a processing apparatus of a lathe, a grinder or the like, or an inspection apparatus such as a magnetic particle flaw detector, a radiation inspection apparatus, and a penetration flaw detector. The log data including the input data to the device 1 and the output data from the device 1 indicates an operating status of the apparatus.

The control apparatus 2 is an apparatus that is connected to the device 1 and the prediction value calculation apparatus 3, controls the input or output of the data of the device 1, manages the input data to the device 1 and the output data from the device 1 as log data, and outputs the log data to the prediction value calculation apparatus 3. The control apparatus 2 may be a control device for a factory, such as a PLC (Programmable Logic Controller) or a general-purpose computer such as a personal computer. When there are a plurality of devices 1, the control apparatus 2 outputs not only the log data of the devices 1 but also device distinction data for distinguishing the devices 1, for example, a name of the device 1, to the prediction value calculation apparatus 3 together with the log data. Even if the control apparatus 2 is installed in an apparatus in which the device 1 is installed and manages the log data of the device 1 of the apparatus, the control apparatus 2 may be separated from the apparatus in which the device 1 is installed and may manage the log data of the devices 1 in a plurality of apparatus in which the devices 1 are installed. Also, although a case has been described where the log data of the control apparatus 2 has both the input data to the device 1 and the output data from the device 1, the log data of the control apparatus 2 is not limited to including both the input data to the device 1 and the output data from the device 1, and the log data of the control apparatus 2 may be log data having any of the input data to the device 1 and the output data from the device 1.

The prediction value calculation apparatus 3 acquires the log data of the device 1, which is a binary digital signal, from the control apparatus 2, and based on the acquired log data, calculates a signal value of a prediction value of the log data of the control apparatus 2 and accuracy degree of the prediction value indicating accuracy of the signal value of the prediction value. In addition, the prediction value calculation apparatus 3 outputs to the display apparatus 4, the prediction data including the calculated signal value of the prediction value of the log data of the control apparatus 2 and the calculated accuracy degree of the prediction value, and the log data of the control apparatus 2 acquired from the control apparatus 2. Details of a prediction value calculation method in the prediction value calculation apparatus 3 and the prediction data output to the display apparatus 4 will be described later.

The display apparatus 4 is an apparatus that generates and displays a display screen based on the prediction data acquired from the prediction value calculation apparatus 3 and the log data of the control apparatus 2. Details of the display apparatus 4 will be described later.

The network 5 is a network that connects the device 1 and the control apparatus 2, the control apparatus 2 and the prediction value calculation apparatus 3, and the prediction value calculation apparatus 3 and the display apparatus 4. The network 5 is, for example, a field network such as CC-Link (Control & Communication Link, registered trademark), a general network such as Ethernet (registered trademark), or a dedicated input/output line. Besides, although a case has been described where the device 1 and the control apparatus 2, the control apparatus 2 and the prediction value calculation apparatus 3, and the prediction value calculation apparatus 3 and the display apparatus 4 are all connected to the same network 5, it is not limited that all of them are connected to the network 5 and each of them may be connected to different networks.

Next, the details of the prediction value calculation apparatus 3 will be described.

Figure 2:
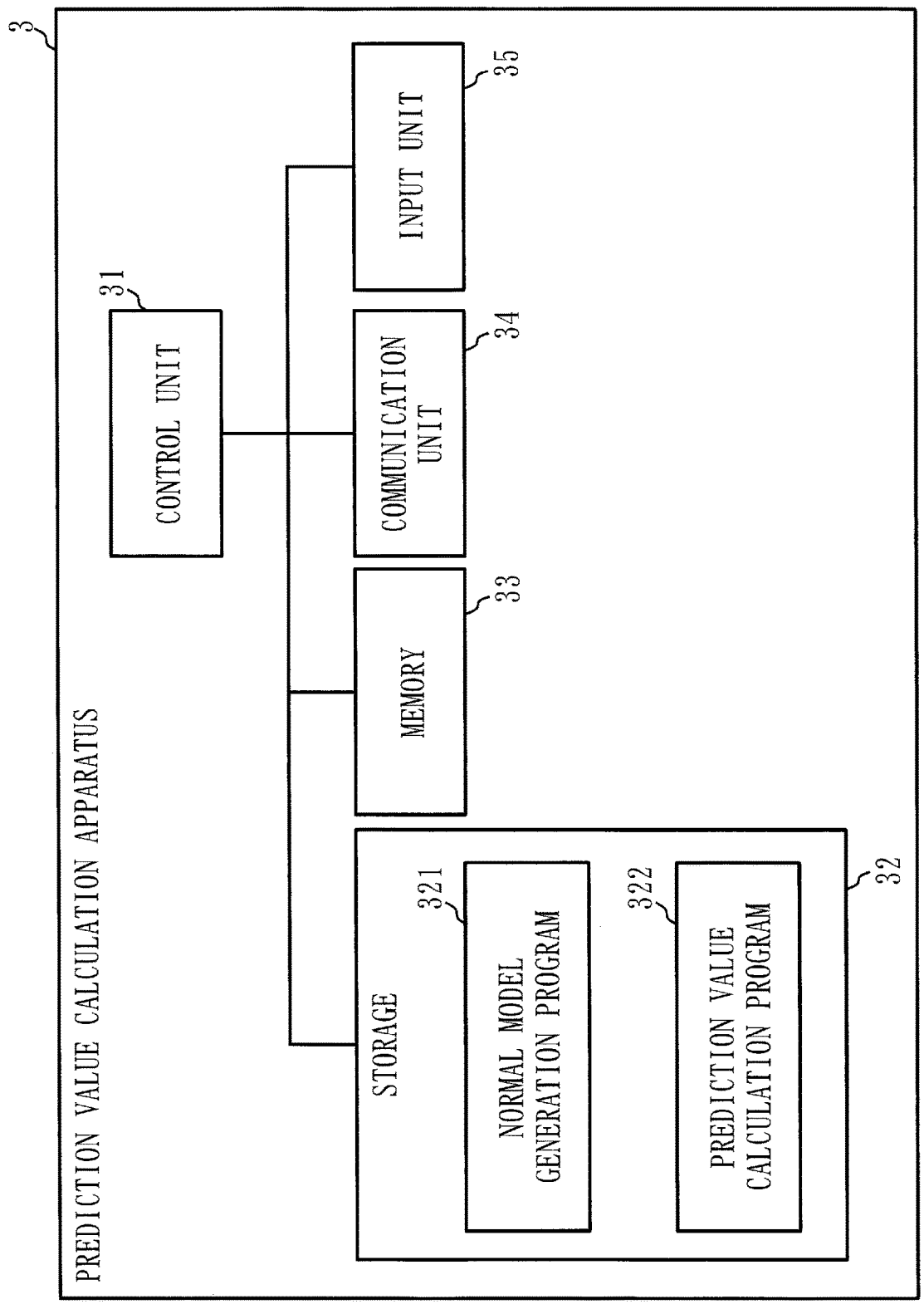
FIG. 2 is a configuration diagram illustrating an example of a prediction value calculation apparatus according to the first embodiment of the present invention.

FIG. 2 is a configuration diagram illustrating an example of the prediction value calculation apparatus in the first embodiment of the present invention.

As illustrated in FIG. 2, the prediction value calculation apparatus 3 includes a control unit 31, a storage 32, a memory 33, a communication unit 34, and an input unit 35. The prediction value calculation apparatus 3 also includes a power supply, which is not illustrated, that serves as a power source for each unit.

The control unit 31 is an apparatus that controls the prediction value calculation apparatus 3. The control unit 31 controls the storage 32, the memory 33, the communication unit 34, and the input unit 35. The control unit 31 calculates the signal value of the prediction value of the log data of the control apparatus 2 and the accuracy degree of the prediction value indicating the accuracy of the signal value of the prediction value, and generates the prediction data including the calculated signal value of the prediction value and the calculated accuracy degree of the prediction value. The control unit 31 may be a processor such as a CPU (Central Processing Unit), one integrated circuit such as an FPGA (Field Programmable Gate Array) and an LSI (Large Scale Integration), or a combination thereof. Besides, the details of the prediction value calculation method in which the control unit 31 calculates the signal value of the prediction value of the log data of the control apparatus 2 and the accuracy degree of the prediction value based on the log data of the control apparatus 2 will be described later. Also, in the following description, the control unit 31 is assumed to be a CPU that achieves control processing by software.

The storage 32 is a storage apparatus that stores various programs executed by the control unit 31, data referred to by the control unit 31 when the control unit 31 executes each program, data generated as a result of executing of each program by the control unit 31, and the like. In the first embodiment of the present invention, a normal model generation program 321 for generating a normal model for the control unit 31 to calculate the signal value of the prediction value of the log data of the control apparatus 2 and the accuracy degree of the prediction value; and a prediction value calculation program 322 for the control unit 31 to calculate the signal value of the prediction value of the log data of the control apparatus 2 and the accuracy degree of the prediction value, are stored as the programs. The storage 32 is a non-volatile memory such as a flash memory, a ROM (Read Only Memory), a hard disk (hard disk drive, HDD), a solid-state drive (SSD), or a memory card reader/writer.

The memory 33 is a storage apparatus that is directly accessed when the control unit 31 executes the processing of the program, and various programs and data stored in the storage 32 are copied and temporarily stored therein. The memory 33 is a volatile memory such as a RAM (Random Access Memory), for example. The control unit 31 usually executes the various programs by temporarily storing the various programs stored in the storage 32 in the memory 33 and sequentially reading them from the memory 33.

The communication unit 34 is an apparatus that includes a receiver that receives data and a transmitter that transmits data, and communicates with the outside. The control unit 31 acquires the log data from the control apparatus 2 via the communication unit 34 and outputs to the display apparatus 4, the prediction data of the log data of the control apparatus 2 and the log data of the control apparatus 2.

The input unit 35 is an apparatus that receives an input from a user, and is, for example, a keyboard, a mouse, a touch pad, or a touch panel having a display function.

Next, the prediction value calculation method in which the control unit 31 calculates the signal value of the prediction value of the log data of the control apparatus 2 and the accuracy degree of the prediction value will be described. Here, in order to calculate the signal value of the prediction value of the log data of the control apparatus 2 and the accuracy degree of the prediction value, the control unit 31 performs two processes: a normal model generation process for generating the normal model based on the log data of the control apparatus 2 in the normal state; and a prediction value calculation process for calculating the signal value of the prediction value of the log data of the control apparatus 2 and the accuracy degree of the prediction value based on the generated normal model. The normal model generation process and the prediction value calculation process are respectively performed by executing by the control unit 31 the normal model generation program 321 and the prediction value calculation program 322 recorded in the storage 32.

Figure 3:
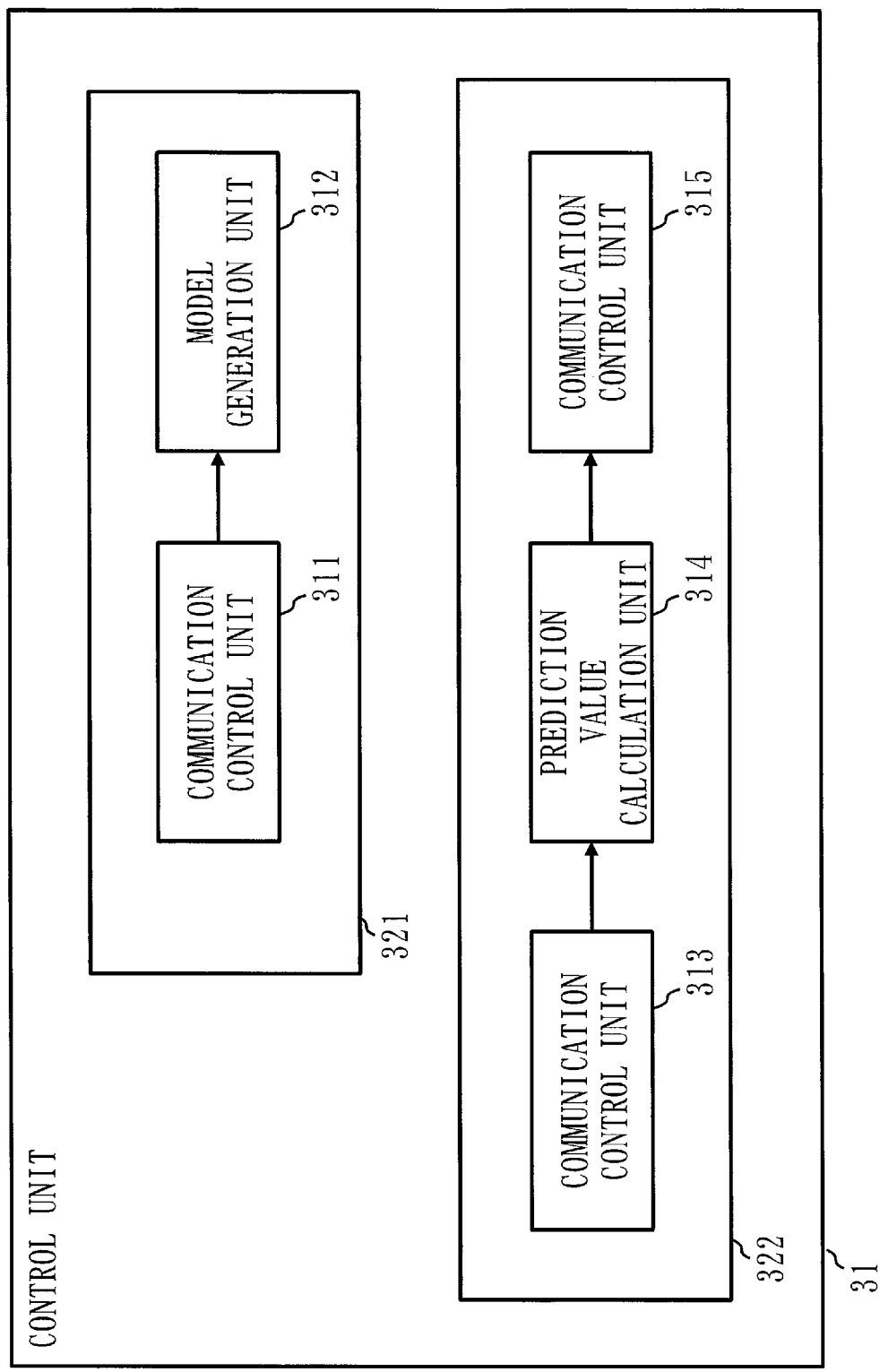
FIG. 3 is a configuration diagram illustrating an example of a functional configuration of a control unit of the prediction value calculation apparatus according to the first embodiment of the present invention.

FIG. 3 is a configuration diagram illustrating an example of a functional configuration of the control unit of the prediction value calculation apparatus according to the first embodiment of the present invention. In FIG. 3, each function of the normal model generation program 321 and the prediction value calculation program 322 executed by the control unit 31 is illustrated as a functional block. In the normal model generation program 321, the control unit 31 has a communication control unit 311 and a model generation unit 312. Also, in the prediction value calculation program 322, the control unit 31 has a communication control unit 313, a prediction value calculation unit 314, and a communication control unit 315. Details of the communication control unit 311, the model generation unit 312, the communication control unit 313, the prediction value calculation unit 314, and the communication control unit 315, which are the functional blocks of the control unit 31, will be described later.

First, the normal model generation process in the control unit 31 will be described. The normal model generation process is performed when the log data of the control apparatus 2 is normal, but it is necessary to newly generate the normal model such as when the display system is installed, when a new device 1 is installed into the display system 100 or when control conditions of the existing device 1 are changed.

Figure 4:
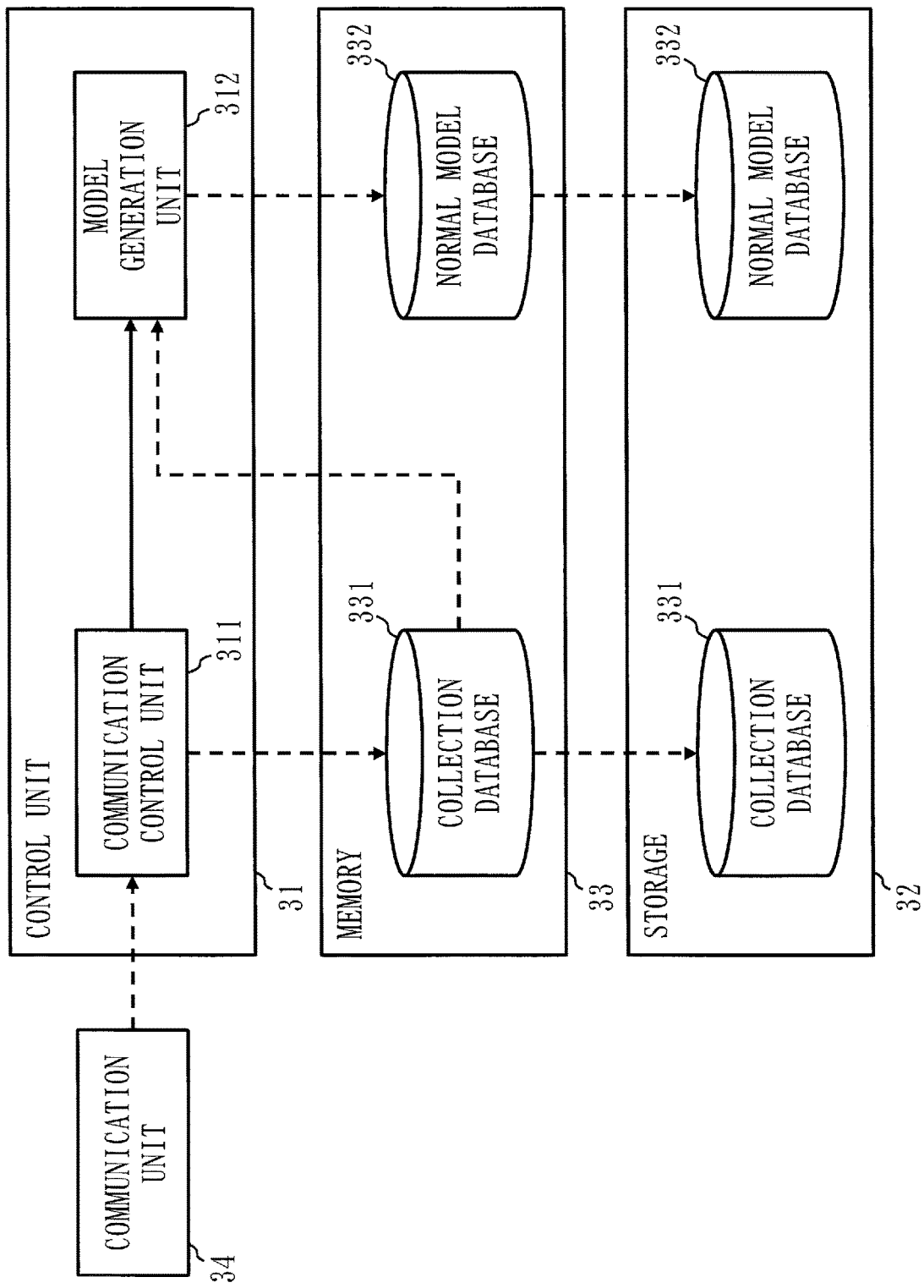
FIG. 4 is a configuration diagram illustrating an example of a functional configuration to execute a normal model generation process according to the first embodiment of the present invention.

FIG. 4 is a configuration diagram illustrating an example of a functional configuration to execute the normal model generation process according to the first embodiment of the present invention. In FIG. 4, each function of the normal model generation program 321 executed by the control unit 31 is indicated as a functional block, a process flow of each functional block is indicated by a solid line arrow, and a data flow is indicated by a dash line arrow.

As illustrated in FIG. 4, the control unit 31 has a communication control unit 311 and a model generation unit 312. For explanations, FIG. 4 illustrates the storage 32, the memory 33, and the communication unit 34. Here, the storage 32 and the memory 33 have a collection database 331 and a normal model database 332 which are databases generated during execution of the normal model generation process by the control unit 31.

The communication control unit 311 acquires the log data, which is a binary digital signal, from the control apparatus 2 via the communication unit 34, and stores the acquired log data of the control apparatus 2, as the collection database 331, in the memory 33. Here, in the collection database 331, the log data of the control apparatus 2 is stored as a time-series binary digital signal. A process of acquiring a series of log data of the control apparatus 2 in the communication control unit 311 may be performed at a fixed cycle such as every one second, one minute, one hour, or one day, or performed at a timing of occurrence of an aperiodic event, such as every time production is paused or every time a buffer of the memory 33 being a primary storage area of the control apparatus 2, becomes full. In addition, when there are the plurality of devices 1, the communication control unit 311 acquires from the control apparatus 2 via the communication unit 34, the device distinction data for distinguishing the devices 1 along with the log data, and the communication control unit 311 stores the log data and the device distinction data associating them with each other in the collection database 331 of the memory 33. The log data of the control apparatus 2 stored in the collection database 331 of the memory 33 is regularly copied to the storage 32 and stored as the collection database 331.

The model generation unit 312 acquires the log data of the control apparatus 2 which is the time-series binary digital signal from the collection database 331 as data in a normal state, and generates a normal model and the normal model-related information, based on the acquired log data of the control apparatus 2. Here, the model generation unit 312 acquires from the collection database 331 a data amount necessary for generating the normal model, for example, a predetermined amount of data for one hour, one day, or one week. The amount of data necessary for generating the normal model depends on fluctuation of the operation of the target device 1, that is, a probability of occurrence of an unexpected operation.

A specific example of a method of generating the normal model by the model generation unit 312, for example, may be a method of generating a normal model being a learning model. In the method of generating the normal model being the learning model, machine-learning is executed by the model generation unit 312 on the log data of the control apparatus 2 as a time-series normal signal pattern of the device 1, the log data of the control apparatus 2 being the binary digital signal acquired from each device 1. Thereby, calculating is carried out, of the probability that the signal value of the prediction value of the log data of the control apparatus 2 that is subsequently input to the device 1 or subsequently output from the device 1 is 1. Alternatively, the specific example of the method may be a method of generating a normal model in which the signal value of the prediction value of the log data of the control apparatus 2 is digitized or a change timing at which the signal value of the prediction value changes is digitized, by executing statistically processing by the model generator 312 on the log data of the control apparatus 2 being the binary digital signal acquired from each device 1.

Here, as a machine learning method in the model generation unit 312, a machine learning method that can handle time-series data, for example, a hidden Markov model or a time delay neural network (Time Delay Neural Network) or a recurrent neural network (Recurrent Neural Network) illustrated in the reference patent literature (JP 2012-48405 A) may be used. Also, the model generation unit 312 generates normal model-related information, for example, the number of intermediate layers, weights, bias values or the like together with the normal model, in a case of the recurrent neural network. Then, the model generation unit 312 stores the generated normal model in the memory 33 as the normal model database 332. The normal model database 332 in the memory 33 is copied and stored in the storage 32 after the normal model generation process is completed or when the prediction value calculation apparatus 3 is powered off.

Further, as a statistical processing method in the model generation unit 312, based on the acquired log data of the control apparatus 2, the signal value of the prediction value of the log data of the control apparatus 2 and an average of change timings at which the signal value of the prediction value changes, are calculated, and based on the calculated signal value of the prediction value of the log data and the calculated average of the change timings, a normal model indicating a signal waveform of the prediction value of the log data of the control apparatus is generated, the signal waveform being acquired by digitizing the signal value of the prediction value of the log data of the control apparatus 2 and the change timing. Also, the model generation unit 312 generates a standard deviation indicating a variation in the change timing of the log data of the control apparatus 2 as the normal model-related information together with the normal model. Then, the model generation unit 312 stores the generated normal model and the standard deviation being the variation in the change timing, in the memory 33 as the normal model database 332. Besides, the normal model database 332 in the memory 33 is copied and stored in the storage 32 after the normal model generation process is completed or when the prediction value calculation apparatus 3 is powered off.

Besides, among the log data of the control apparatus 2 stored in the collection database 331, the model generation unit 312 may acquire only data of a period in which no error has occurred in the device 1, or may acquire data of a period in which an error has occurred if the period in which the error has occurred is short. Here, a case where the error occurs in the device 1 indicates a case where the control apparatus 2 cannot input the input data properly due to anomaly when the control apparatus 2 inputs the input data to the device 1 or a case where the device 1 cannot output the output data properly due to anomaly when the device 1 outputs the output data to the control apparatus 2, and does not include a case where the signal value of the log data of the control apparatus 2 is anomalous.

Also, when an apparatus in which the device 1 is installed has a plurality of operation modes and the operation of the apparatus greatly changes depending on each operation mode, information on the operation mode is stored in the storage 32. The control unit 31 may acquire the log data of the control apparatus 2 separately for each operation mode of the apparatus in which the device 1 is installed, according to the information on the operation mode stored in the storage 32. Then the control unit 31 may generate the normal model for each operation mode of the apparatus in which the device 1 is installed.

Figure 5:
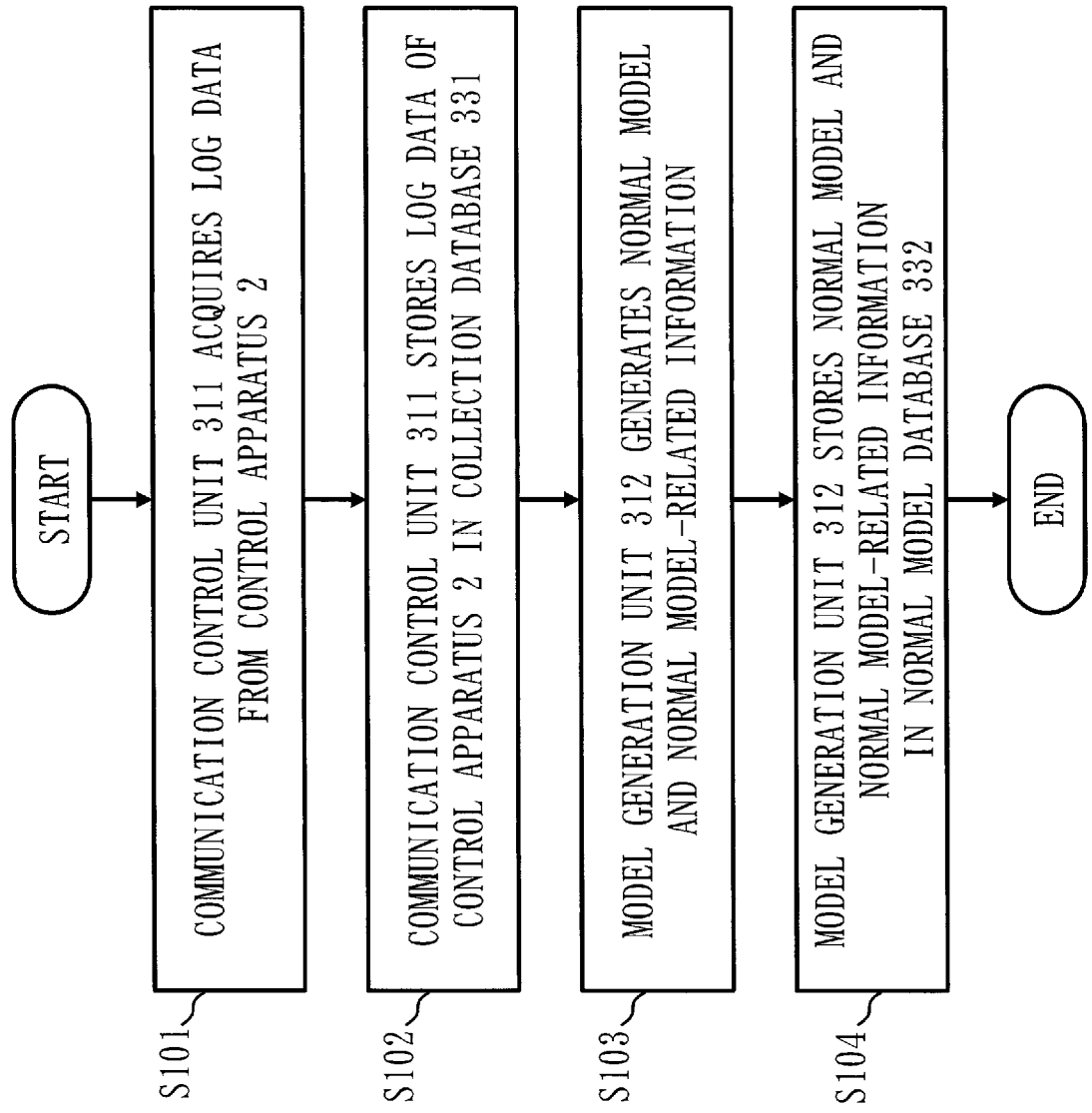
FIG. 5 is a flowchart illustrating an example of a flow of the normal model generation process according to the first embodiment of the present invention.

Next, a flow of the normal model generation process of the control unit 31 will be described. FIG. 5 is a flowchart illustrating an example of the flow of the normal model generation process according to the first embodiment of the present invention.

First, the control unit 31 receives a request for starting the normal model generation process from a user or automatically starts the normal model generation process. A method for the user to request the start of the normal model generation process may be, for example, any method such as a method in which the prediction value calculation apparatus 3 includes a start button for the normal model generation process as the input unit 35 and the user presses the button. A method for the control unit 31 to automatically start the normal model generation process, may be any method such as a method in which the control unit 31 detects an occurrence of the event of when the display system 100 is introduced, when a new device 1 is added to the display system 100, when a control condition of the existing device 1 is changed, or the like, and automatically starts the process.

In step S101, the communication control unit 311 acquires the log data from the control apparatus 2 via the communication unit 34.

In step S102, the communication control unit 311 stores the log data of the control apparatus 2 acquired in step S101 in the collection database 331 of the memory 33. Through steps S101 and S102, the communication control unit 311 copies the log data of the control apparatus 2 to the collection database 331.

Next, in step S103, the model generation unit 312 generates the normal model and normal model-related information from the log data of the control apparatus 2 stored in the collection database 331.

In step S104, the model generation unit 312 stores in the normal model database 332 of the memory 33, the normal model and the normal model-related information generated in step S103 and then ends the process. Besides, the normal model database 332 in the memory 33 is copied and stored in the storage 32 after the normal model generation process is completed or when the prediction value calculation apparatus 3 is powered off.

Next, the prediction value calculation process will be described. The prediction value calculation process may be executed when an anomaly is detected in the apparatus in which the device 1 of the display system 100 is installed or may be executed during all of operation of the prediction value calculation apparatus 3, except for a case where it is necessary to newly generate a normal model after the normal model is generated by the control unit 31 such as a time when the device 1 of the display system 100 is added or a time when the control condition of the existing device 1 is changed.

Figure 6:
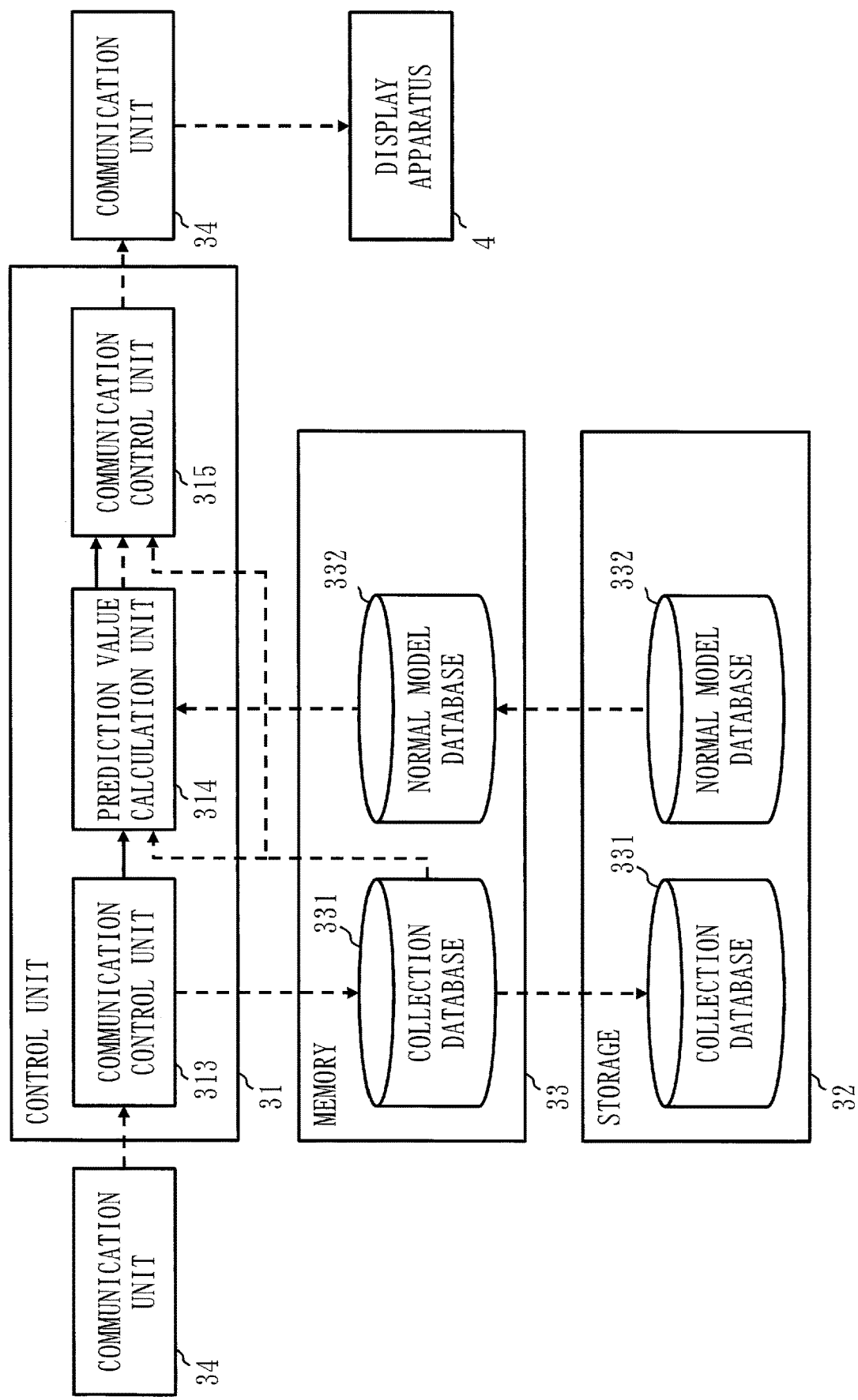
FIG. 6 is a configuration diagram illustrating an example of a functional configuration to execute a prediction value calculation process according to the first embodiment of the present invention.

FIG. 6 is a configuration diagram illustrating an example of a functional configuration for executing the prediction value calculation process according to the first embodiment of the present invention. In FIG. 6, each function of the prediction value calculation program 322 executed by the control unit 31 is indicated as a functional block, a process flow of each functional block is indicated by a solid line arrow, and a data flow is indicated by a dash line arrow.

As illustrated in FIG. 6, the control unit 31 includes the communication control unit 313, the prediction value calculation unit 314, and the communication control unit 315. Also, FIG. 6 illustrates the storage 32, the memory 33, the communication unit 34, and the display apparatus 4 for explanations. Here, the storage 32 and the memory 33 include the collection database 331 which is a database generated in the process of executing the prediction value calculation process by the control unit 31, and the normal model database 332 which is a database generated by executing the normal model generation process by the control unit 31.

The communication control unit 313 acquires the log data which is the binary digital signal from the control apparatus 2 via the communication unit 34 similarly to the communication control unit 311 in the normal model generation process, and stores the acquired log data of the control apparatus 2 in the memory 33 as the collection database 331. Besides, a process of acquiring a series of log data of the control apparatus 2 in the communication control unit 313 may be executed in real time such as every second, or may be executed after collecting the data for a predetermined period such as several minutes. Also, when there are a plurality of devices 1, the communication control unit 313 acquires from the control apparatus 2 via the communication unit 34 together with the log data, the device distinction data for distinguishing the devices 1, and stores the log data and the device distinction data in the collection database 331 of the memory 33 associating them with each other. Besides, the log data of the control apparatus 2 stored in the collection database 331 of the memory 33 is periodically copied to the storage 32 and stored as the collection database 331.

The prediction value calculation unit 314 acquires from the collection database 331 of the memory 33, the log data of the control apparatus 2 corresponding to several seconds or several minutes before the present time, the log data being required to calculate the prediction data of the log data of the control apparatus 2 using the normal model. The prediction value calculation unit 314 also acquires the normal model from the normal model database 332. Then, the prediction value calculation unit 314 calculates the prediction data of the log data of the control apparatus 2 based on the acquired log data in the past of the control apparatus 2 and the acquired normal model. The normal model database 332 of the memory 33 is copied and stored from the storage 32 to the memory 33 when the control unit 31 starts the prediction value calculation process.

Here, if the normal model is a normal model generated by machine learning, the prediction value calculation unit 314 calculates the probability that the signal value of the prediction value which is a next value of the log data of the control apparatus 2 is 1, by inputting to the normal model, the acquired log data in the past of the control apparatus 2. Besides, the probability that the signal value of the prediction value of the log data of the control apparatus 2 is 1 calculated by the prediction value calculation unit 314 is the accuracy degree of the prediction value indicating the accuracy of the prediction value. Here, since the actual measurement value of the log data of the control apparatus 2 is a binary digital signal, a fact that the probability of the signal value of the prediction value of the log data of the control apparatus 2 calculated by the prediction value calculation unit 314 being 1 is 0.5 or more indicates that the signal value of the prediction value of the log data of the control apparatus 2 is likely to be 1. Also, a fact that the calculated probability of the signal value of the prediction value of the log data of the control apparatus 2 being 1 is less than 0.5 indicates that the signal value of the prediction value of the log data of the control apparatus 2 is likely to be 0. Therefore, the prediction value calculation unit 314 calculates the signal value to be 1, of the prediction value of the log data of the control apparatus 2, when the calculated probability of the signal value of the prediction value being 1 is 0.5 or more. The prediction value calculation unit 314 calculates the signal value to be 0, of the prediction value of the log data of the control apparatus 2, when the calculated probability of the signal value of the prediction value being 1 is less than 0.5. Then, the prediction value calculation unit 314 generates the prediction data based on the signal value of the prediction value and the probability of the signal value of the prediction value being 1, which is the accuracy degree of the prediction value.

Also, if the normal model is a normal model generated by statistical processing, the prediction value calculation unit 314 calculates the signal value of the prediction value of the log data of the control apparatus 2, by comparing the acquired log data in the past of the control apparatus 2 with the normal model and detecting a part matching with the normal model best. Also, when the calculated prediction value is the change timing at which the value of the signal value changes, the prediction value calculation unit 314 calculates the standard deviation indicating the variation in the change timing based on the normal model-related information. Besides, the standard deviation calculated by the prediction value calculation unit 314 is the accuracy degree of the prediction value indicating the accuracy of the prediction value. Also, the prediction value calculation unit 314 sets the accuracy degree of the prediction value to 0 when the calculated prediction value is not the change timing at which the value of the signal value changes. Then, the prediction value calculation unit 314 generates the prediction data based on the signal value of the prediction value and the standard deviation that is the accuracy degree of the prediction value.

The communication control unit 315 outputs to the display apparatus 4 via the communication unit 34, the prediction data generated by the prediction value calculation unit 314 and the actual measurement value of the current log data of the control apparatus 2 stored in the collection database 331. Here, if the normal model is the normal model generated by machine learning, the prediction data is data including the signal value of the prediction value of the log data of the control apparatus 2 and the probability that the signal value of the prediction value is 1, which is the accuracy degree of the prediction value. Also, if the normal model is the normal model generated by statistical processing, the prediction data is data including the signal value of the prediction value, and the accuracy degree of the prediction value. The accuracy degree of the prediction value is the standard deviation indicating a variation of the change timing if the prediction value is the change timing, and the accuracy degree of the prediction value is 0 if the prediction value is not the change timing.

Figure 7:
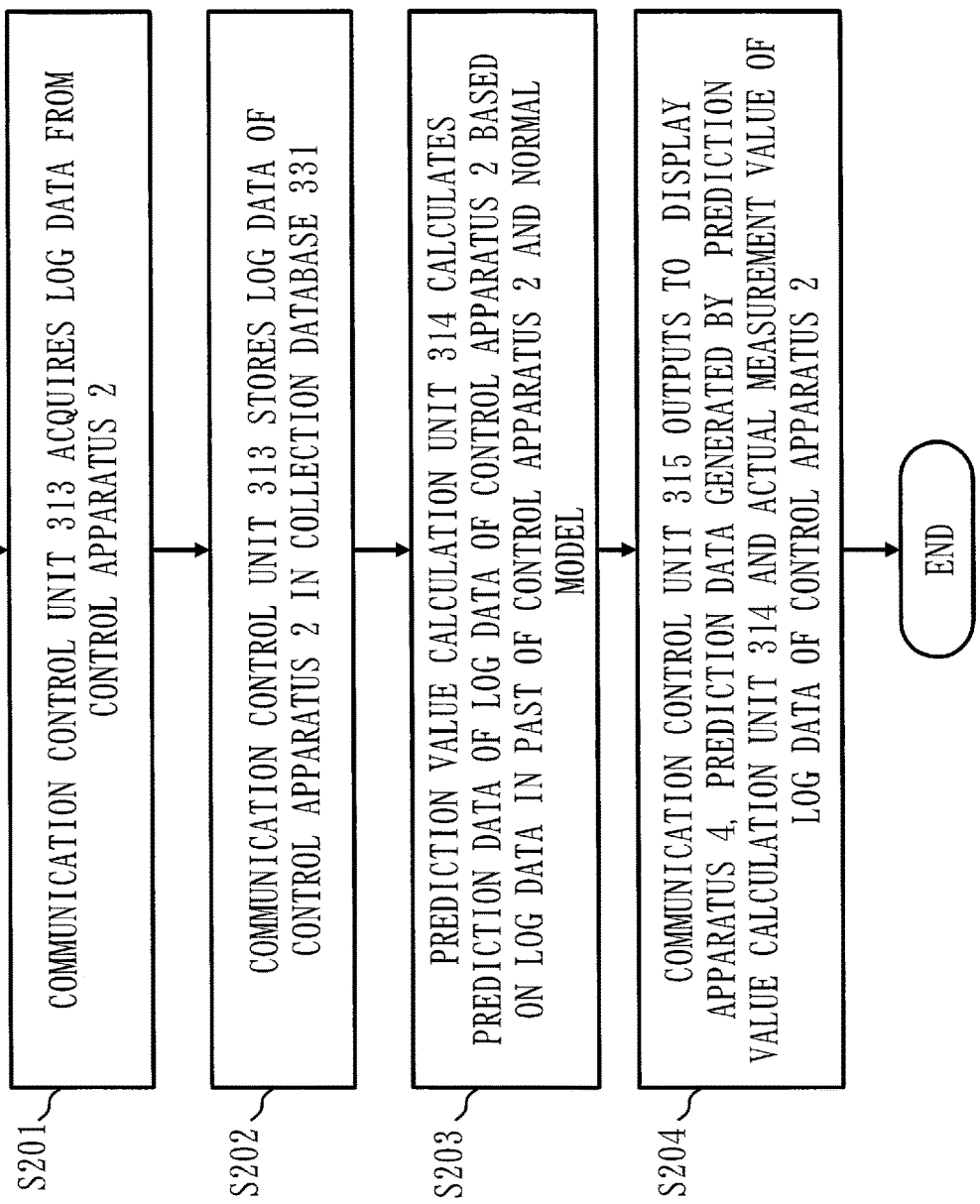
FIG. 7 is a flowchart illustrating an example of a flow of the prediction value calculation process according to the first embodiment of the present invention.

Next, a flow of the prediction value calculation process of the control unit 31 will be described. FIG. 7 is a flowchart illustrating an example of the flow of the prediction value calculation process according to the first embodiment of the present invention.

First, the control unit 31 automatically starts the prediction value calculation process after the normal model generation process is completed. Besides, the prediction value calculation process is executed during all of operation of the prediction value calculation apparatus 3, except for a case where it is necessary to newly generate the normal model after the normal model is generated by the control unit 31 such as a time when a new device 1 is added to the display system 100 or a time when the control condition of the existing device 1 is changed.

In step S201, the communication control unit 313 acquires the log data from the control apparatus 2 via the communication unit 34. Here, the log data of the control apparatus 2 acquired by the communication control unit 313 includes actual measurement values of the log data in the past and the current log data of the control apparatus 2.

In step S202, the communication control unit 313 stores in the collection database 331 of the memory 33, the log data of the control apparatus 2 acquired in step S201. Through steps S201 and S202, the communication control unit 313 copies the log data of the control apparatus 2 to the collection database 331.

Next, in step S203, the prediction value calculation unit 314 calculates the prediction data of the log data of control apparatus 2 based on the log data in the past of the control apparatus 2 stored in the collection database 331 and the normal model stored in the normal model database 332. Here, the prediction data of the log data of the control apparatus 2 includes the signal value of the prediction value of the log data of the control apparatus 2 and the accuracy degree of the prediction value.

In step S204, the communication control unit 315 outputs to the display apparatus 4 via the communication unit 34, the prediction data generated by the prediction value calculation unit 314 and the actual measurement value of the current log data of the control apparatus 2 stored in the collection database 331, and ends the process.

Next, details of the display apparatus 4 will be described.

Figure 8:
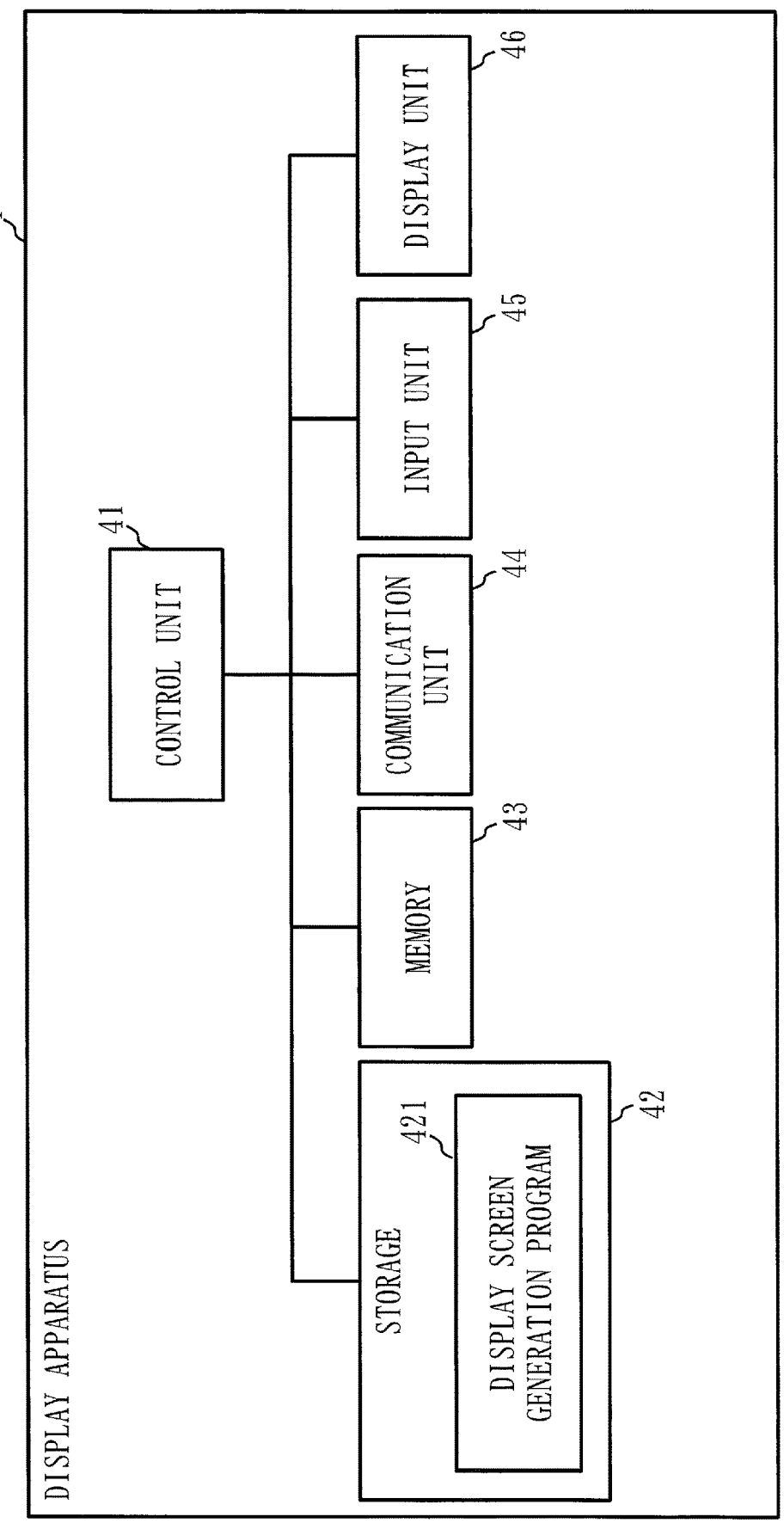
FIG. 8 is a configuration diagram illustrating an example of a display apparatus according to the first embodiment of the present invention.

FIG. 8 is a configuration diagram illustrating an example of the display apparatus according to the first embodiment of the present invention. As illustrated in FIG. 8, the display apparatus 4 includes a control unit 41, a storage 42, a memory 43, a communication unit 44, an input unit 45, and a display unit 46. The display apparatus 4 also includes a power supply, which is not illustrated, that serves as a power source for each unit.

The control unit 41 is a control unit that controls the display apparatus 4, and is a control unit that controls the storage 42, the memory 43, the communication unit 44, the input unit 45, and the display unit 46, and generates the display screen based on the prediction data of the log data of the control apparatus 2 and the actual measurement value of the log data of the control apparatus 2, which are acquired from the prediction value calculation apparatus 3 and displays the display screen on the display unit 46. The control unit 41 may be a processor such as a CPU (Central Processing Unit), one integrated circuit such as an FPGA (Field Programmable Gate Array) and an LSI (Large Scale Integration), or a combination thereof. Details of a method for the control unit 41 to generate the display screen and display it on the display unit 46 will be described later. Further, in the following description, the control unit 41 is assumed to be a CPU that achieves the control process by software.

The storage 42 is a storage apparatus that stores various programs executed by the control unit 41, data referred to by the control unit 41 when the control unit 41 executes each program, data generated as a result of execution of each program by the control unit 41, and the like. In the first embodiment of the present invention, as a program, a display screen generation program 421 is recorded, with which the control unit 41 generates the display screen and displays it on the display unit 46. The storage 42 is, for example, a nonvolatile memory such as a flash memory, a ROM (Read Only Memory), a hard disk (hard disk drive, HDD), a solid-state drive (SSD), or a memory card reader/writer.

The memory 43 is a storage apparatus that is directly accessed when the control unit 41 executes the process of the program, and various programs and data stored in the storage 42 are copied and temporarily stored therein. The memory 43 is a volatile memory such as a RAM (Random Access Memory). The control unit 41 usually executes the various programs by temporarily storing the various programs stored in the storage 42 in the memory 43, and sequentially reading them from the memory 43.

The communication unit 44 is an apparatus that includes a receiver that receives data and a transmitter that transmits data, and communicates with the outside. The control unit 41 acquires from the prediction value calculation apparatus 3 via the communication unit 44, the actual measurement value of the log data of the control apparatus 2 and the prediction data of the log data of the control apparatus 2.

The input unit 45 is an apparatus that receives an input from a user, and is, for example, a keyboard, a mouse, or a touch pad.

The display unit 46 is an apparatus that displays the display screen generated by the control unit 41. The display unit 46 is, for example, a liquid crystal display or an organic EL display (organic electroluminescence display).

Besides, although the input unit 45 and the display unit 46 are described as separate entities, the input unit 45 and the display unit 46 are not limited to being separate entities, and the input unit 45 and the display unit 46 may be integrated to be an apparatus such as a touch panel.

Next, a method will be described, in which the control unit 41 generates the display screen based on the prediction data of the log data of the control apparatus 2, which is acquired from the prediction value calculation apparatus 3, and the actual measurement value of the log data of the control apparatus 2, and displays the display screen on the display unit 46. Here, in order to generate the display screen and display the display screen on the display unit 46, the control unit 41 performs a display screen generation process of generating the display screen and displaying the display screen on the display unit 46. Besides, the display screen generation process is performed by execution by the control unit 41 of the display screen generation program 421 stored in the storage 42.

Figure 9:
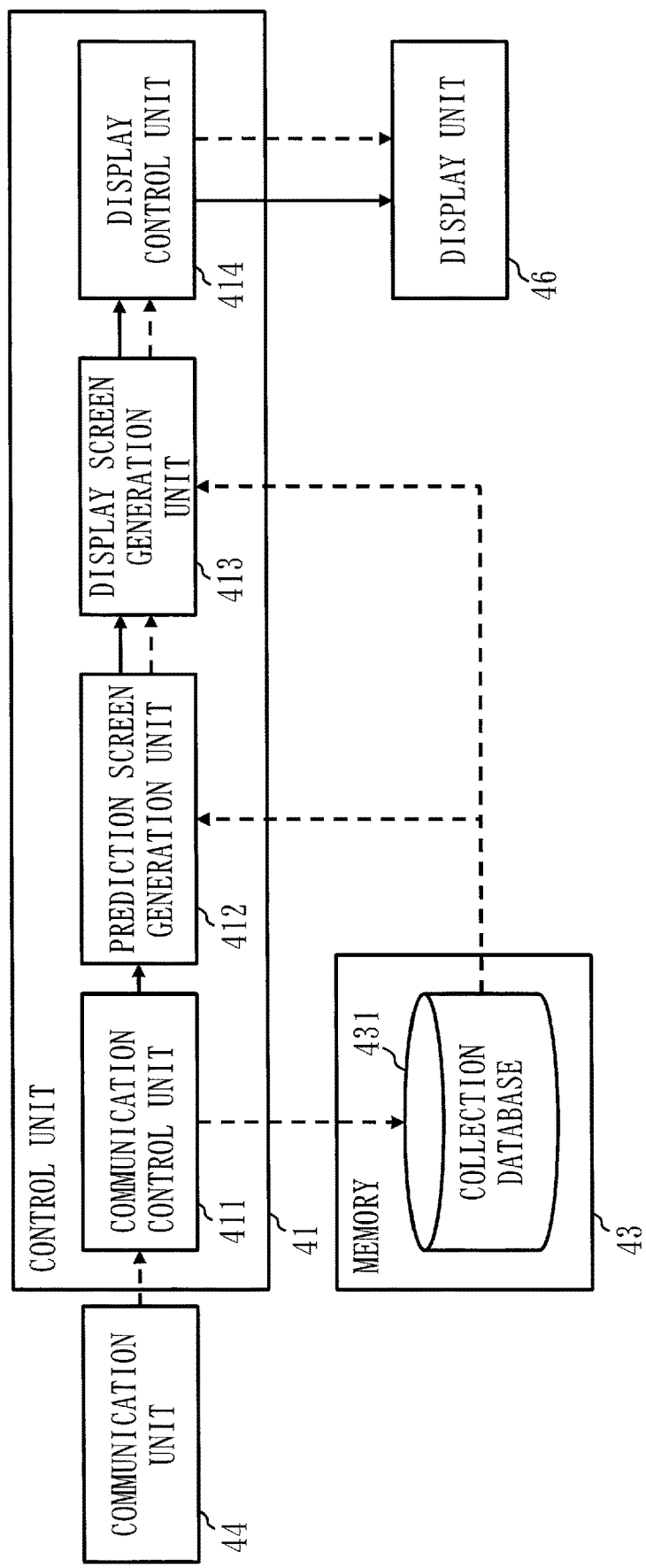
FIG. 9 is a configuration diagram illustrating an example of a functional configuration to execute a display screen generation process according to the first embodiment of the present invention.

FIG. 9 is a configuration diagram illustrating an example of a functional configuration to execute the display screen generation process according to the first embodiment of the present invention. In FIG. 9, each function of the display screen generation program 421 executed by the control unit 41 is indicated as a functional block, the process flow of each functional block is indicated as a solid line arrow, and the data flow is indicated as a dash line arrow.

As illustrated in FIG. 9, the control unit 41 includes a communication control unit 411, a prediction screen generation unit 412, a display screen generation unit 413, and a display control unit 414. Further, FIG. 9 illustrates the memory 43, the communication unit 44, and the display unit 46 for explanations. Here, the memory 43 has a collection database 431 which is a database generated during execution of the display screen generation process by the control unit 41.

The communication control unit 411 acquires the prediction data of the log data of the control apparatus 2 and the actual measurement value of the log data of the control apparatus 2 from the prediction value calculation apparatus 3 via the communication unit 44, and stores the acquired log data of the control apparatus 2 in the memory 43 as the collection database 431. A process of acquiring a series of data in the communication control unit 411 may be executed in real time such as every second, or may be executed after collecting data for a predetermined period such as several minutes. Besides, if there are a plurality of devices 1, the communication control unit 411 acquires from the prediction value calculation apparatus 3 via the communication unit 44, the device distinction data for distinguishing the devices 1 together with the log data of the control apparatus 2, and stores the log data of the control apparatus 2 and the device distinction data associating them with each other in the collection database 431 of the memory 43.

The prediction screen generation unit 412 acquires the prediction data of the log data of the control apparatus 2 from the collection database 431 of the memory 43, and generates the prediction screen based on the acquired prediction data of the log data of the control apparatus 2. A process of generating the prediction screen in the prediction screen generation unit 412 may be executed in real time such as every second, or may be executed after collecting data for a predetermined period such as several minutes. Hereinafter, for explanations, a case will be described in which the process of generating the prediction screen is executed by the prediction screen generation unit 412 after collecting data corresponding to one screen of the prediction screen.

Figure 10:
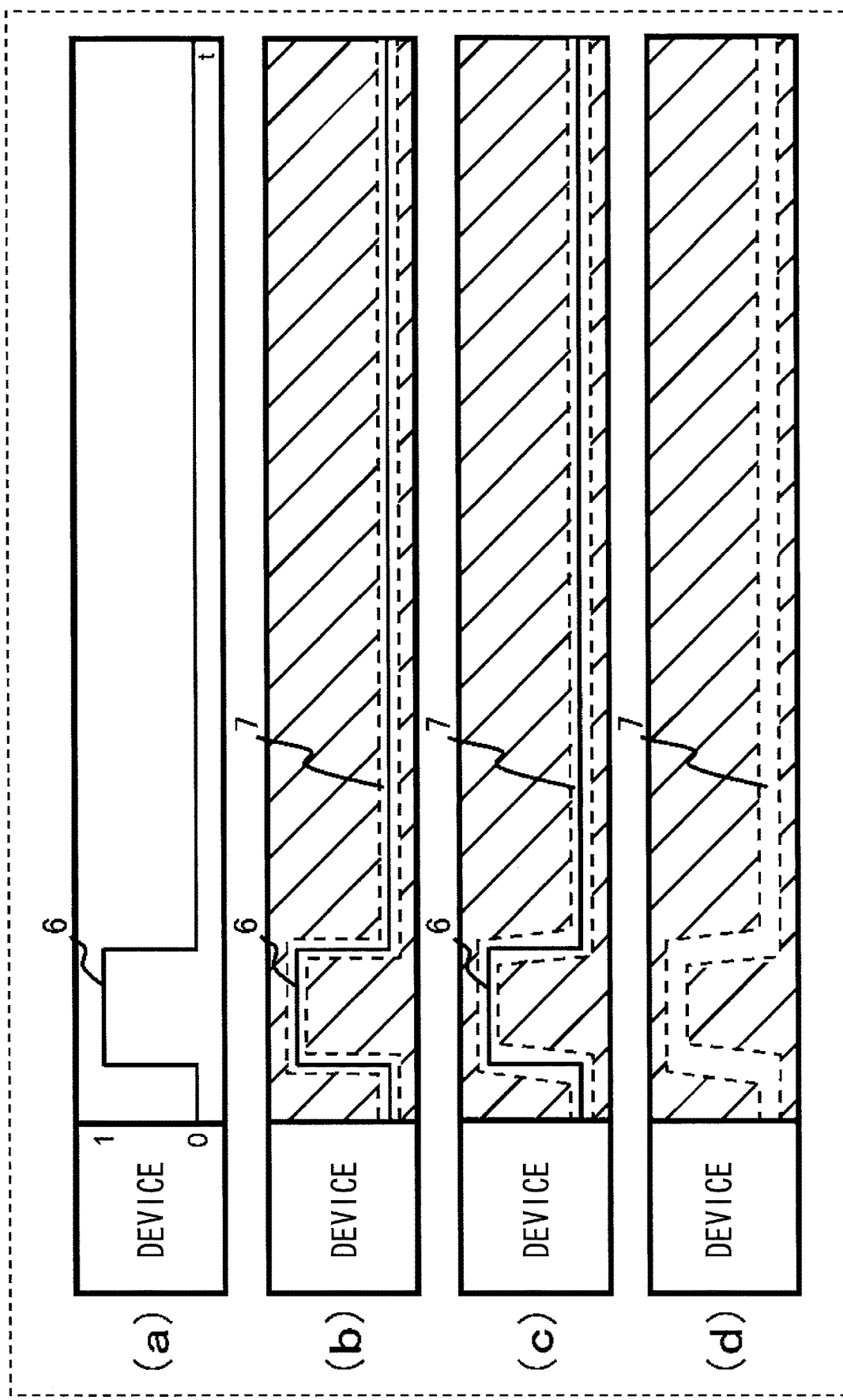
FIG. 10 is an explanatory diagram illustrating a generation process of a prediction screen according to the first embodiment of the present invention.

The prediction screen generation unit 412 executes the prediction screen generation in four processes. FIG. 10 is an explanatory diagram illustrating a process of generating the prediction screen according to the first embodiment of the present invention. (a) of FIG. 10 is an explanatory diagram explaining the first process of generating the prediction screen, (b) of FIG. 10 is an explanatory diagram explaining the second process of generating the prediction screen, (c) of FIG. 10 is an explanatory diagram explaining the third process of generating the prediction screen, and (d) of FIG. 10 is an explanatory diagram explaining the fourth process of generation of the prediction screen.

As illustrated in (a) of FIG. 10, in the first process of generating the prediction screen, the prediction screen generation unit 412 generates a screen depicting a name of the device 1 on the left side and depicting the prediction value signal 6 on the right side, the prediction value signal 6 being a signal wavelength of the acquired signal value of the log data of the control apparatus 2. Here, in (a) of FIG. 10, the prediction value signal 6 depicted by the prediction screen generation unit 412 is a rectangular wave. In a screen on the right side depicting the signal wavelength of the prediction value, a vertical axis indicates a value of the signal value and a horizontal axis indicates time (t). The vertical axis indicates 0 or 1 as the value of the signal value, and the horizontal axis indicates the later time toward the right. Also, the prediction screen generation unit 412 acquires the device distinction data from the collection database 431 and depicts a screen on the left side depicting the name of the device 1 in (a) of FIG. 10, based on the acquired device distinction data.

As illustrated in (b) of FIG. 10, in the second process of generating the prediction screen, the prediction screen generation unit 412 depicts a prediction value area 7 having a certain width centered on the prediction value signal 6 depicted in the first process. Here, the prediction value area 7 is an area having the certain width centered on the prediction value signal 6, and has a white area illustrated in white and dash lines surrounding the white area. Also, the prediction screen generation unit 412 depicts other areas with diagonal lines in order to emphasize the prediction value area 7. Besides, in (b) of FIG. 10, although a case has been described where the prediction screen generation unit 412 depicts the prediction value area 7 in white and the other areas with diagonal lines, it is not limited to depicting the prediction value area 7 in white and the other areas with diagonal lines, and the prediction value area 7 may be depicted so as to be filled with another color, for example, red, and the other areas with a color other than diagonal lines, for example, black. It is sufficient if a depiction can indicate that the prediction value area 7 is different from other areas. By depicting in this way, the prediction value area 7 in (b) of FIG. 10 can indicate the prediction value signal 6 with an emphasis on the prediction value signal 6. Besides, in (b) of FIG. 10, although the dash lines forming the prediction value area 7 are indicated as straight dash lines, it is not limited to the dash lines forming the prediction value area 7 being the straight dash lines, and the dash lines forming the prediction value area 7 may be curved dash lines, or the dash lines forming the prediction value area 7 may be straight lines rounded only around vertexes.

As illustrated in (c) of FIG. 10, in the third process of generating the prediction screen, in the white area that is the prediction value area 7 depicted in the second process, for an area of the change timing at which the signal value of the prediction value changes, the prediction screen generation unit 412 corrects a shape and size of the area based on the acquired signal value of the prediction value and the accuracy degree of the prediction value.

Figure 11:
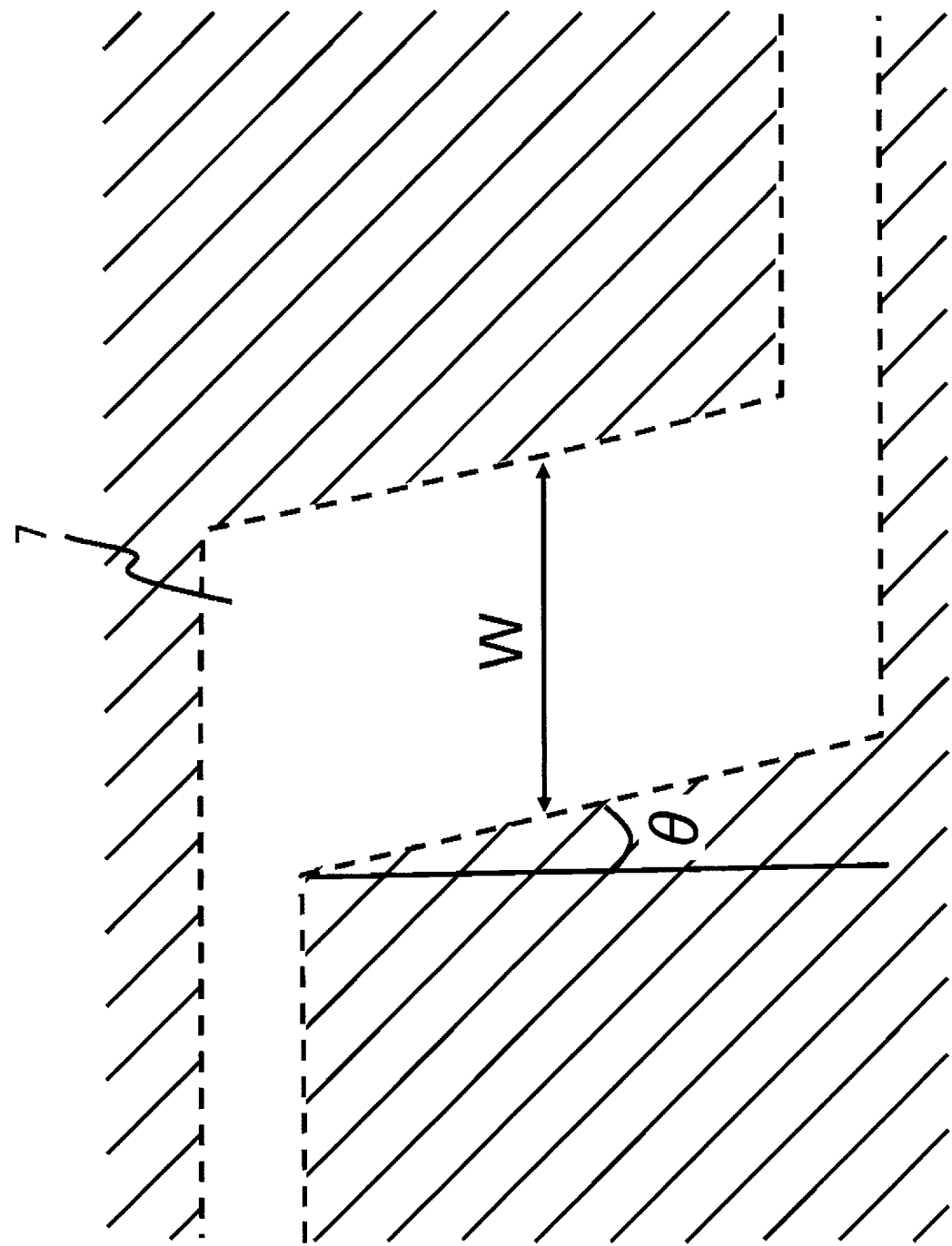
FIG. 11 is an explanatory diagram illustrating an example of a correction method of a prediction value area of the prediction screen according to the first embodiment of the present invention.

FIG. 11 is an explanatory diagram illustrating an example of a method of correcting the prediction value area of the prediction screen according to the first embodiment of the present invention. As illustrated in FIG. 11, in the third process of generating the prediction screen, the prediction value area 7 of the prediction screen which has been corrected by the prediction screen generation unit 412 is indicated as a white area surrounded by dash lines, and has a width W and an angle θ. Here, the angle θ indicates an angle from a right angle, the prediction screen generation unit 412 corrects the prediction value area 7 depicted in the second process of generating the prediction screen to an area which is wider by the width W and is inclined by the angle θ.

Here, if the normal model is the normal model generated by machine learning, a calculation method of the width W of the actual measurement value area 7 differs depending on whether the probability of the value of the signal value of the prediction value being 1 is 0.5 or more or less than 0.5, the probability being the accuracy degree of the prediction value. When the accuracy degree of the prediction value is 0.5 or more, the width W of the prediction value area 7 is a value acquired by multiplying by a predetermined constant, a difference value acquired by subtracting the accuracy degree of the prediction value from the signal value "1" of the prediction value. When the accuracy degree of the prediction value is less than 0.5, the width W of the prediction value area 7 is a value acquired by multiplying the accuracy degree of the prediction value by the predetermined constant. Besides, the predetermined constant to be multiplied when calculating the width W of the prediction value is any value to be determined based on a size of the display unit 46 or a size of the display screen generated in the display screen generation process by the control unit 41. As a result, the width W of the prediction value area 7 becomes a value that reflects the accuracy degree of the prediction value.

A calculation method of the angle θ of the prediction value area 7 also differs depending on whether the accuracy degree of the prediction value is 0.5 or more or less. When the accuracy degree of the prediction value is 0.5 or more, the angle θ of the prediction value area 7 is a value acquired by multiplying by a predetermined constant, a difference value acquired by subtracting the accuracy degree of the prediction value from the signal value "1" of the prediction value. When the accuracy degree of the prediction value is less than 0.5, the angle θ of the prediction value area 7 is a value acquired by multiplying the accuracy degree of the prediction value by the predetermined constant. Besides, the predetermined constant to be multiplied when calculating the angle θ of the prediction value area 7 is preferably a constant larger than the predetermined constant to be multiplied when calculating the width W, and for example, it is 90. When the predetermined constant is 90, the angle θ is $0 \leq \theta \leq 45$, and the user can easily visually recognize an inclination of the prediction value area 7.

If the normal model is the normal model generated by statistical processing, the width W of the prediction value area 7 is a standard deviation value of the change timing at which the signal value of the prediction value changes, the standard deviation being the accuracy degree of the prediction value. Thereby, the width W of the prediction value becomes a value that reflects the accuracy degree of the prediction value.

The angle θ of the prediction value area 7 is a value acquired by multiplying by a predetermined constant, the standard deviation of the change timing at which the signal value of the prediction value changes, the standard deviation being the accuracy degree of the prediction value. The predetermined constant to be multiplied when calculating the angle θ of the prediction value area 7 is any value to be determined based on the size of the display unit 46 or the size of the display screen generated in the display screen generation process by the control unit 41. By setting the angle θ to a value acquired by multiplying by a predetermined constant, the standard deviation of the change timing at which the signal value of the prediction value changes, the angle θ can be set to a large value so that the user can easily visually recognize the inclination of the prediction value area 7.

Returning to FIG. 10, as illustrated in (d) of FIG. 10, in the fourth process of generating the prediction screen, the prediction screen generation unit 412 deletes the prediction value signal 6 depicted in the first process of generating the prediction screen. As a result, the right side of the prediction screen indicates only the prediction value area 7. Here, since the prediction value area 7 reflects the accuracy degree of the prediction value, the prediction value area 7 indicates a range of the normal state of the log data of the control apparatus 2. Therefore, the user can visually recognize the range of the normal state of the log data of the control apparatus 2 by the prediction screen indicating only the prediction value area 7, which is generated by the prediction screen generation unit 412.

Figure 12:
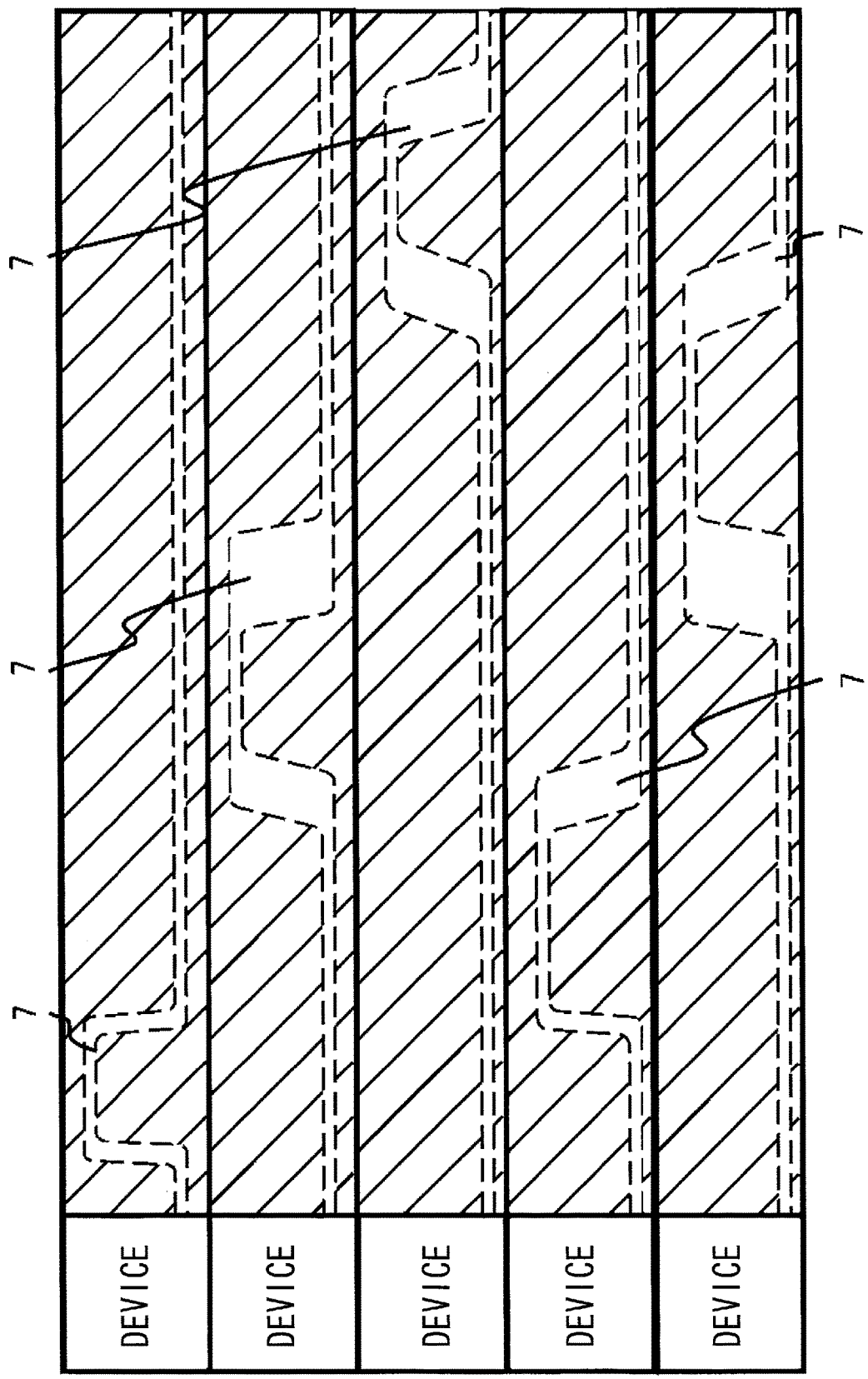
FIG. 12 is an explanatory diagram illustrating an example of the prediction screen according to the first embodiment of the present invention.

Also, since the display system 100 includes the five devices 1, the prediction screen generation unit 412 generates the prediction screen on which the prediction screens of the five devices 1 are integrated into one screen. FIG. 12 is an explanatory diagram illustrating an example of the prediction screen according to the first embodiment of the present invention. Here, unlike FIG. 10, FIG. 12 is a prediction screen on which the dash lines forming the prediction value area 7 in the prediction screen of each device 1 are straight lines rounded only around vertexes. As illustrated in FIG. 12, the prediction screen on which the prediction screens for the five devices 1 are integrated into one screen is a screen on which the prediction screens for each device 1 are vertically arranged.

Besides, in the generation of the prediction screen by the prediction screen generation unit 412, an example of generating the prediction screen in all of the four processes has been described, however, it is not limited to generating the prediction screens in all of the four processes, and it is acceptable to perform only calculation in each process and to generate the prediction screen only in the fourth process. Alternatively, it is also acceptable that the prediction screen generation unit 412 performs only calculation and the display screen generation unit 413 described below collectively generates the screen.

Returning to FIG. 9, the display screen generation unit 413 acquires the prediction screen from the prediction screen generation unit 412 and the actual measurement value of the log data of the control apparatus 2 from the collection database 431. The display screen generation unit 413 generates the display screen based on the acquired prediction screen and the acquired actual measurement value of the log data of the control apparatus 2.

Figure 13:
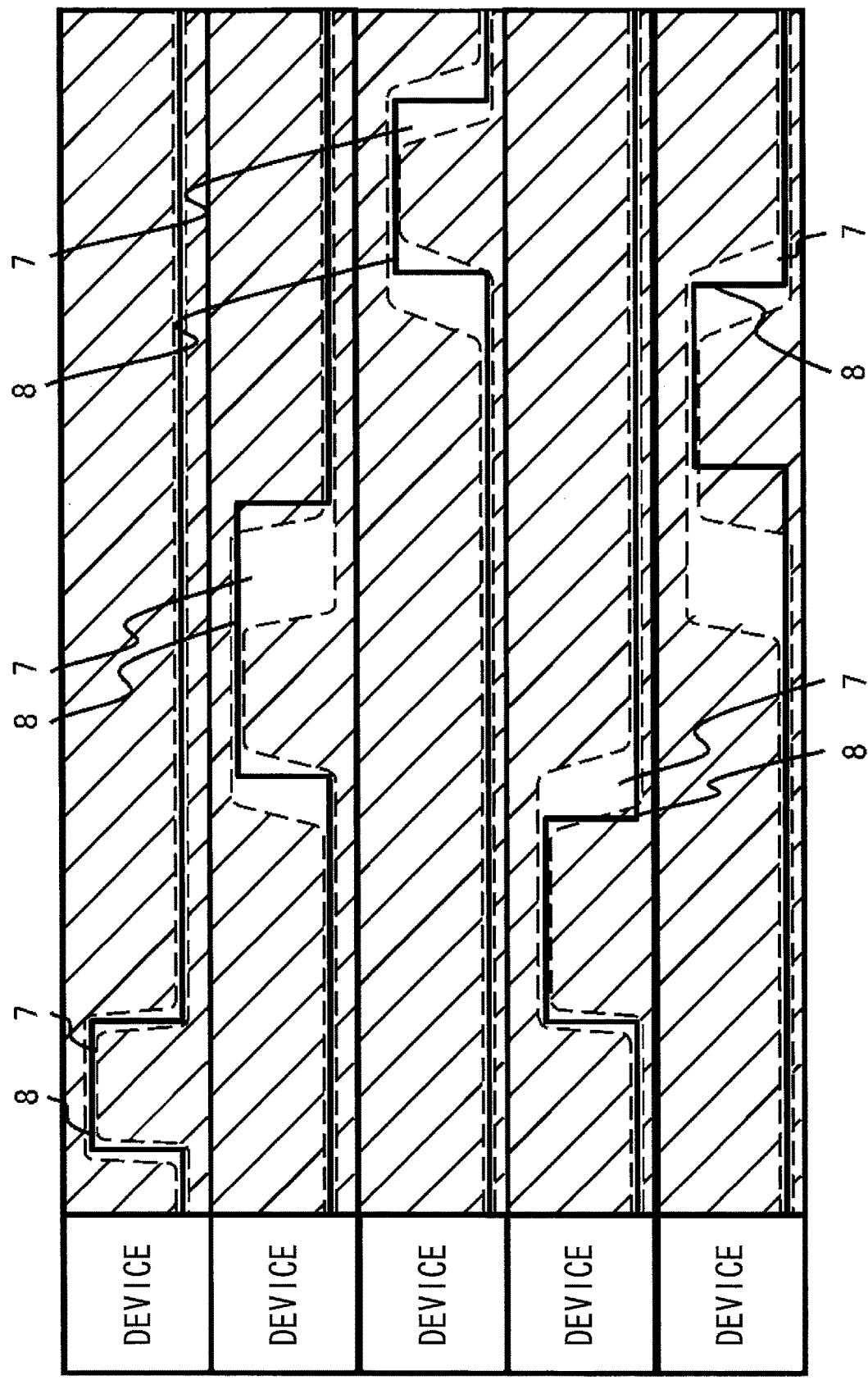
FIG. 13 is an explanatory diagram illustrating an example of a display screen according to the first embodiment of the present invention.

FIG. 13 is an explanatory diagram illustrating an example of a display screen according to the first embodiment of the present invention. As illustrated in FIG. 13, the display screen generation unit 413 depicts, based on the actual measurement value of the log data of the control apparatus 2 acquired from the collection database 431, an actual measurement value signal 8, which is a signal wavelength of the actual measurement value of the log data of the control apparatus 2, on the prediction screen acquired from the prediction screen generation unit 412 to generate the display screen. Here, the actual measurement value signal 8 depicted by the display screen generation unit 413 is a rectangular wave. In this way, the display screen generated by the display screen generation unit 413 directly indicates deviation degree that indicates how much the actual measurement value of the log data of the control apparatus 2 deviates from the prediction value area 7 indicating the range of the normal state so that the user can visually recognize on the display screen whether or not the log data of the control apparatus 2 deviates from the normal state and, if deviating, the user can visually recognize the degree of the deviation.

Figure 14:
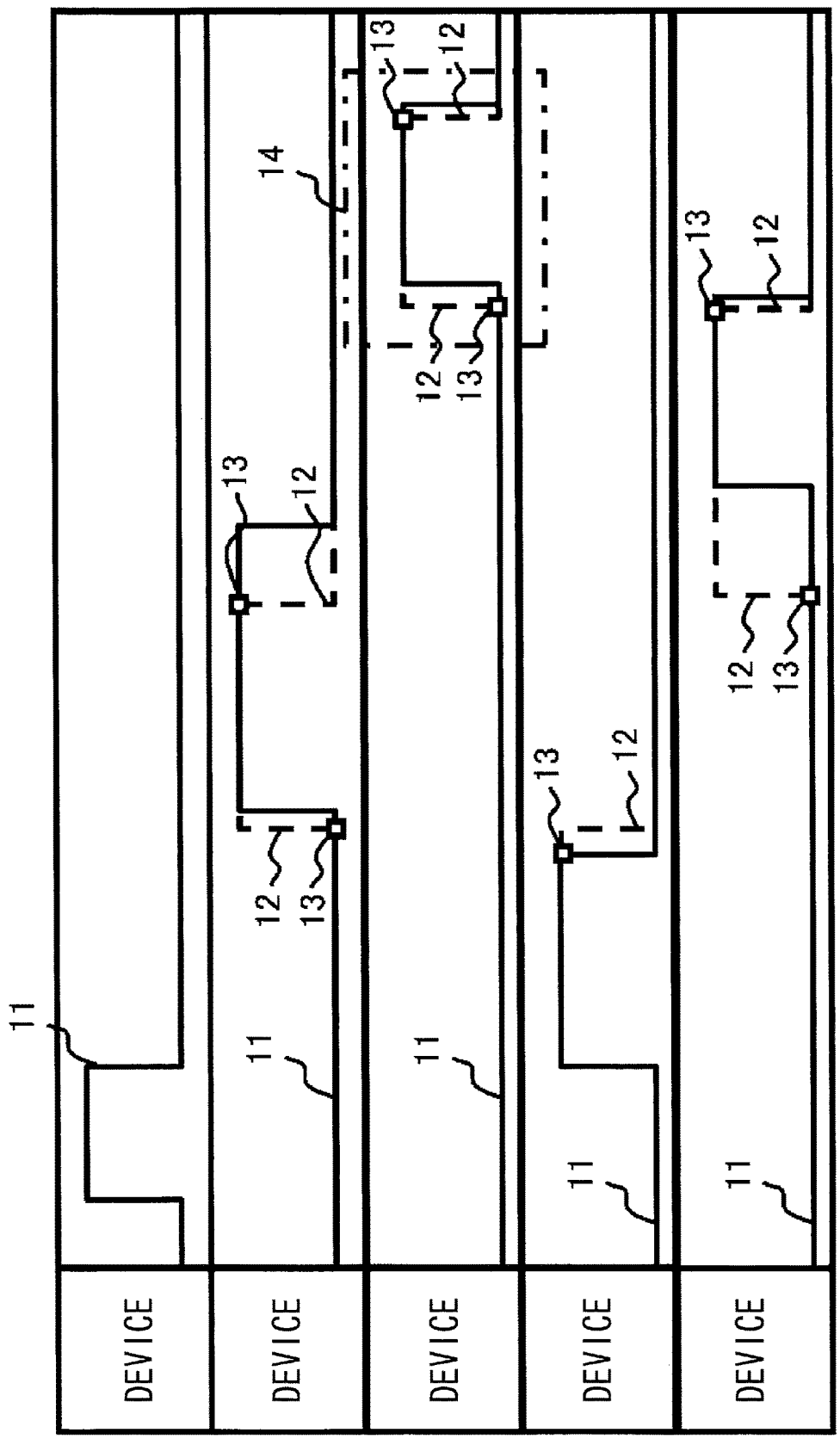
FIG. 14 is an explanatory diagram illustrating an example of a display screen having no prediction value area according to the first embodiment of the present invention.

Next, an effect of having the prediction value area 7 on the display screen will be described with reference to FIG. 14. FIG. 14 is an explanatory diagram illustrating an example of a display screen having no prediction value area according to the first embodiment of the present invention. As illustrated in FIG. 14, the display screen having no prediction value area 7 according the first embodiment has an actual measurement value signal 11 (solid line) which is a signal wavelength of the actual measurement value of the log data of the control apparatus 2, a prediction value signal 12 (dash line) which is a signal wavelength of the prediction value of the log data of the control apparatus 2, and a gap start point 13 that indicates a point at which a gap between the actual measurement value signal 11 and the prediction value signal 12 starts. Here, the signal value of the actual measurement value and the signal value of the prediction value of the log data of each control apparatus 2 in FIG. 14 are the same as the signal value of the actual measurement value and the signal value of the prediction value of the log data of each control apparatus 2 illustrated in FIG. 13. The display screen having no prediction value area 7 according to the first embodiment illustrated in FIG. 14 has the prediction signal 12 indicating the signal in the normal state and the gap start point 13 so that the user can visually recognize that there is a gap between the actual measurement value signal 11 and the prediction value signal 12. However, since the display screen having no prediction value area 7 according to the first embodiment illustrated in FIG. 14 does not have the prediction value area 7, the display screen does not indicate a normal range that reflects the accuracy degree of the prediction value. Therefore, the user cannot accurately recognize whether or not the actual measurement value signal 11 deviates from the normal state, and cannot accurately recognize the degree of the deviation. For example, in an area 14 (one-dot chain line) illustrated in FIG. 14, the actual measurement value signal 11 deviates from the prediction value signal 12. However, when referring to the corresponding area in FIG. 13, the actual measurement value signal 11 is included in the normal range.

As described above, the prediction value area 7 depicted on the display screen generated by the display screen generation unit 413 illustrated in FIG. 13 enables the user to visually recognize on the display screen whether the log data of the control apparatus 2 deviates from the normal state and, if deviating, the user can visually recognize the degree of the deviation.

Returning to FIG. 9, the display control unit 414 acquires the display screen from the display screen generation unit 413 and displays the acquired display screen on the display unit 46.

Figure 15:
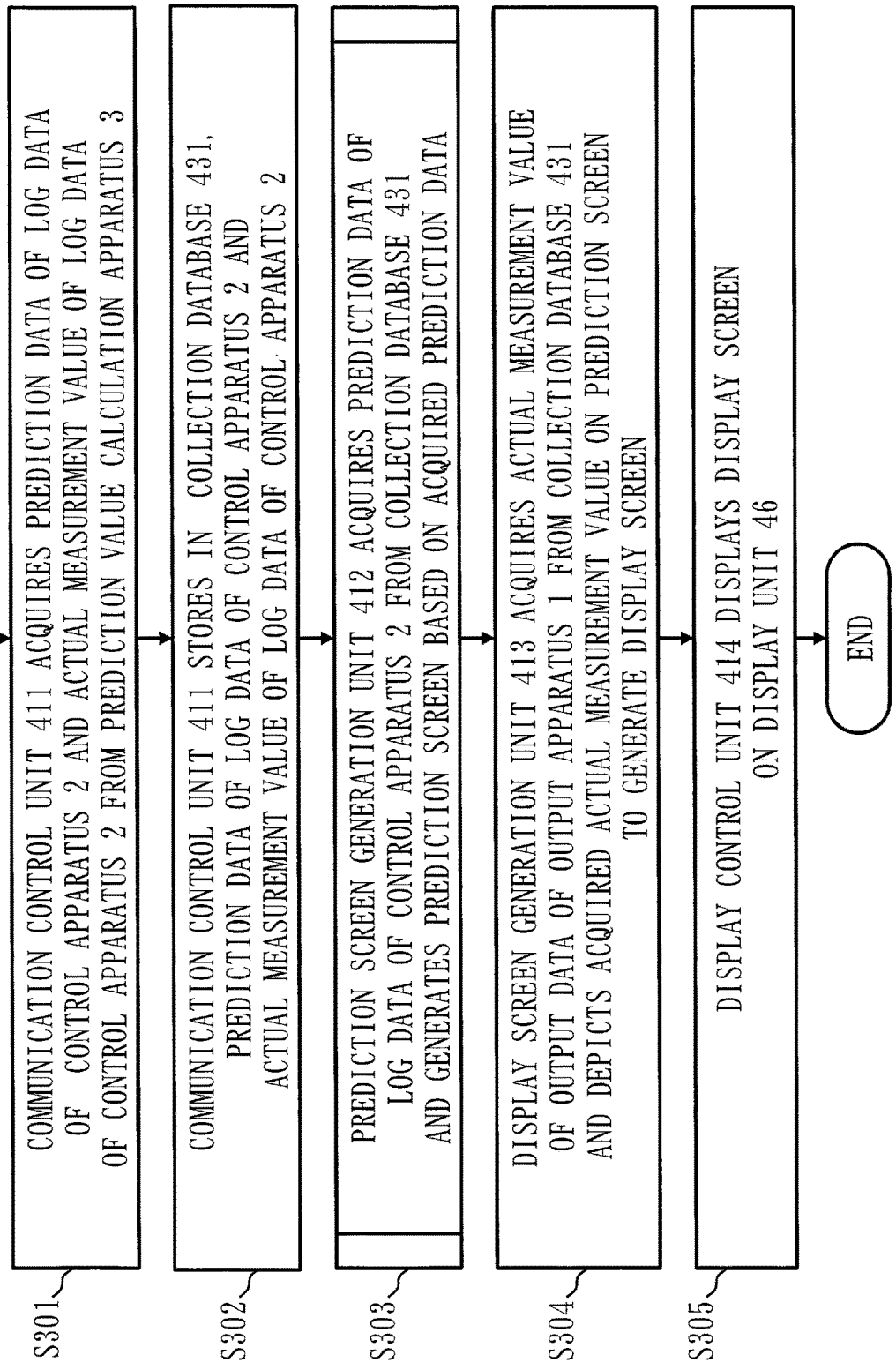
FIG. 15 is a flowchart illustrating an example of a flow of a display screen generation process according to the first embodiment of the present invention.

Next, a flow of the display screen generation process by the control unit 41 will be described. FIG. 15 is a flowchart illustrating an example of the flow of the display screen generation process according to the first embodiment of the present invention.

First, the control unit 41 receives a request for a start of the display screen generation process from the user, or automatically starts the display screen generation process. A method for the user to request the start of the display screen generation process may be any method such as a method in which the display apparatus 4 includes a start button for the display screen generation process as the input unit 45 and the user presses the button. A method for the control unit 41 to automatically start the display screen generation process may be any method such as a method in which the control unit 41 acquires the prediction data of the log data of the control apparatus 2 and the actual measurement value of the log data of the control apparatus 2, from the prediction value calculation apparatus 3 via the communication unit 44, detects that an amount of the acquired data exceeds a certain amount, and automatically starts the process.

In step S301, the communication control unit 411 acquires the prediction data of the log data of the control apparatus 2 and the actual measurement value of the log data of the control apparatus 2 from the prediction value calculation apparatus 3 via the communication unit 44. Here, the prediction data is data including the signal value of the prediction value of the log data of the control apparatus 2 and the accuracy degree of the prediction value.

Next, in step S302, the communication control unit 411 stores in the collection database 431 of the memory 43, the actual measurement value of the log data of the control apparatus 2 and the prediction data of the log data of the control apparatus 2 acquired in step S301. Through steps S301 and S302, the communication control unit 411 copies to the collection database 431, the prediction data of the log data of the control apparatus 2 and the actual measurement value of the log data of the control apparatus 2.

Next, in step S303, the prediction screen generation unit 412 acquires the prediction data of the log data of the control apparatus 2 from the collection database 431, and generates the prediction screen based on the acquired prediction data. Specifically, the prediction screen generation unit 412 acquires the prediction data of the log data of the control apparatus 2 from the collection database 431, and generates the prediction screen in four processes based on the signal value of the prediction value of the log data of the control apparatus 2, and the accuracy degree of the prediction value, which are included in the acquired prediction data.

Figure 16:
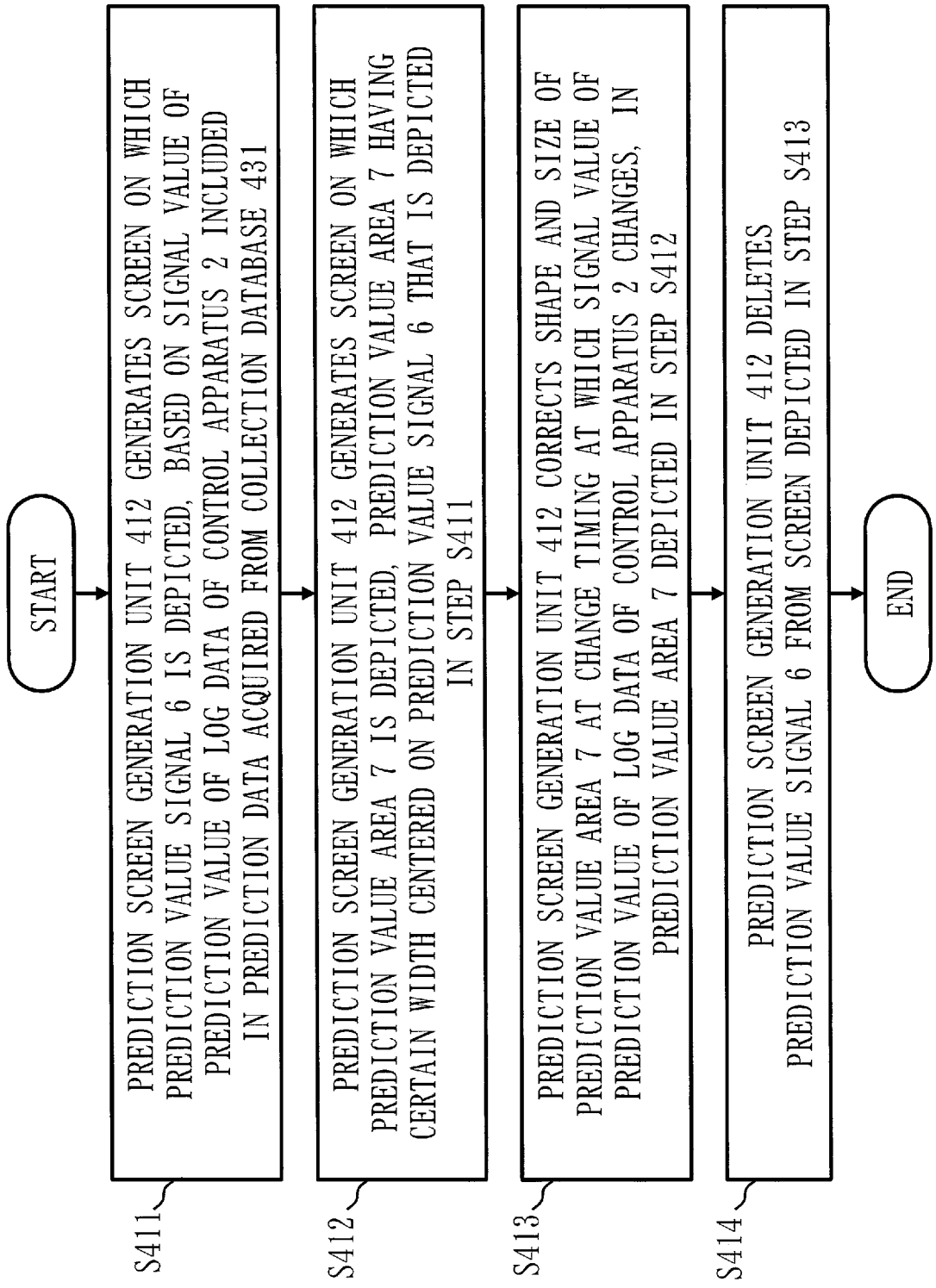
FIG. 16 is a flowchart illustrating an example of a generation process of the prediction screen according to the first embodiment of the present invention.

With reference to FIG. 16, a flow of the process will be described, in which the prediction screen generation unit 412 acquires the prediction data of the log data of the control apparatus 2 from the collection database 431 and generates the prediction screen in the four processes based on the signal value of the prediction value of the log data of the control apparatus 2 and the accuracy degree of the prediction value which are included in the acquired prediction data. FIG. 16 is a flowchart illustrating an example of a process of generating the prediction screen according to the first embodiment of the present invention.

First, in step S411 which is the first process, the prediction screen generation unit 412 generates a screen on which the prediction value signal 6 that is a signal wavelength of the prediction value is depicted based on the signal value of the prediction value of the log data of the control apparatus 2 included in the prediction data acquired from the collection database 431.

Next, in step S412 which is the second process, the prediction screen generation unit 412 generates a screen on which the prediction value area 7 is depicted, the prediction value area 7 having a certain width, being centered on the prediction value signal 6 that is depicted in step S411 being the first process. Here, the prediction screen generation unit 412 depicts the prediction value area 7 with a white area which has the certain width in white, centered on the prediction value signal 6, and also with dash lines surrounding the white area. The prediction screen generation unit 412 depicts areas other than the white area with diagonal lines.

Next, in step S413 which is the third process, in the prediction value area 7 depicted in step S412 which is the second process, the prediction screen generation unit 412 corrects the shape and size of the prediction value area 7 at the change timing at which the signal value of the prediction value of the log data of the control apparatus 2 changes. Specifically, the prediction screen generation unit 412 corrects the width W of the prediction value area 7 at the change timing at which the signal value of the prediction value of the log data of the control apparatus 2 changes, and corrects the angle θ of the dash line forming the prediction value area 7, based on the accuracy degree of the prediction value included in the prediction data acquired from the collection database 431.

Finally, in step S414 which is the fourth process, the prediction screen generation unit 412 deletes the prediction value signal 6 from the screen depicted in step S413 which is the third process, and ends the process of generating the prediction screen. Through these four processes, the prediction screen generation unit 412 generates the prediction screen. In this way, the prediction screen generated by the prediction screen generation unit 412 in step S303 illustrated in FIG. 15 is a screen on which the prediction value area 7 is emphasized.

Returning to FIG. 15, in step S304, the display screen generation unit 413 acquires the actual measurement value of the log data of the control apparatus 2 from the collection database 431, and the display screen generation unit 413 depicts the acquired actual measurement value of the log data of the control apparatus 2 on the prediction screen generated by the prediction screen generation unit 412 in step S403 to generate the display screen.

In step S305, the display control unit 414 displays on the display unit 46, the display screen generated by the display screen generation unit 413 in step S304, and then ends the process.

As described above, according to the display apparatus 4 of the first embodiment, the display apparatus, which displays the display screen for the log data that is the binary digital signal, can indicate that the log data deviates from the normal state and can also indicate the degree of the deviation, when the log data is in an anomalous state.

Besides, although the display system 100 in which the prediction value calculation apparatus 3 and the display apparatus 4 are separate entities has been described, it is not limited to the prediction value calculation apparatus 3 and the display apparatus 4 being separate entities, and the display system 100 may include a prediction value display apparatus in which the prediction value calculation apparatus 3 and the display apparatus 4 are integrally configured. If the display system 100 includes the prediction value display apparatus in which the prediction value calculation apparatus 3 and the display apparatus 4 are integrated, data communication between the prediction value calculation apparatus 3 and the display apparatus 4 is unnecessary, and the processing amount of the entire display system 100 can be reduced. Further, if the display system 100 includes the prediction value display apparatus in which the prediction value calculation apparatus 3 and the display apparatus 4 are integrated, the functions of the control unit 31 of the prediction value calculation apparatus 3 and the control unit 41 of the display apparatus 4 can be one control unit, and the number of components of the apparatus of the display system 100 can be reduced.

Besides, although a case has been described where the prediction screen generation unit 412 corrects based on the accuracy degree of the prediction value, both the width W and the angle θ of the area of the change timing at which the signal value of the prediction value changes in the prediction value area 7 of the display screen, it is not limited to correcting both the width W and the angle θ, and it is acceptable to correct only one of the width W or the angle θ. When correcting only one of the width W or the angle θ of the area of the change timing at which the signal value of the prediction value changes in the prediction value area 7 of the display screen, the processing amount of the process of generating the prediction screen by the prediction screen generation unit 412 can be reduced.

Besides, although, a case has been described where the normal model is a normal model generated by machine learning and the prediction value calculation apparatus 3 outputs to the display apparatus 4, the prediction data including the signal value of the prediction value and the accuracy degree of the prediction value, it is not limited to the case where the prediction value calculation apparatus 3 outputs to the display apparatus 4, the prediction data including the signal value of the prediction value and the accuracy degree of the prediction value, and it is acceptable that the prediction value calculation apparatus 3 outputs the prediction data including only the accuracy degree of the prediction value. In this case, the prediction screen generation unit 412 of the control unit 41 of the display apparatus 4 calculates the signal value of the prediction value based on the accuracy degree of the prediction value included in the prediction data acquired from the prediction value calculation apparatus 3.

Second Embodiment

In the first embodiment, the embodiment has been described, in which when the normal model is a normal model generated by machine learning, the signal value of the prediction value is set to be 1 when the probability that the signal value of the prediction value of the log data of the control apparatus 2 is 1 is 0.5 or more, and the signal value of the prediction value is set to be 0 when the probability that the signal value of the prediction value of the log data of the control apparatus 2 is 1 is less than 0.5, and the signal value of the prediction value of the log data of the control apparatus 2 always has one of two states, that is, 0 or 1. In a second embodiment, an embodiment will be described, in which when the normal model is a normal model generated by machine learning, the signal value of the prediction value of the log data of the control apparatus 2 has one of three states, that is, 0, 1, or none. Besides, since the configuration of the display system 100, the configuration of the prediction value calculation apparatus 3, the configuration of the display apparatus 4, the normal model generation process in the prediction value calculation apparatus 3, the prediction value calculation process in the prediction value calculation apparatus 3, and the display screen generation process in the display apparatus 4 are the same as those in the first embodiment, the descriptions are omitted. However, a calculation method in which the prediction value calculation unit 314 of the prediction value calculation apparatus 3 calculates the signal value of the prediction value of the log data of the control apparatus 2, and a generation process in which the prediction screen generation unit 412 of the display apparatus 4 generates the prediction screen, are different from those in the first embodiment, and details will be described later.

The prediction value calculation unit 314 illustrated in FIG. 6 acquires log data in the past of the control apparatus 2 from the collection database 331 of the memory 33, acquires the normal model from the normal model database 332, and calculates the prediction data of the log data of the control apparatus 2 based on the log data in the past of the control apparatus 2 acquired and the normal model acquired.

Besides, the normal model database 332 of the memory 33 is copied and stored from the storage 32 to the memory 33 when the prediction value calculation process starts in the control unit 31. Here, if the normal model is a normal model generated by machine learning, the prediction value calculation unit 314 calculates the probability that the signal value of the prediction value which is the next value of the log data of the control apparatus 2, is 1, by inputting to the normal model, the log data in the past of the control apparatus 2 acquired. Besides, the probability that the signal value of the prediction value of the log data of the control apparatus 2 calculated by the prediction value calculation unit 314 is 1 is the accuracy degree of the prediction value indicating the accuracy of the prediction value.

The prediction value calculation unit 314 calculates the signal value to be 1, of the prediction value of the log data of the control apparatus 2, when the probability of the calculated signal value of the prediction value being 1 is greater than or equal to a threshold value greater than 0.5. The prediction value calculation unit 314 calculates the signal value of the prediction value to be 0, of the log data of the control apparatus 2, when the probability of the calculated signal value of the prediction value being 1 is less than or equal to a threshold value smaller than 0.5. The prediction value calculation unit 314 calculates that there is no signal value of the prediction value of the log data of the control apparatus 2, when the probability of the calculated signal value of the prediction value being 1 is larger than the threshold value smaller than 0.5 and smaller than the threshold value larger than 0.5. Here, for example, the threshold value larger than 0.5 is 0.9, and the threshold value smaller than 0.5 is 0.1, for example. Thus, if the threshold value larger than 0.5 is 0.9 and the threshold value smaller than 0.5 is 0.1, the prediction value calculation unit 314 can set the signal value of the prediction value to 1 with a probability of 90% or more, when the signal value of the prediction value is 1. Also, the prediction value calculation unit 314 can set the signal value of the prediction value to 0 with a probability of 90% or more, when the signal value of the prediction value is 0. Further, the prediction value calculation unit 314 can set the signal value of the prediction value to none in other cases. Thus, the prediction value calculation unit 314 can calculate a more accurate signal value of the prediction value.

Figure 17:
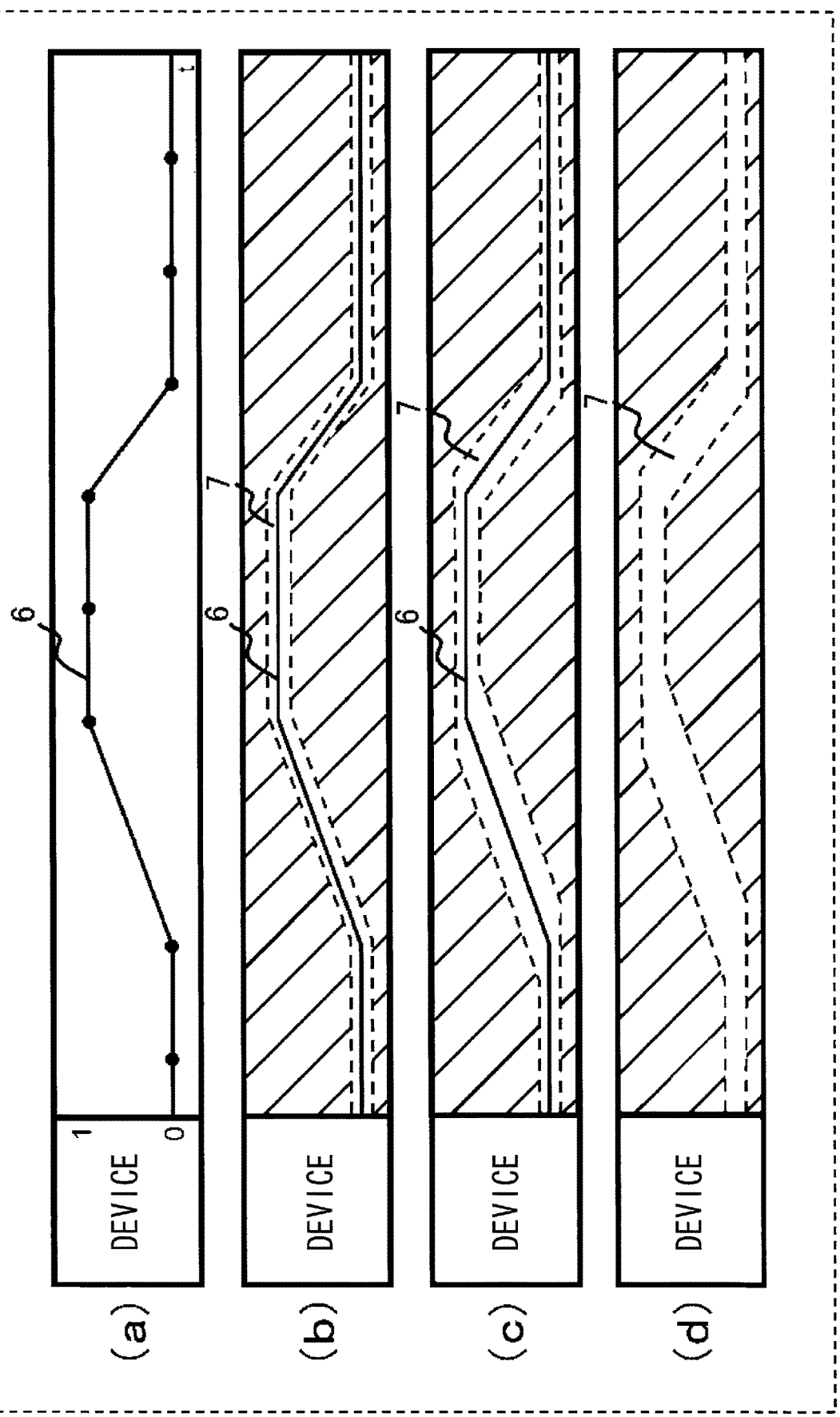
FIG. 17 is an explanatory diagram illustrating a generation process of a prediction screen according to a second embodiment of the present invention.

Next, a generation process in which the prediction screen generation unit 412 of the display apparatus 4 generates a prediction screen will be described with reference to FIG. 17. The prediction screen generation unit 412 executes the prediction screen generation in four processes. FIG. 17 is an explanatory diagram illustrating the process of generating the prediction screen according to the second embodiment of the present invention. (a) of FIG. 17 is an explanatory diagram explaining the first process of generating the prediction screen, (b) of FIG. 17 is an explanatory diagram explaining the second process of generating the prediction screen, (c) of FIG. 17 is an explanatory diagram explaining the third process of generating the prediction screen, and (d) of FIG. 17 is an explanatory diagram explaining the fourth process of generation of the prediction screen.

As illustrated in (a) of FIG. 17, in the first process of generating the prediction screen, the prediction screen generation unit 412 generates a screen depicting a name of the device 1 on the left side and depicting the prediction value signal 6 on the right side, the prediction value signal 6 being a signal wavelength of the acquired signal value of the log data of the control apparatus 2. In (a) of FIG. 17, in a screen on the right side depicting the signal wavelength of the prediction value, a vertical axis indicates a value of the signal value and a horizontal axis indicates time (t). The vertical axis indicates 0 or 1 as the value of the signal value, and the horizontal axis indicates the later time toward the right. Here, unlike the first embodiment, the prediction screen generation unit 412 plots the signal values of the prediction values (black circles illustrated in (a) of FIG. 17), and depicts the prediction value signal 6 by connecting the plotted signal values of the prediction values. Besides, as illustrated in (a) of FIG. 17, the point indicated by black circle is a points where the signal value of the prediction value is 0 or 1, and the third vacant point from the left is a point where there is no signal value of the prediction value. Also, the prediction screen generation unit 412 acquires the device distinction data from the collection database 431 and depicts a screen on the left side depicting the name of the device 1 in (a) of FIG. 17, based on the acquired device distinction data.

As illustrated in (b) of FIG. 17, in the second process of generating the prediction screen, the prediction screen generation unit 412 depicts a prediction value area 7 having a certain width centered on the prediction value signal 6 depicted in the first process. Here, the prediction value area 7 is an area having the constant width centered on the prediction value signal 6, and has a white area illustrated in white and dash lines surrounding the white area. Besides, the prediction screen generation unit 412 depicts other areas with diagonal lines in order to emphasize the prediction value area 7. Also, in (b) of FIG. 17, although a case has been described where the prediction screen generation unit 412 depicts the prediction value area 7 in white and the other areas with the diagonal lines, it is not limited to depicting the prediction value area 7 in white and the other areas with the diagonal lines, and the prediction value area 7 may be depicted so as to be filled with another color, for example, red, and the other areas with a color other than diagonal lines, for example, black. It is sufficient if a depiction can indicate that the prediction value area 7 is different from other areas. By depicting in this way, the prediction value area 7 in (b) of FIG. 17 can indicate the prediction value signal 6 with an emphasis on the prediction value signal 6. Besides, in (b) of FIG. 17, although the dash lines forming the prediction value area 7 are indicated as straight dash lines, it is not limited to the dash lines forming the prediction value area 7 being the straight dash lines, and the dash lines forming the prediction value area 7 may be curved dash lines, or the dash lines forming the prediction value area 7 may be straight lines rounded only around vertexes.

As illustrated in (c) of FIG. 17, in the third process of generating the prediction screen, in the white area which is the prediction value area 7 depicted in the second process, for an area of the change timing at which the signal value of the prediction value changes, that is, an area where the prediction value signal 6 is a diagonal line, the prediction screen generation unit 412 corrects a size of the area based on the depicted prediction value signal 6.

Figure 18:
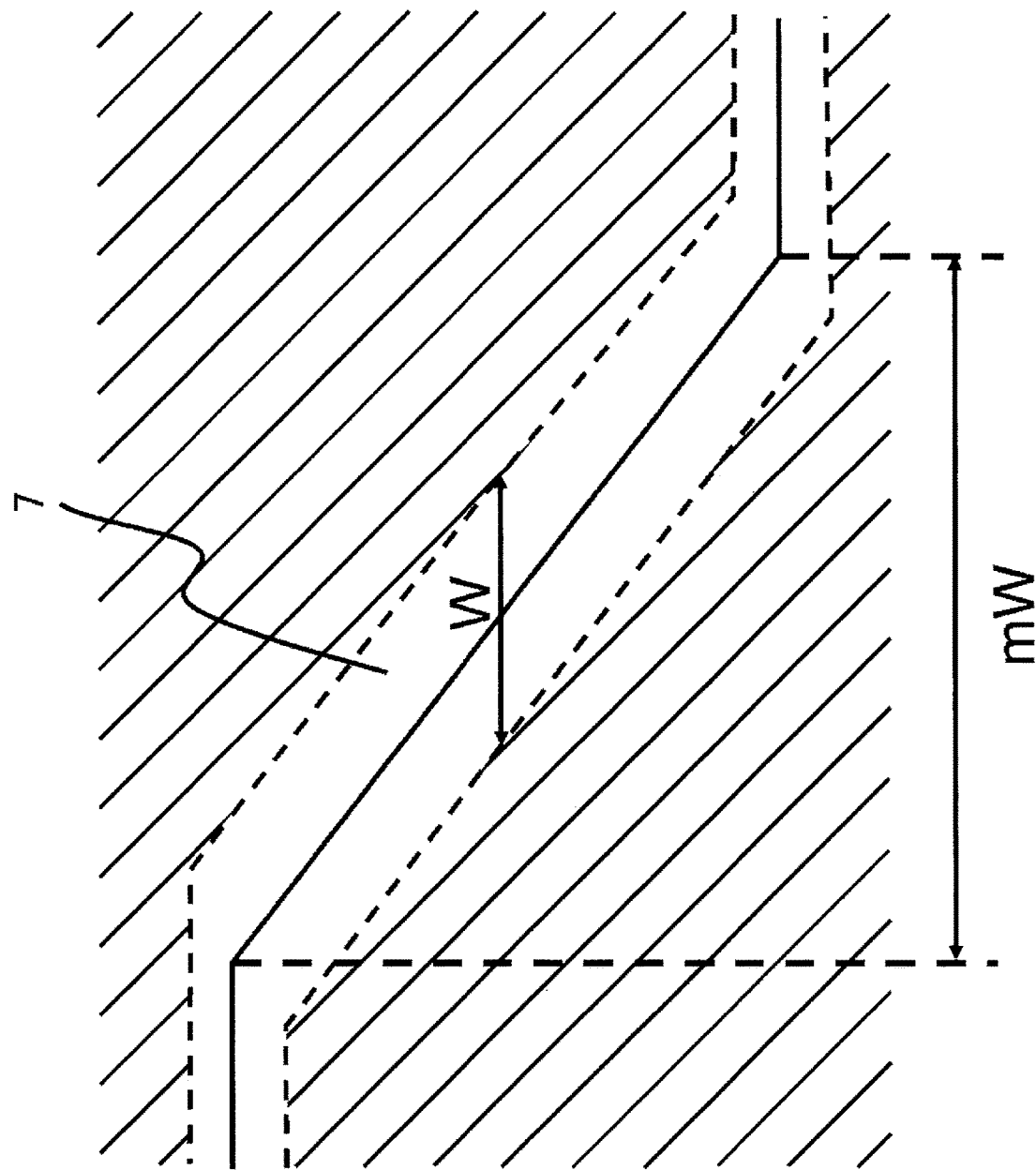
FIG. 18 is an explanatory diagram illustrating an example of a correction method of a prediction value area of the prediction screen according to the second embodiment of the present invention.

FIG. 18 is an explanatory diagram illustrating an example of a method of correcting the prediction value area of the prediction screen according to the second embodiment of the present invention. As illustrated in FIG. 18, in the third process of generating the prediction screen, the prediction value area 7 of the prediction screen which has been corrected by the prediction screen generation unit 412 is indicated as a white area surrounded by dash lines and has a width W. Here, the width W of the prediction value area 7 is a value acquired by multiplying a width mW of the change timing of the prediction value signal 6 by a predetermined constant, for example, 0.5 or one-third. Alternatively, the width W of the prediction value area 7 is a value acquired by multiplying the width mW of the change timing of the prediction value signal 6 by a number based on the accuracy degree of the prediction value in a plurality of prediction values forming the change timing of the prediction value signal 6, for example, an average of absolute values of values acquired by subtracting the accuracy degree of the prediction value of each prediction value from 0.5. That is, when there are three prediction values forming the change timing of the prediction value signal 6 and the accuracy degree of each prediction value is 0.1, 0.4, and 0.9, the absolute value of the value acquired by subtracting the accuracy degree of each prediction value from 0.5 is 0.4, 0.1, and 0.4. Thus, the average is 0.3, and the width W of the prediction value area is a value acquired by multiplying the width mW of the change timing of the prediction value signal 6 by 0.3. In this way, the width W of the prediction value area 7 is a value based on the width mW of the change timing of the prediction value signal 6, and thus is a value that reflects time taken for the change of the signal value of the prediction value.

Returning to FIG. 17, as illustrated in (d) of FIG. 17, in the fourth process of generating the prediction screen, the prediction screen generation unit 412 deletes the prediction value signal 6 depicted in the first process of generating the prediction screen. As a result, the right side of the prediction screen indicates only the prediction value area 7. Here, since the prediction value area 7 reflects the time taken for the change of the signal value of the prediction value, the prediction value area 7 indicates a range of the normal state of the log data of the control apparatus 2. Therefore, the user can visually recognize the range of the normal state of the log data of the control apparatus 2 by the prediction screen illustrating only the prediction value area 7, which is generated by the prediction screen generation unit 412.

Figure 19:
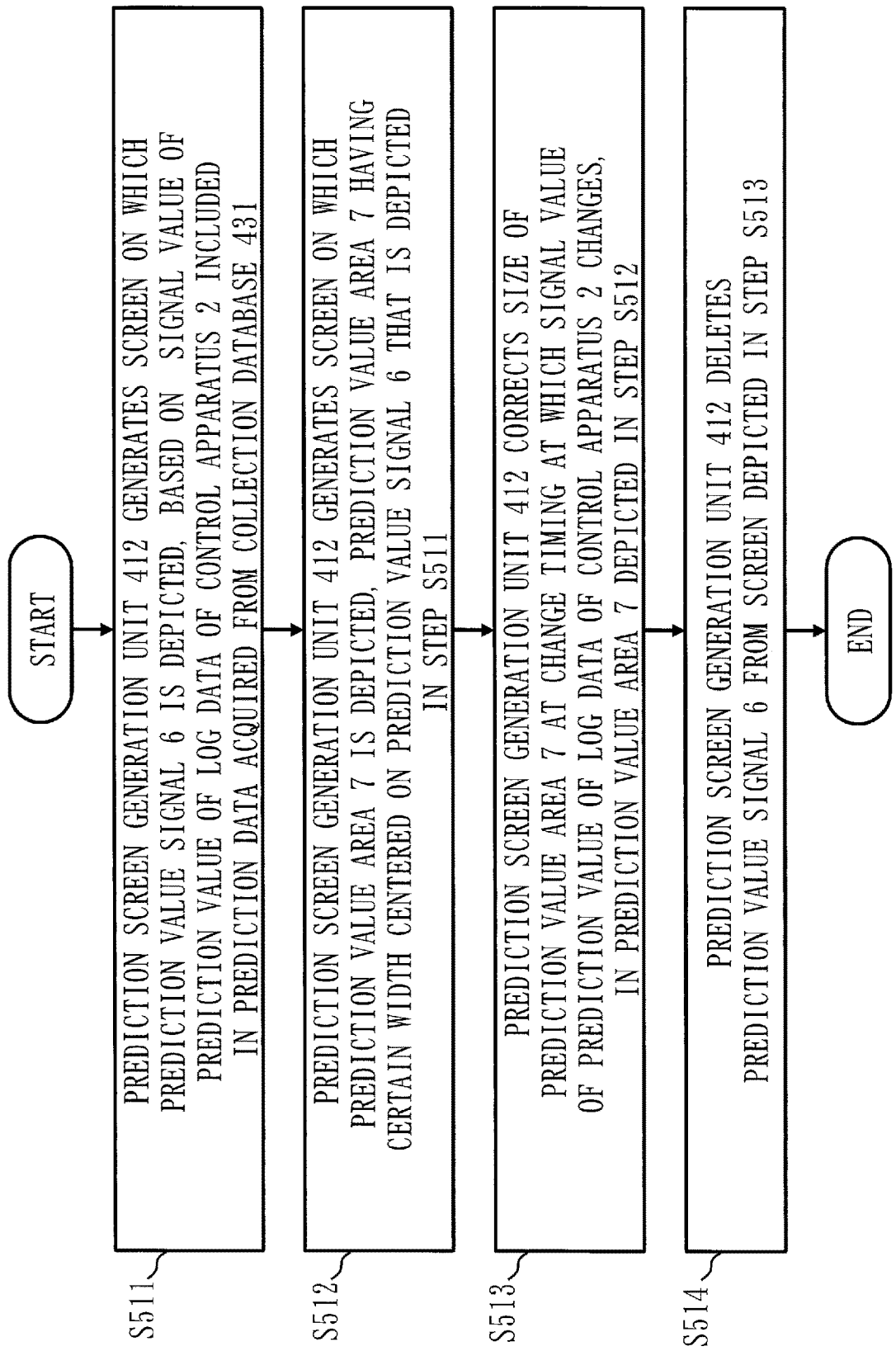
FIG. 19 is a flowchart illustrating an example of a generation process of the prediction screen according to the second embodiment of the present invention.

Next, with reference to FIG. 19, a flow of process will be described, in which the prediction screen generation 412 acquires the prediction data of the log data of the control apparatus 2 from the collection database 431 and generates the prediction screen in the four processes based on the signal value of the prediction value of the log data of the control apparatus 2 included in the acquired prediction data. FIG. 19 is a flowchart illustrating an example of a process of generating a prediction screen according to the second embodiment of the present invention.

First, in step S511 which is the first process, the prediction screen generation unit 412 generates a screen on which the prediction value signal 6 that is a signal wavelength of the prediction value is depicted based on the signal value of the prediction value of the log data of the control apparatus 2 included in the prediction data acquired from the collection database 431. Here, the prediction screen generation unit 412 plots the signal values of the prediction values and depicts the prediction value signal 6 by connecting the plotted signal values of the prediction values.

Next, in step S512 which is the second process, the prediction screen generation unit 412 generates a screen on which the prediction value area 7 is depicted, the prediction value area 7 having a certain width, being centered on the prediction value signal 6 depicted in step S511 being the first process. Here, the prediction screen generation unit 412 depicts the prediction value area 7 with a white area which has the certain width in white, centered on the prediction value signal 6, and also with dash lines surrounding the white area. The prediction screen generation unit 412 depicts areas other than the white area with diagonal lines.

Next, in step S513 which is the third process, in the prediction value area 7 depicted in step S512 which is the second process, the prediction screen generation unit 412 corrects the size of the prediction value area 7 at the change timing at which the signal value of the prediction value of the log data of the control apparatus 2 changes. Specifically, the prediction screen generation unit 412 corrects the width W of the prediction value area 7 at the change timing at which the signal value of the prediction value of the log data of the control apparatus 2 changes, based on the prediction value signal 6 depicted in step S511.

Finally, in step S514 which is the fourth process, the prediction screen generation unit 412 deletes the prediction value signal 6 from the screen depicted in step S513 which is the third process, and ends the prediction screen generation process. Through these four processes, the prediction screen generation unit 412 generates the prediction screen. In this way, the prediction screen generated by the prediction screen generation unit 412 is a screen on which the prediction value area 7 is emphasized.

As described above, according to the display apparatus 4 of the second embodiment, the display apparatus which displays the display screen for the log data that is the binary digital signal, can indicate that the log data deviates from the normal state, and can also indicate the degree of the deviation, when the log data is in an anomalous state.

Besides, although the case has been described where the prediction value calculation apparatus 3 outputs to the display apparatus 4, the prediction data including the signal value of the prediction value and the accuracy degree of the prediction value, it is not limited to the case where the prediction value calculation apparatus 3 outputs to the display apparatus 4, the prediction data including the signal value of the prediction value and the accuracy degree of the prediction value, and it is acceptable that the prediction value calculation apparatus 3 outputs the prediction data including only the accuracy degree of the prediction value. In this case, the prediction screen generation unit 412 of the control unit 41 of the display apparatus 4 calculates the signal value of the prediction value based on the accuracy degree of the prediction value included in the prediction data acquired from the prediction value calculation apparatus 3.

Third Embodiment

In the first embodiment, the embodiment has been described in which the prediction screen generation unit 412 of the control unit 41 of the display apparatus 4 calculates the angle θ of the prediction value area 7 based on the standard deviation that is the accuracy degree of the prediction value if the normal model is a normal model generated by statistical processing. In a third embodiment, an embodiment will be described in which the prediction screen generation unit 412 of the control unit 41 of the display apparatus 4 corrects the shape and size of the prediction value area 7 using a normal distribution calculated based on the standard deviation that is the accuracy degree of the prediction value if the normal model is a normal model generated by statistical processing. Since the configuration of the display system 100, the configuration of the prediction value calculation apparatus 3, the configuration of the display apparatus 4, the normal model generation process in the prediction value calculation apparatus 3, the prediction value calculation process in the prediction value calculation apparatus 3, and the display screen generation process in the display apparatus 4 are the same as those in the first embodiment, the descriptions are omitted. However, the generation process in which the prediction screen generation unit 412 of the display apparatus 4 generates the prediction screen is different from that of the first embodiment, and details thereof will be described later.

Figure 20:
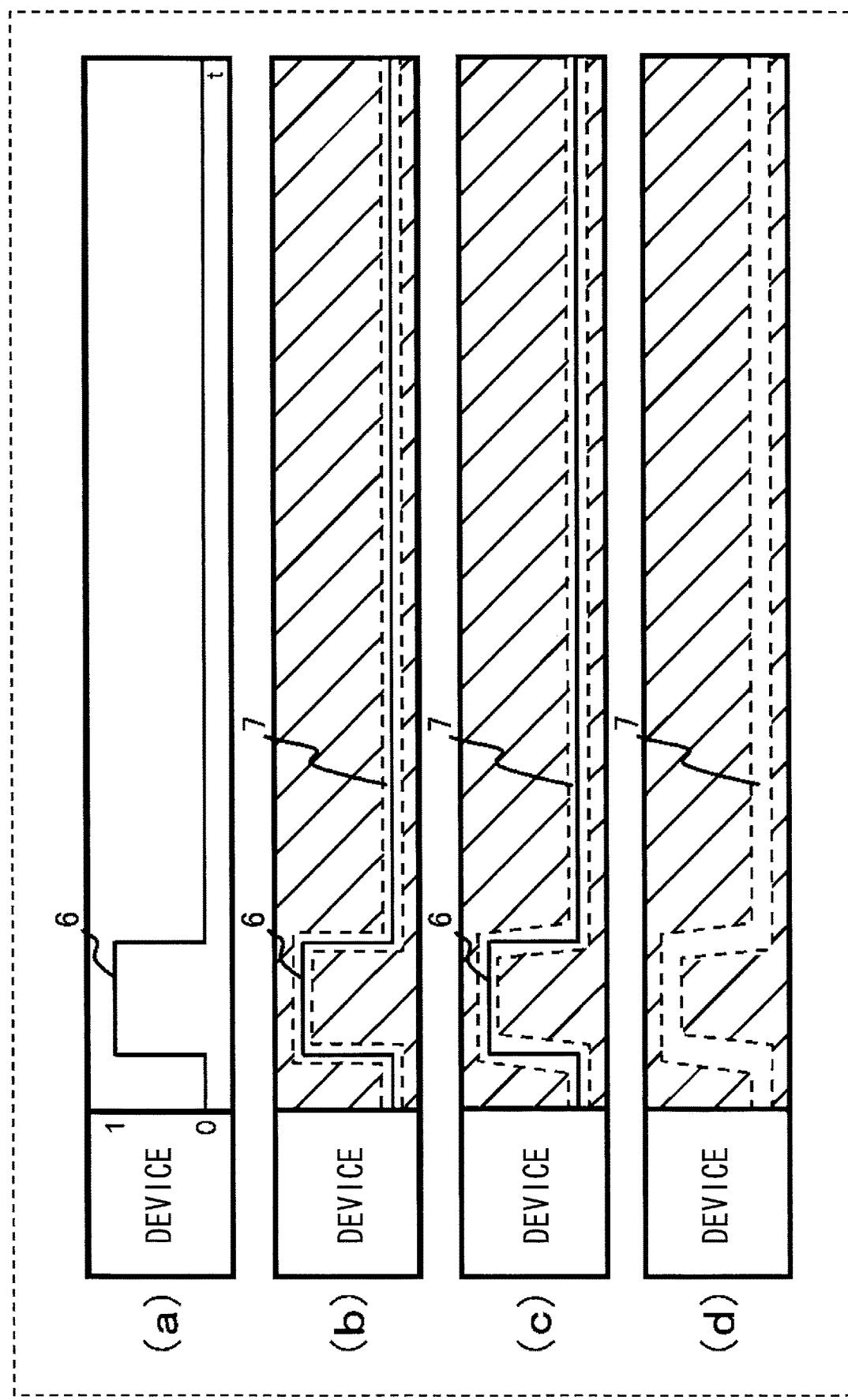
FIG. 20 is an explanatory diagram illustrating a generation process of a prediction screen according to a third embodiment of the present invention.

The generation process in which the prediction screen generation unit 412 of the display apparatus 4 generates the prediction screen will be described with reference to FIG. 20. The prediction screen generation unit 412 executes the prediction screen generation in four processes. FIG. 20 is an explanatory diagram illustrating a process of generating the prediction screen according to the third embodiment of the present invention. (a) of FIG. 20 is an explanatory diagram explaining the first process of generating the prediction screen, (b) of FIG. 20 is an explanatory diagram explaining the second process of generating the prediction screen, (c) of FIG. 20 is an explanatory diagram explaining the third process of generating the prediction screen, and (d) of FIG. 20 is an explanatory diagram explaining the fourth process of generating the prediction screen.

As illustrated in (a) of FIG. 20, in the first process of generating the prediction screen, the prediction screen generation unit 412 generates a screen depicting a name of the device 1 on the left side and depicting the prediction value signal 6 on the right side, the prediction value signal 6 being a signal wavelength of the acquired signal value of the log data of the control apparatus 2. Here, in (a) of FIG. 20, the prediction value signal 6 depicted by the prediction value screen generation unit 412 is a rectangular wave. In a screen on the right side depicting the signal wavelength of the prediction value, a vertical axis indicates a value of the signal value and a horizontal axis indicates time (t). The vertical axis indicates 0 or 1 as the value of the signal value, and the horizontal axis indicates the later time toward the right. Also, the prediction screen generation unit 412 acquires the device distinction data from the collection database 431 and depicts a screen on the left side depicting the name of the device 1 in (a) of FIG. 20, based on the acquired device distinction data.

As illustrated in (b) of FIG. 20, in the second process of generating the prediction screen, the prediction screen generation unit 412 depicts a prediction value area 7 having a certain width centered on the prediction value signal 6 depicted in the first process. Here, the prediction value area 7 is an area having the constant width centered on the prediction value signal 6, and has a white area illustrated in white and dash lines surrounding the white area. Also, the prediction screen generation unit 412 depicts other areas with diagonal lines in order to emphasize the prediction value area 7. Besides, in (b) of FIG. 20, although a case has been described where the prediction screen generation unit 412 depicts the prediction value area 7 in white and the other areas with the diagonal lines, it is not limited to depicting the prediction value area 7 in white and the other areas with the diagonal lines, and the prediction value area 7 may be depicted so as to be filled with another color, for example, red, and the other areas with a color other than the diagonal lines, for example, black. It is sufficient if a depiction can indicate that the prediction value area 7 is different from other areas. By depicting in this way, the prediction value area 7 in (b) of FIG. 20 can indicate the prediction value signal 6 with an emphasis on the prediction value signal 6. Besides, in (b) of FIG. 20, although the dash lines forming the prediction value area 7 are indicated as straight dash lines, it is not limited to the dash lines forming the prediction value area 7 being the straight dash lines, and the dash lines forming the prediction value area 7 may be curved dash lines, or the dash lines forming the prediction value area 7 may be straight lines rounded only around vertexes.

As illustrated in (c) of FIG. 20, in the third process of generating the prediction screen, in the white area which is the prediction value area 7 depicted in the second process, for an area of the change timing at which the signal value of the prediction value changes, that is, the area where the prediction value signal 6 is a diagonal line, the prediction screen generation unit 412 corrects a shape and size of the area based on the standard deviation, which is the accuracy degree of the prediction value. Here, the process of correction in which the prediction screen generation unit 412 corrects the prediction value area 7 based on the standard deviation that is the accuracy degree of the prediction value will be described with reference to FIG. 21. The prediction screen generation unit 412 executes the correction of the prediction value area 7 in five processes.

Figure 21:
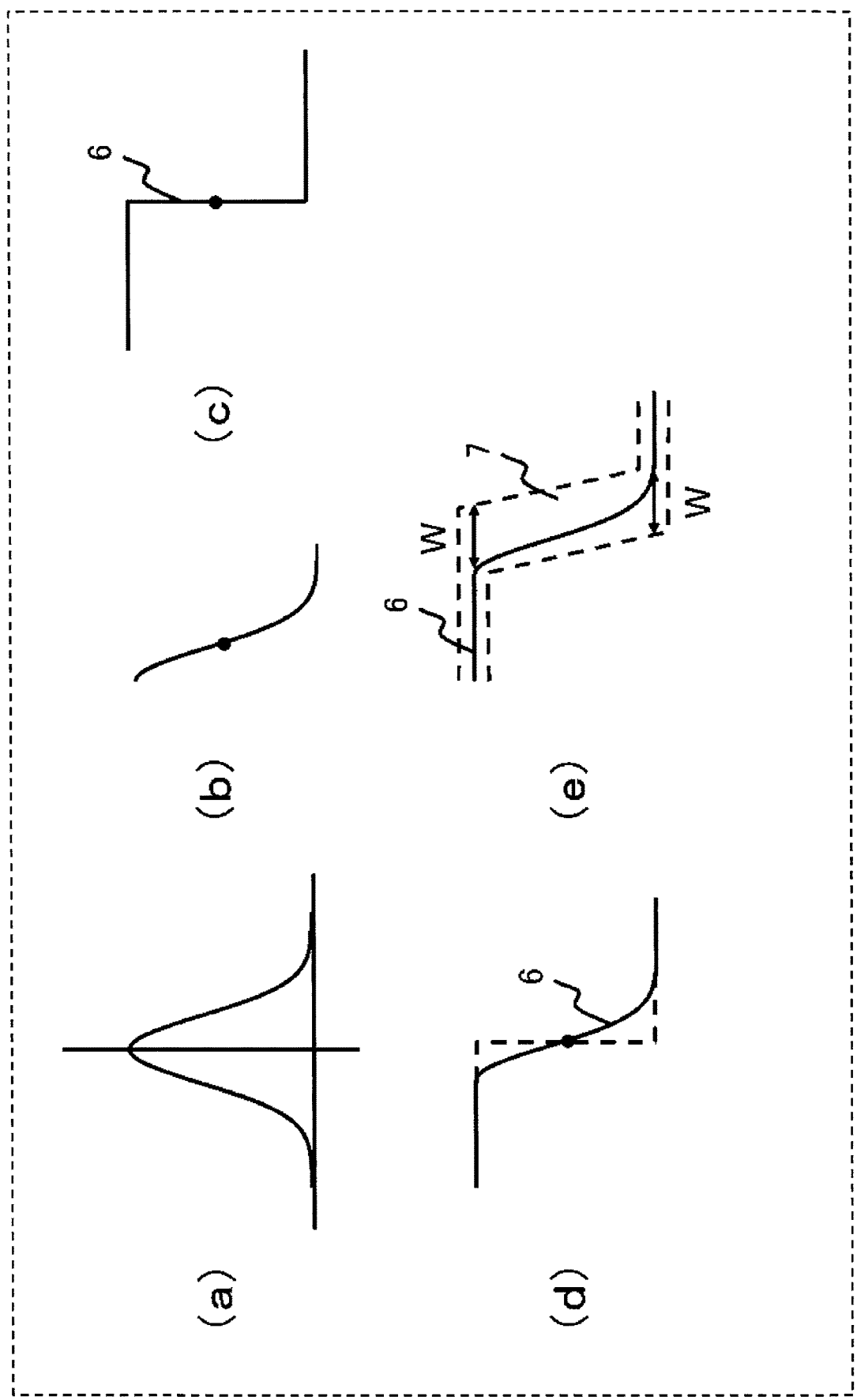
FIG. 21 is an explanatory diagram illustrating an example of a correction method of a prediction value area of the prediction screen according to the third embodiment of the present invention.

FIG. 21 is an explanatory diagram illustrating an example of a method of correcting the prediction value area of the prediction screen according to the third embodiment of the present invention. (a) of FIG. 21 illustrates a normal distribution based on the standard deviation which is the first process of correcting the prediction value area 7, (b) of FIG. 21 illustrates a correction-purpose signal wavelength which is the second process of the correcting the prediction value area 7, (c) of FIG. 21 illustrates a correction signal wavelength which is the signal wavelength of the prediction value signal 6 to be corrected which is the third process of the correcting the prediction value area 7, (d) of FIG. 21 illustrates the signal wavelength of the corrected prediction value signal 6 which is the fourth process of the correcting the prediction value area 7, and (e) of FIG. 21 illustrates a corrected prediction value area 7 which is the fifth process of the correcting the prediction value area 7.

(a) of FIG. 21 illustrates the normal distribution based on the standard deviation that is the accuracy degree of the prediction value, and a vertical axis illustrates a probability density. As illustrated in (a) of FIG. 21, in the first process of correcting the prediction value area 7, the prediction screen generation unit 412 calculates the normal distribution corresponding to the change timing of the signal value of the prediction value based on the standard deviation that is the accuracy degree of the prediction value.

(b) of FIG. 21 illustrates the correction-purpose signal wavelength for correcting the signal wavelength of the prediction value signal 6, which is a shape of a right half of the normal distribution calculated in the first process of correction of the prediction value area 7 illustrated in (a) of FIG. 21. Here, a black circle in (b) of FIG. 21 indicates a center point of the drawing. As illustrated in (b) of FIG. 21, in the second process of correcting the prediction value area 7, the prediction screen generation unit 412 extracts, as the correction-purpose signal wavelength for correcting the signal wavelength of the prediction value signal 6, a half of the normal distribution calculated in the first process of correcting the prediction value area 7, that is, the shape of the right half Besides, in (b) of FIG. 21, the prediction screen generation unit 412 extracts the shape of the right half of the normal distribution, and this is because the signal wavelength of the prediction value signal 6 to be corrected after (c) of FIG. 21 is a signal wavelength changing from the signal value 1 to 0, and if the signal wavelength of the prediction value signal 6 to be corrected is a signal wavelength changing from the signal value 0 to 1, the prediction screen generation unit 412 extracts a shape of a left half of the normal distribution.

(c) of FIG. 21 illustrates the correction signal wavelength which is a signal wavelength of the prediction value signal 6 to be corrected, which is a signal wavelength corresponding to the change timing of the signal value of the prediction value signal 6 in signal wavelengths of the prediction value signals 6 depicted by the prediction screen generation unit 412 illustrated in (a) of FIG. 21. Here, a black circle in (c) of FIG. 21 indicates a center point of the drawing. As illustrated in (c) of FIG. 21, in the third process of correcting the prediction value area 7, the prediction screen generation unit 412 specifies the signal wavelength of the prediction value signal 6 at the change timing of the signal value of the prediction value as the correction signal wavelength to be corrected.

(d) of FIG. 21 illustrates the signal wavelength of the prediction value signal 6 after correction. Here, a black circle in (d) of FIG. 21 indicates a center point of the drawing, and a dash line indicates a signal wavelength of the prediction value signal 6 which is the correction signal wavelength illustrated in (c) of FIG. 21. As illustrated in (d) of FIG. 21, in the fourth process of correcting the prediction value area 7, the prediction screen generation unit 412 make a correction by replacing the prediction value signal 6 which is the correction signal wavelength specified in the third process of correcting the prediction value area 7, with the shape of the right half of the normal distribution, which is the correction-purpose signal wavelength extracted in the second process of correcting the prediction value area 7, centering on the black circles at the center points. Here, during the correction, in order for vertical length of the shape of the right half of the normal distribution to match vertical length of the prediction value signal 6, the prediction screen generation unit 412 enlarges the shape of the right half of the normal distribution which is the correction-purpose signal wavelength, and performs replacement, the shape of the right half of the normal distribution being the extracted correction-purpose signal wavelength, the prediction value signal 6 being the correction signal wavelength. Since the prediction value signal 6 is thus corrected, the shape of the prediction value area 7 formed based on the prediction value signal 6 is also corrected.

(e) of FIG. 21 illustrates the corrected prediction value area 7 having a width W. As illustrated in (e) of FIG. 21, in the fifth process of correcting the prediction value area 7, the prediction screen generation unit 412 performs correction to widen the prediction value area 7 by the width W from the point where the signal value deviates from 0 or 1 in the prediction value signal 6 corrected in the fourth process of correcting the prediction value area 7. Here, the width W of the prediction value area 7 is a value acquired by multiplying the standard deviation which is the accuracy degree of the prediction value, by a predetermined constant. Besides, in (e) of FIG. 21, although the corrected prediction value area 7 is indicated by an area surrounded by straight dash lines, it is not limited to the area being surrounded by straight dash lines, and the area may be an area surrounded by curved dash lines. If the corrected prediction value area 7 is surrounded by the curved dash lines, the curved dash lines have a shape based on a shape of the right half of the normal distribution illustrated in (b) of FIG. 21, such as a shape acquired by vertically or horizontally expanding or contracting the shape of the right half of the normal distribution illustrated in (b) of FIG. 21. Also, the predetermined constant to be multiplied when calculating the width W of the prediction value is any value determined based on a size of the display unit 46 or a size of the display screen generated in the display screen generation process by the control unit 41. As a result, the width W of the prediction value area 7 becomes a value that reflects the accuracy degree of the prediction value.

Returning to FIG. 20, as illustrated in (d) of FIG. 20, in the fourth process of generating the prediction screen, the prediction screen generation unit 412 deletes the prediction value signal 6 depicted in the first process of generating the prediction screen. As a result, the right side of the prediction screen illustrates only the prediction value area 7. Here, since the prediction value area 7 reflects the accuracy degree of the prediction value, the prediction value area 7 indicates the range of the normal state of the log data of the control apparatus 2. Therefore, by the prediction screen illustrating only the prediction value area 7 generated by the prediction screen generation unit 412, the user can visually recognize the range of the normal state of the log data of the control apparatus 2.

Figure 22:
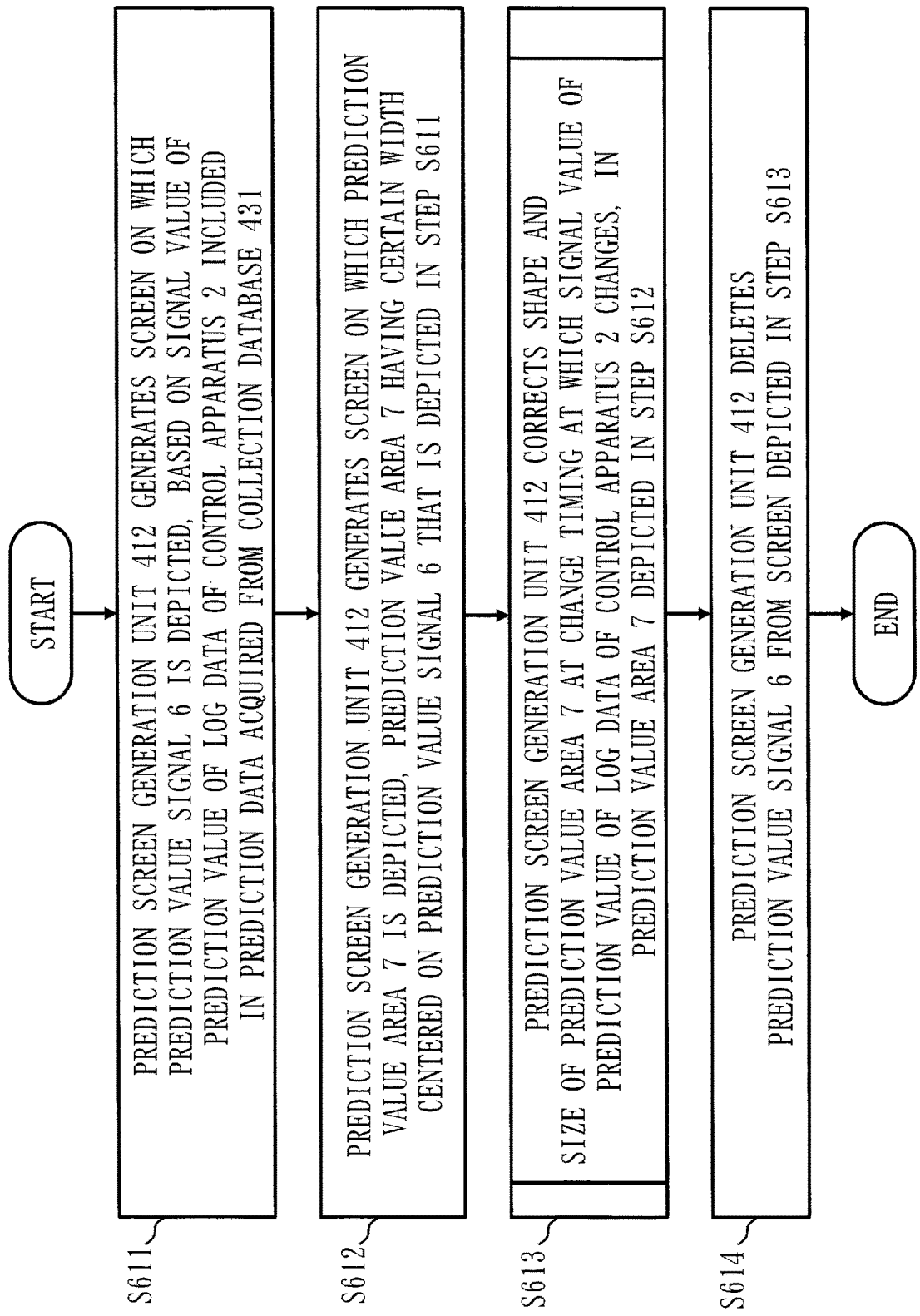
FIG. 22 is a flowchart illustrating an example of a generation process of the prediction screen according to the third embodiment of the present invention.

Next, with reference to FIG. 22, a flow of process will be described, in which the prediction screen generation 412 acquires the prediction data of the log data of the control apparatus 2 from the collection database 431, and generates the prediction screen in four processes based on the signal value of the prediction value of the log data of the control apparatus 2 included in the acquired prediction data and the standard deviation which is the accuracy degree of the prediction value. FIG. 22 is a flowchart illustrating an example of the process of generating the prediction screen according to the third embodiment of the present invention.

First, in step S611 which is the first process, the prediction screen generation unit 412 generates a screen on which the prediction value signal 6 that is a signal wavelength of the prediction value is depicted, based on the signal value of the prediction value of the log data of the control apparatus 2 included in the prediction data acquired from the collection database 431. Here, the prediction screen generation unit 412 plots the signal values of the prediction values and depicts the prediction value signal 6 by connecting the plotted signal values of the prediction values.

Next, in step S612 which is the second process, the prediction screen generation unit 412 generates a screen on which the prediction value area 7 is depicted, the prediction value area 7 having a certain width, being centered on the prediction value signal 6 depicted in step S611 being the first process. Here, the prediction screen generation unit 412 depicts the prediction value area 7 with a white area which has the certain width in white, centered on the prediction value signal 6, and also with dash lines surrounding the white area. The prediction screen generation unit 412 depicts areas other than the white area with diagonal lines.

Figure 23:
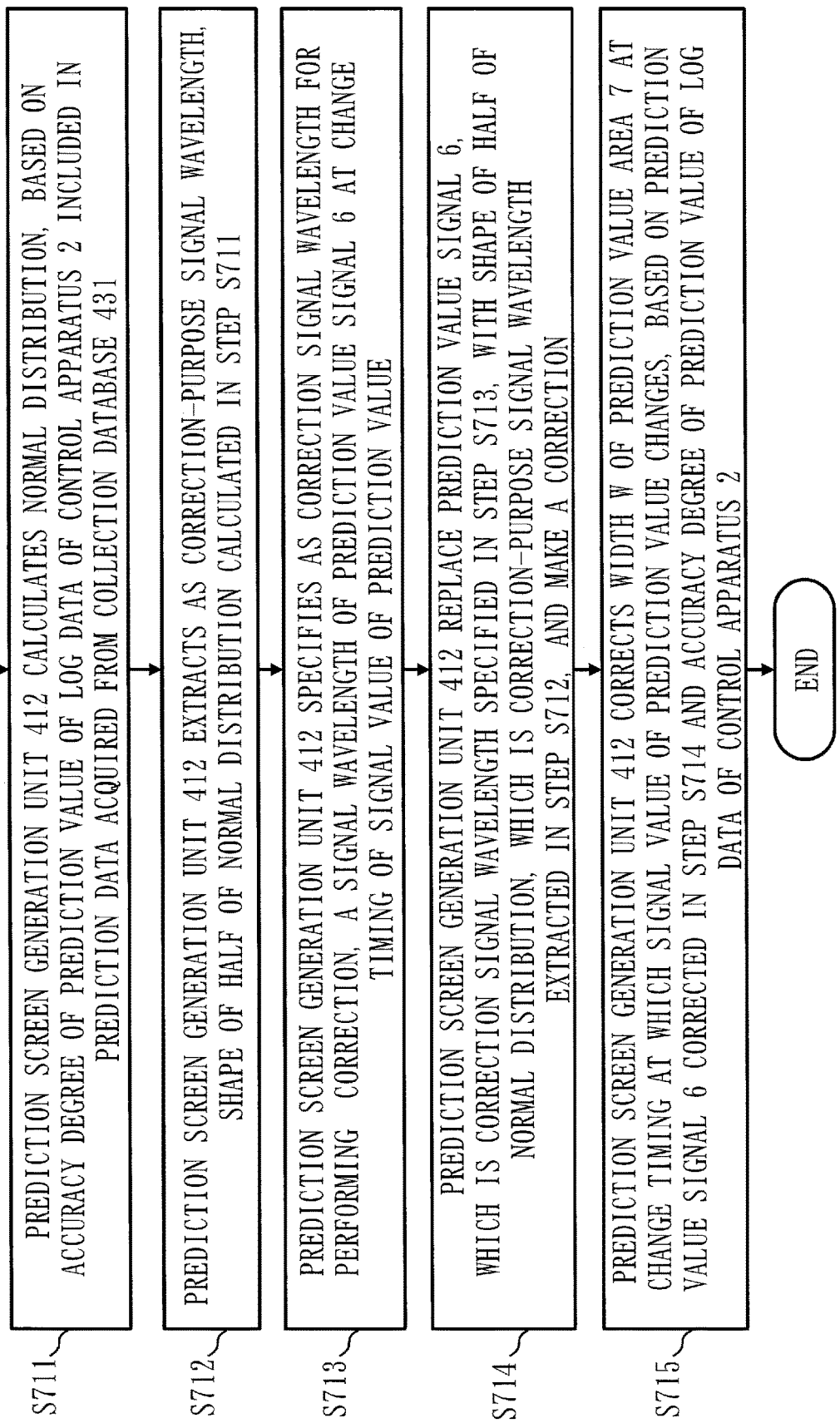
FIG. 23 is a flowchart illustrating an example of a correction process of the prediction value area according to the third embodiment of the present invention.

Next, in step S613 which is the third process, in the prediction value area 7 depicted in step S612 which is the second process, the prediction screen generation unit 412 corrects the shape and size of the prediction value area 7 at the change timing at which the signal value of the prediction value of the log data of the control apparatus 2 changes. Specifically, the prediction screen generation unit 412 corrects the width W of the prediction value area 7 at the change timing at which the signal value of the prediction value of the log data of the control apparatus 2 changes, based on the prediction value signal 6 depicted based on the signal value of the prediction value of the log data of the control apparatus 2 in step S611 which is the first process, and also based on the standard deviation that is the accuracy degree of the prediction value. Here, a flow of a process for correcting the prediction value area 7 in five processes based on the signal value of the prediction value of the log data of the control apparatus 2 and the standard deviation which is the accuracy degree of the prediction value, will be described with reference to FIG. 23. FIG. 23 is a flowchart illustrating an example of the process of correcting the prediction value area according to the third embodiment of the present invention.

First, in step S711 which is the first process, the prediction screen generation unit 412 calculates a normal distribution based on the standard deviation that is the accuracy degree of the prediction value of the log data of the control apparatus 2 included in the prediction data acquired from the collection database 431. Here, the prediction screen generation unit 412 calculates the normal distribution corresponding to the change timing of the depicted prediction signal 6.

Next, in step S712 which is the second process, the prediction screen generation unit 412 extracts, as the correction-purpose signal wavelength for correcting the signal wavelength of the prediction value signal 6, a shape of a half of the normal distribution calculated in step S711 which is the first process. Here, when the signal wavelength of the prediction value signal 6 to be corrected is a signal wavelength changing from the signal value 1 to 0, the prediction screen generation unit 412 extracts a right half of the calculated normal distribution. When the signal wavelength of the prediction value signal 6 to be corrected is a signal wavelength changing from the signal value 0 to 1, the prediction screen generation unit 412 extracts a left half of the calculated normal distribution.

Next, in step S713 which is the third process, the prediction screen generation unit 412 specifies as the correction signal wavelength for performing the correction, a signal wavelength of the prediction value signal 6 at the change timing of the signal value of the prediction value.

Next, in step S714 which is the fourth process, the prediction screen generation unit 412 replace the prediction value signal 6 which is the correction signal wavelength specified in step S713 which is the third process, with the shape of the half of the normal distribution, which is the correction-purpose signal wavelength extracted in step S712 which is the second process, and make a correction. Here, during correction, the prediction screen generation unit 412 enlarges the shape of the half of the normal distribution, which is the correction-purpose signal wavelength, so that the vertical length of the shape of the half of the normal distribution which is the extracted correction signal-purpose wavelength, matches the vertical length of the prediction value signal 6 which is the correction signal wavelength. Then, the prediction screen generation unit 412 makes the correction by performing replacement while matching the centers. Since the prediction value signal 6 is thus corrected, the shape of the prediction value area 7 formed based on the prediction value signal 6 is also corrected.

Finally, in step S715 which is the fifth process, the prediction screen generation unit 412 corrects the width W of the prediction value area 7 at the change timing at which the signal value of the prediction value of the log data of the control apparatus 2 changes, based on the prediction value signal 6 corrected in step S714 which is the fourth process and the standard deviation which is the accuracy degree of the prediction value of the log data of the control apparatus 2, and ends the process of correcting the prediction value area. Here, the width W of the prediction value area 7 is a value acquired by multiplying the standard deviation which is the accuracy degree of the prediction value, by a predetermined constant. Besides, the predetermined constant to be multiplied when calculating the width W of the prediction value is any value determined based on the size of the display unit 46 or the size of the display screen generated in the display screen generation process by the control unit 41.

Also, the prediction screen generation unit 412 corrects the prediction value area 7 through these five processes.

Returning to FIG. 22, in step S614 which is the fourth process, the prediction screen generation unit 412 deletes the prediction value signal 6 from the screen depicted in step S613 which is the third process, and ends the process of generating the prediction screen. Through these four processes, the prediction screen generation unit 412 generates the prediction screen. In this way, the prediction screen generated by the prediction screen generation unit 412 is a screen on which the prediction value area 7 is emphasized.

As described above, according to the display apparatus 4 of the third embodiment, the display apparatus which displays the display screen for log data that is a binary digital signal, can indicate that the log data deviates from the normal state, and can also indicate the degree of the deviation, when the log data is in the anomalous state.

Fourth Embodiment

In the first embodiment, an embodiment has been described in which, when the log data is in an anomalous state, the display screen on which the prediction value area 7 is depicted can indicate that the log data deviates from the normal state and can also indicate the degree of the deviation. In the fourth embodiment, an embodiment will be described in which a display screen is a superimposed display screen where an anomaly icon is superimposed, the anomaly icon indicating magnitude of the degree of the deviation when the actual measurement value of the log data of the control apparatus 2 deviates from the normal state, and also indicating the deviation direction. Since the configuration of the display system 100, the configuration of the prediction value calculation apparatus 3, the configuration of the display apparatus 4, the normal model generation process in the prediction value calculation apparatus 3, and the prediction value calculation process in the prediction value calculation apparatus 3 are the same as those in the first embodiment, the descriptions are omitted. However, difference from the first embodiment is in that the display screen generated by the display screen generation program stored in the storage 42 of the display apparatus 4 is the superimposed display screen.

Figure 24:
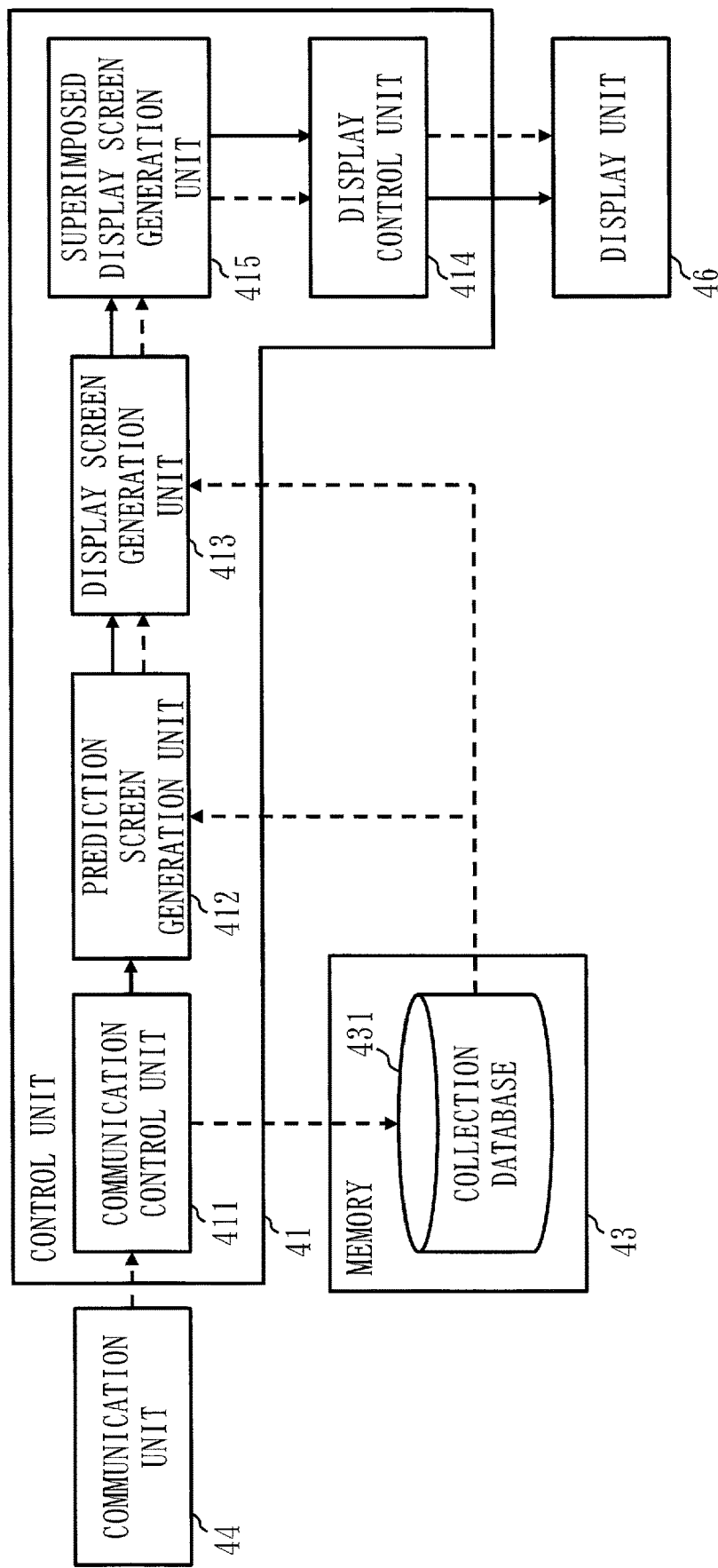
FIG. 24 is a configuration diagram illustrating an example of a functional configuration to execute a display screen generation process according to a fourth embodiment of the present invention.

FIG. 24 is a configuration diagram illustrating an example of a functional configuration for executing the display screen generation process according to the fourth embodiment of the present invention. In FIG. 24, each function of the display screen generation program 421 executed by the control unit 41 is illustrated as a functional block, the process flow of each functional block is illustrated by a solid line arrow, and a data flow is illustrated as a dash line arrow.

As illustrated in FIG. 24, the control unit 41 includes the communication control unit 411, the prediction screen generation unit 412, the display screen generation unit 413, the display control unit 414, and a superimposed display screen generation unit 415. Further, FIG. 24 illustrates the memory 43, the communication unit 44, and the display unit 46 for explanations. Here, the superimposed display screen generation unit 415 is a difference from the first embodiment. Since the communication control unit 411, the prediction screen generation unit 412, and the display screen generation unit 413 are the same as those in FIG. 9 of the first embodiment, the descriptions are omitted. Further, a case where the display screen generation unit 413 generates the display screen illustrated in FIG. 13 will be described below.

The superimposed display screen generation unit 415 acquires the display screen from the display screen generation unit 413, generates the anomaly icon based on the acquired display screen, superimposes the generated anomaly icon on the display screen, and generates the superimposed display screen.

Figure 25:
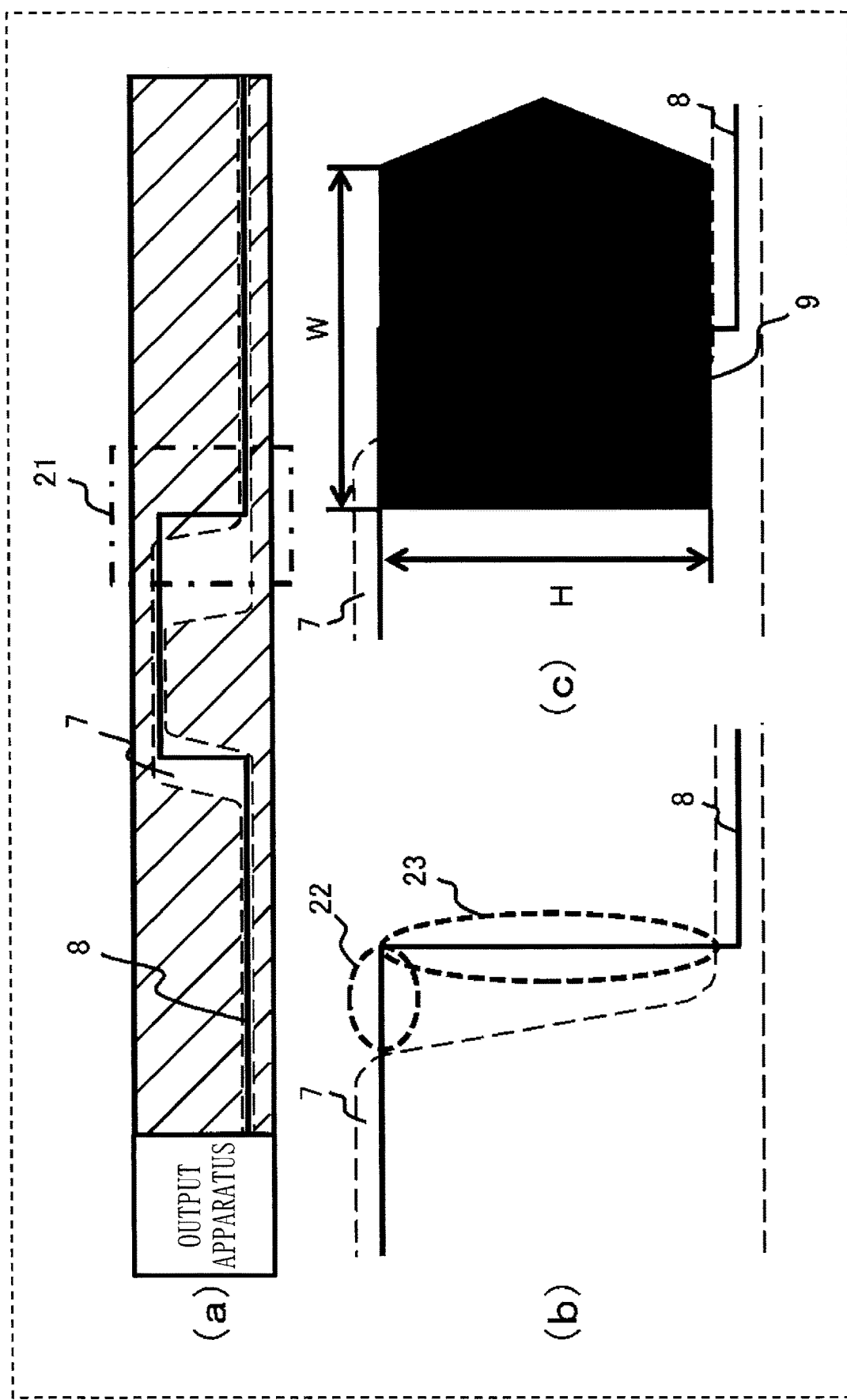
FIG. 25 is an explanatory diagram illustrating a generation process of an anomaly icon according to the fourth embodiment of the present invention.

FIG. 25 is an explanatory diagram illustrating a process of generating the anomaly icon according to the fourth embodiment of the present invention. (a) of FIG. 25 is a display screen on which the actual measurement value of the log data of the control apparatus 2 deviates from the prediction value area indicating the range of the normal state, (b) of FIG. 25 is an enlarged view of the display screen on which the actual measurement value of the log data of the control apparatus 2 deviates from the prediction value area indicating the range of the normal state, and (c) of FIG. 25 is an explanatory diagram of the superimposed display screen on which the anomaly icon is superposed.

(a) of FIG. 25 has the prediction value area 7 indicating the range of the log data of the control apparatus 2 in a normal state, and the actual measurement value signal 8 that is the signal wavelength of the actual measurement value of the log data of the control apparatus 2. As illustrated in (a) of FIG. 25, the actual measurement value signal 8 deviates from the prediction value area 7 in an area 21 (long dashed short dashed line).

(b) of FIG. 25 is an enlarged view of the area 21 of (a) of FIG. 25. As illustrated in (b) of FIG. 25, the actual measurement value signal 8 deviates by a horizontal deviation amount 22 (dash line) in the horizontal direction, and deviates by a deviation amount 23 (dash line) in the vertical direction, from the prediction value area 7 to the right, that is, to the later time side.

(c) of FIG. 25 is the superimposed display screen, which has the prediction value area 7, the actual measurement value signal 8, and an anomaly icon 9, on which the anomaly icon 9 is superimposed on the display screen composed of the prediction value area 7 and the actual measurement value signal 8. As illustrated in (c) of FIG. 25, the anomaly icon 9 has a width W and a height H, and the inside thereof is filled with opaque black, and the anomaly icon 9 has a shape pointing to the right direction, which is a direction in which the actual measurement value signal 8 deviates. Besides, although a case where the inside of the anomaly icon 9 is filled with opaque black has been described, it is not limited to the case where the inside of the anomaly icon 9 is filled with opaque black, and it may be a color other than black, or may be semi-transparent so that the superimposed actual measurement value signal 8 can be seen. Here, since the anomaly icon 9 is semi-transparent, even if the anomaly icon 9 is large and superimposed in such a way that the anomaly icon 9 covers the entire actual measurement value signal 8 of the change timing, the user can visually recognize the actual measurement value signal 8.

Figure 26:
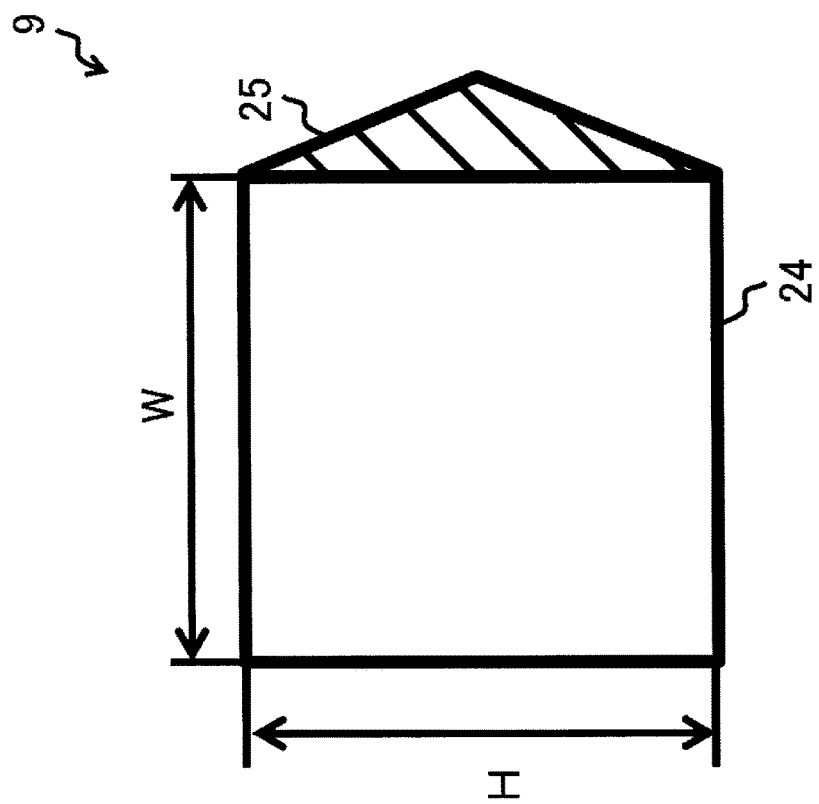
FIG. 26 is an explanatory diagram illustrating a shape of the anomaly icon according to the fourth embodiment of the present invention.

Next, details of a shape of the anomaly icon 9 will be described with reference to FIG. 26. FIG. 26 is an explanatory diagram illustrating the shape of the anomaly icon according to the fourth embodiment of the present invention.

Here, FIG. 26 is a diagram in which only the shape of the anomaly icon 9 is extracted for explanation, and the straight lines and diagonal lines inside the anomaly icon 9 are auxiliary lines for explanations. As illustrated in FIG. 26, the anomaly icon 9 includes a deviation degree area 24 indicating magnitude of the deviation degree at which the actual measurement value signal 8 deviates from the prediction value area 7, and also includes a deviation direction area 25 (diagonal line area) indicating a direction in which the actual measurement value signal 8 deviates from the prediction value area 7.

The deviation degree area 24 is a rectangle having a width W and a height H. The deviation degree area 24 is an area indicating the magnitude of the deviation degree at which the actual measurement value signal 8 deviates from the prediction value area 7, by means of an area formed by the width W and the height H. Here, the width W is a value acquired by multiplying the horizontal deviation amount 22 by a predetermined constant, and the height H is a value acquired by multiplying the vertical deviation amount 23 by a predetermined constant. Besides, the width W may be a value acquired by multiplying a square of the horizontal deviation amount 22 by a predetermined constant, or the same value as the height H.

Here, a reason why only the width W is a value acquired by multiplying the square of the horizontal deviation amount 22 by a predetermined constant is as follows. Since the vertical deviation amount 23 has a maximum value equal to the value of the signal value, it is easy to compare the magnitudes by comparing with the maximum value. However, since there is no maximum value for the horizontal deviation amount 22, there is no standard for comparing the magnitude, which makes it difficult to compare the magnitude. That is, the width based on the square of the horizontal deviation amount 22 is easier to use in comparing the magnitude than the width based on the horizontal deviation amount 22, the width based on the horizontal deviation amount 22 involving constant increase in value, the width based on the square of the horizontal deviation amount 22 involving exponential increase in value. Consequently, the user can visually recognize the difference in magnitude.

Also, a reason why the width W is the same size as the height H is as follows. Even when the width W tends to be smaller compared to the height H such as a case where the accuracy degree of the prediction value of the log data of the control apparatus 2 is high and the angle θ of the prediction value area 7 is small, a size of the deviation degree area 24 of the anomaly icon 9 can be larger. Consequently, an effect can be acquired that the user can easily visually recognize an existence of the anomaly icon 9.

Returning to FIG. 26, the deviation direction area 25 is in a shape of a triangle having a vertex pointing to a right side direction. Here, the vertex pointing to the right side direction indicates a direction in which the actual measurement value signal 8 deviates from the prediction value area 7. If the actual measurement value signal 8 deviates from the prediction value area 7 in a direction toward later time, the vertex points to the right side direction. If the actual measurement value signal 8 deviates from the prediction value area 7 in a direction toward early time, the vertex points to the left side direction. Besides, although a case has been described where the deviation direction area 25 has the triangular shape, it is not limited to a triangular shape, and it may be any shape as long as it is a shape that has a part that can indicate a direction, such as a polygon other than a triangle.

Figure 27:
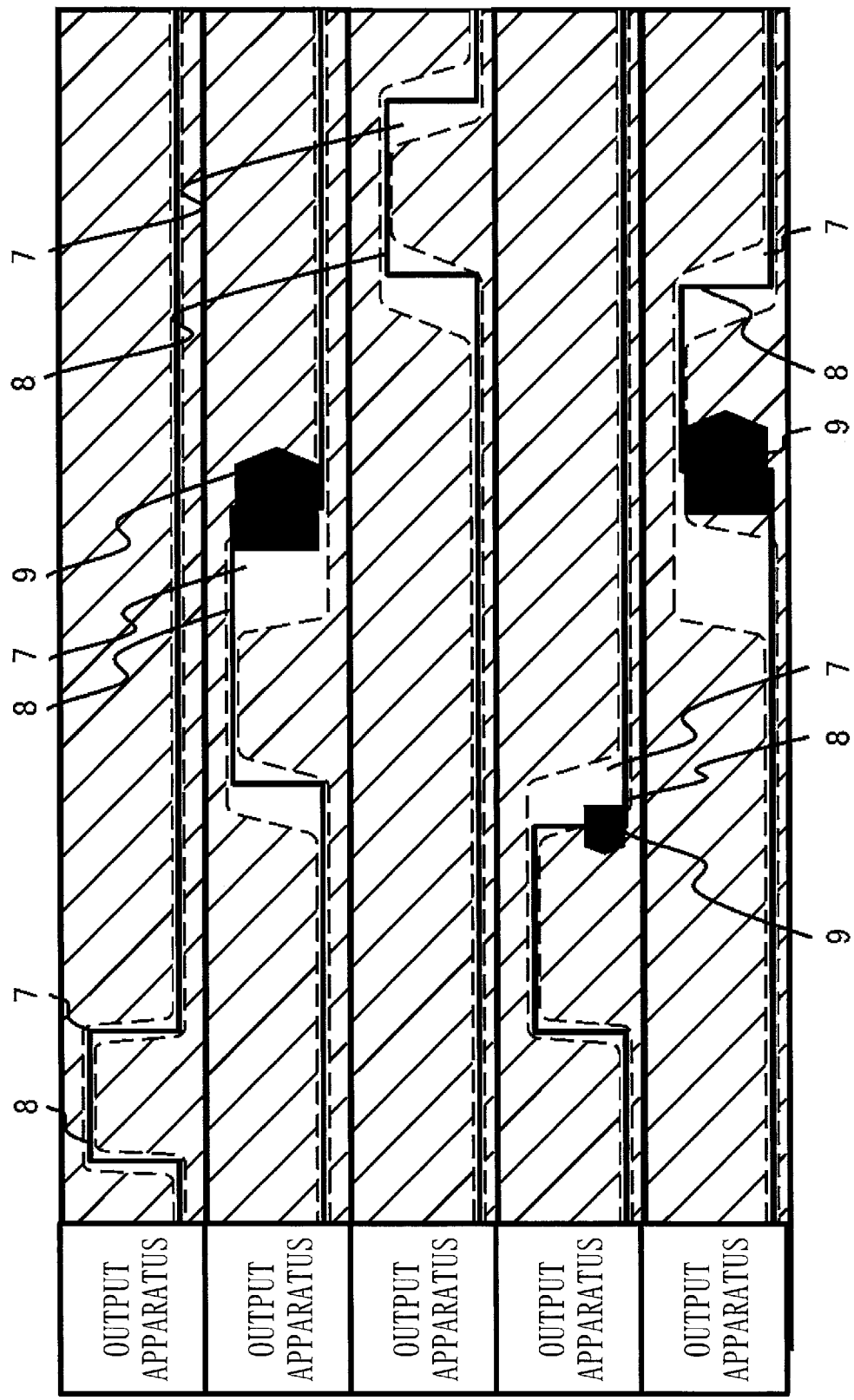
FIG. 27 is an explanatory diagram illustrating an example of a superimposed display screen according to the fourth embodiment of the present invention.

Next, the superimposed display screen generated by the superimposed display screen generation unit 415 will be described with reference to FIG. 27. FIG. 27 is an explanatory diagram illustrating an example of the superimposed display screen according to the fourth embodiment of the present invention. Here, since the display system 100 includes five devices 1, the superimposed display screen illustrated in FIG. 27 is a superimposed display screen on which the superimposed display screens of the five devices 1 are integrated into one screen. The superimposed display screen illustrated in FIG. 27 is a superimposed display screen on which the anomaly icon 9 is superposed on the display screen illustrated in FIG. 13.

As illustrated in FIG. 27, the superimposed display screen has the prediction value area 7, the actual measurement value signal 8, and an anomaly icon 9, and the anomaly icon 9 is superimposed only on a place where the actual measurement value signal 8 deviates from the prediction value area 7. Here, since the anomaly icon 9 indicates the deviation degree at which the actual measurement value signal 8 deviates from the prediction value area 7 and the direction in which the actual measurement value signal 8 deviates from the prediction value area 7, the anomaly icon 9 enables the user to visually recognize the deviation degree at which the actual measurement value signal 8 deviates from the prediction value area 7 and the direction in which the actual measurement value signal 8 deviates from the prediction value area 7.

As described above, the superimposed display screen illustrated in FIG. 27 generated by the superimposed display screen generation unit 415 enables the user to visually recognize on the display screen whether or not the log data of the control apparatus 2 deviates from the normal state, and if deviating, the user can visually recognize the deviation degree.

Returning to FIG. 24, the display control unit 414 acquires the superimposed display screen from the superimposed display screen generation unit 415 and displays the acquired superimposed display screen on the display unit 46.

Figure 28:
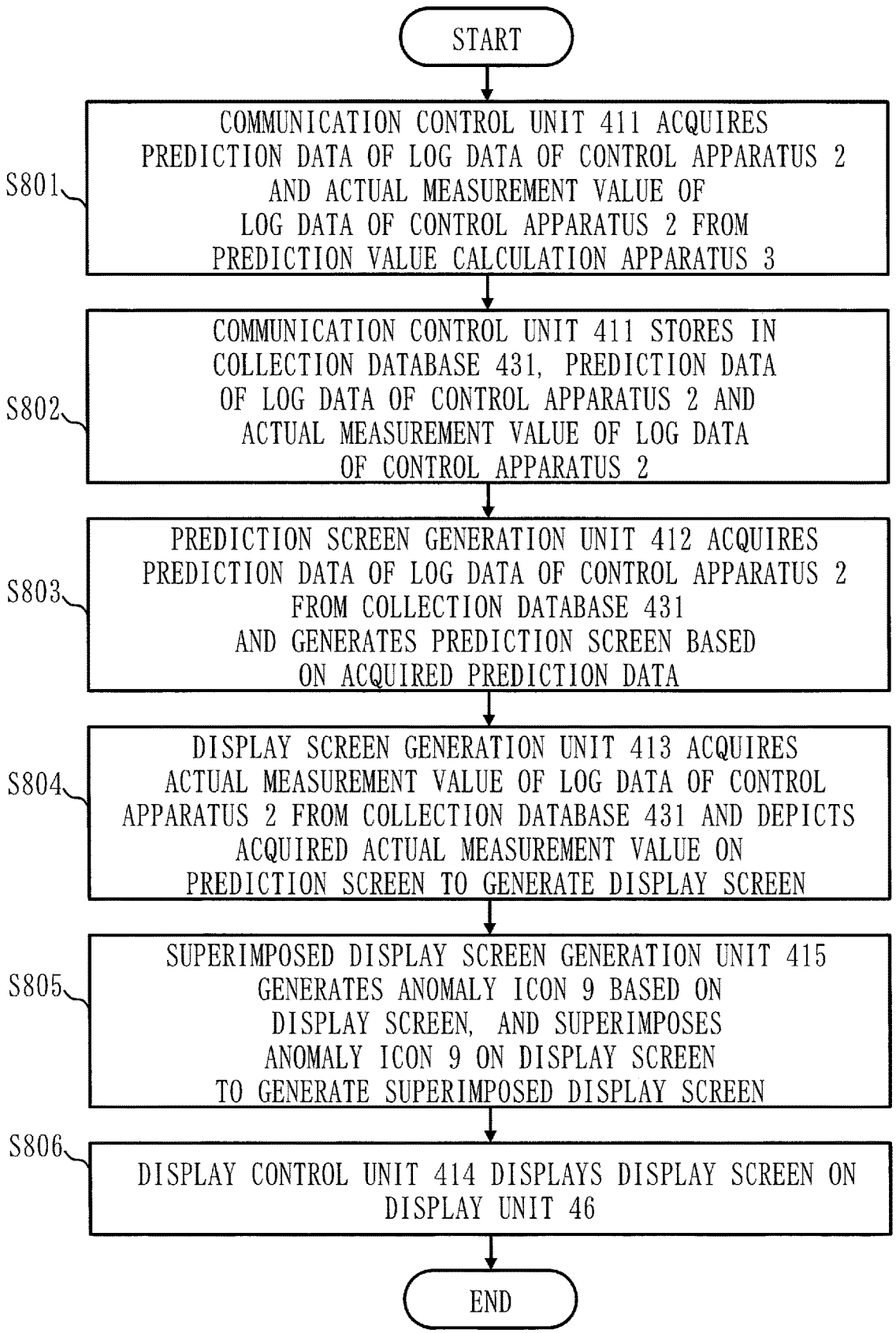
FIG. 28 is a flowchart illustrating an example of a flow of a display screen generation process according to the fourth embodiment of the present invention.

Next, a flow of a display screen generation process by the control unit 41 will be described. FIG. 28 is a flowchart illustrating an example of the flow of the display screen generation process according to the fourth embodiment of the present invention.

First, the control unit 41 receives a request for a start of the display screen generation process from the user, or automatically starts the display screen generation process. A method for the user to request the start of the display screen generation process may be any method such as, a method in which the display apparatus 4 includes a start button for the display screen generation process as the input unit 45 and the user presses the button. A method for the control unit 41 to automatically start the display screen generation process may be any method such as a method in which the control unit 41 acquires the prediction data of the log data of the control apparatus 2 and the actual measurement value of the log data of the control apparatus 2 from the prediction value calculation apparatus 3 via the communication unit 44, detects that an amount of the acquired data exceeds a certain amount, and automatically starts the process.

In step S801, the communication control unit 411 acquires the prediction data of the log data of the control apparatus 2 and the actual measurement value of the log data of the control apparatus 2 from the prediction value calculation apparatus 3 via the communication unit 44. Here, the prediction data is data including the signal value of the prediction value of the log data of the control apparatus 2 and the accuracy degree of the prediction value.

Next, in step S802, the communication control unit 411 stores in the collection database 431 of the memory 43, the prediction data of the log data of the control apparatus 2 and the actual measurement value of the log data of the control apparatus 2 acquired in step S801. Through steps S801 and S802, the communication control unit 411 copies to the collection database 431, the prediction data of the log data of the control apparatus 2 and the actual measurement value of the log data of the control apparatus 2.

Next, in step S803, the prediction screen generation unit 412 acquires the prediction data of the log data of the control apparatus 2 from the collection database 431, and generates the prediction screen based on the acquired prediction data. Since this process corresponds to step S303 in FIG. 15, detailed description is omitted.

In step S804, the display screen generation unit 413 acquires the actual measurement value of the log data of the control apparatus 2 from the collection database 431, and the display screen generation unit 413 depicts the acquired actual measurement value of the log data of the control apparatus 2 on the prediction screen generated by the prediction screen generation unit 412 in step S803 to generate the display screen.

In step S805, the superimposed display screen generation unit 415 generates the anomaly icon 9 based on the display screen generated by the display screen generation unit 413 in step S804 and superimposes the anomaly icon 9 on the display screen to generate the superimposed display screen.

In step S806, the display control unit 414 displays on the display unit 46, the superimposed display screen generated by the superimposed display screen generation unit 415 in step S805, and then ends the process.

As described above, according to the display apparatus 4 of the fourth embodiment, the display apparatus that displays the superimposed display screen for the log data that is a binary digital signal, can indicate that the log data deviates from the normal state, and can also indicate the magnitude of the deviation degree at which the log data deviates from the normal state and the direction in which the log data deviates from the normal state, when the log data is in an anomalous state.

A case has been described where the anomaly icon 9 generated by the superimposed display screen generation unit 415 has a shape in which the deviation degree area 24 in a rectangular shape and the deviation direction area 25 in a triangular shape are integrated. But it is not limited to a shape in which the deviation degree area 24 in the rectangular shape and the deviation direction area 25 in the triangular shape are integrated. The shape may be other than the shape in which the deviation degree area 24 in the rectangular shape and the deviation direction area 25 in the triangular shape are integrated, as long as it is a shape that can indicate the magnitude of the deviation degree at which the actual measurement value signal 8 deviates from the prediction value area 7 and the deviation direction in which the actual measurement value signal 8 deviates from the prediction value area 7.

Figure 29:
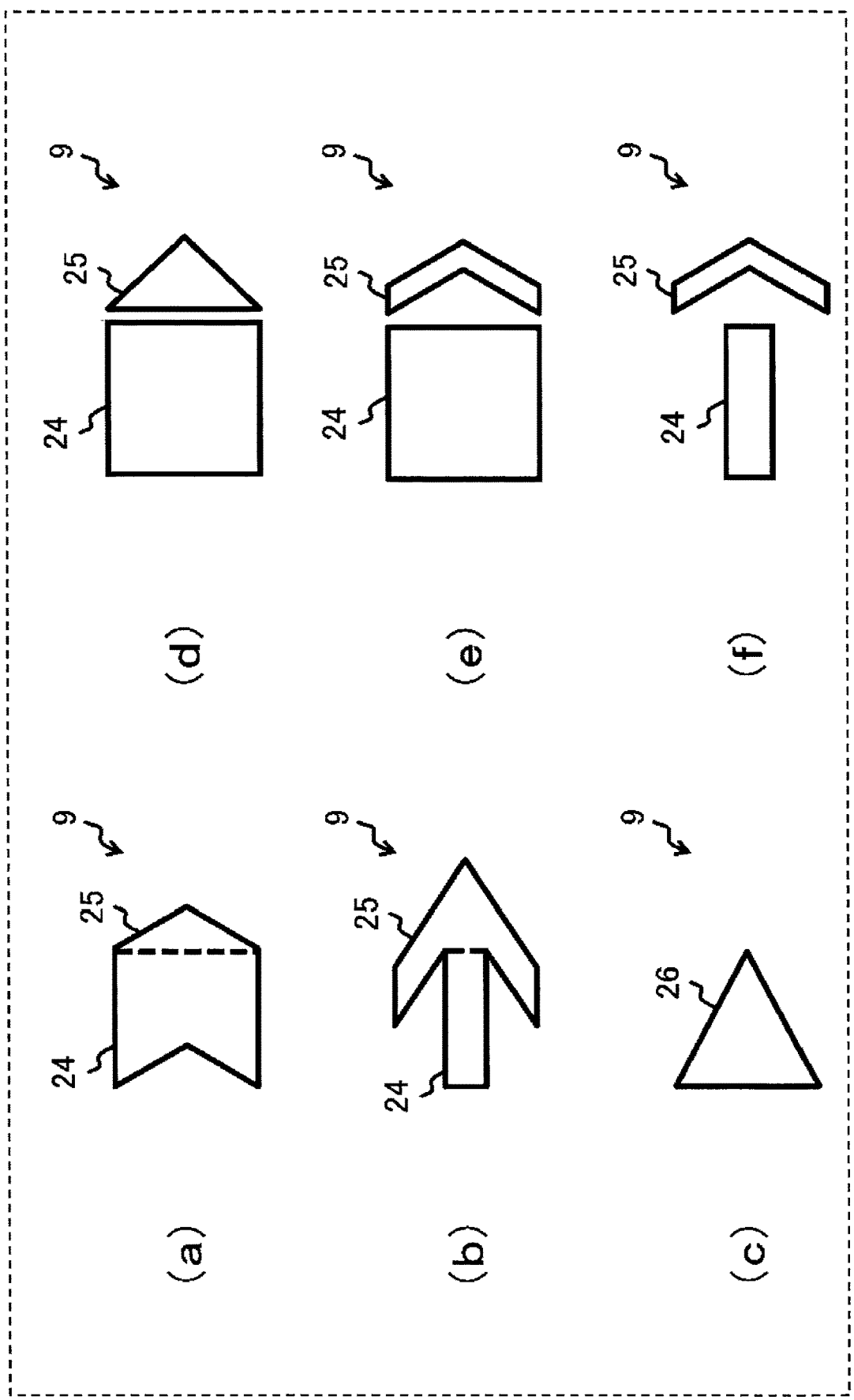
FIG. 29 is an explanatory diagram illustrating an example of the anomaly icon according to the fourth embodiment of the present invention.

FIG. 29 is an explanatory diagram illustrating examples of the anomaly icon according to the fourth embodiment of the present invention. (a), (b), and (c) of FIG. 29 are anomaly icons in each of which the deviation degree area 24 and the deviation direction area 25 are integrated, and (d), (e), and (0 of FIG. 29 are anomaly icons in each of which the deviation degree area 24 and the deviation direction area 25 are separate entities. Here, FIG. 29 is a diagram in which only the shapes of the anomaly icons 9 are extracted for explanations, and the inside of each of the anomaly icons 9 may be filled with opaque or semi-transparent black or the like. The dash lines inside the anomaly icons 9 are auxiliary lines for explanations.

As illustrated in (a) of FIG. 29, the deviation degree area 24 of the anomaly icon 9 may include a part indicating a direction in which the actual measurement value signal 8 deviates from the prediction value area 7. With such an anomaly icon 9, the user can further easily recognize the direction in which the actual measurement value signal 8 deviates from the prediction value area 7.

As illustrated in (b) of FIG. 29, it is acceptable to have an arrow shape in which a size of the deviation degree area 24 of the anomaly icon 9 in a horizontal direction indicates the horizontal deviation amount 22 and a size of the deviation direction area 25 of the anomaly icon 9 in a vertical direction indicates the vertical deviation amount 23. With such an anomaly icon 9, the user can recognize the deviation degree by the size of the arrow and the deviation direction by the direction of the arrow.

As illustrated in (c) of FIG. 29, the anomaly icon 9 may be composed of a triangular anomalous area 26 having functions of both the deviation degree area 24 and the deviation direction area 25. Here, a size of the anomalous area 26 in the horizontal direction indicates the horizontal deviation amount 22, and a size of the anomalous area 26 in the vertical direction indicates the vertical deviation amount 23, a direction of a vertex of the triangle of the anomalous area 26 indicates the deviation direction. With such an anomaly icon 9, the user can recognize both the deviation degree and the deviation direction simultaneously by glancing at the entire anomaly icon 9.

As illustrated in (d) of FIG. 29, the anomaly icon 9 may have the deviation degree area 24 in a rectangular shape and the deviation direction area 25 in a triangular shape, and the deviation degree area 24 and the deviation direction area 25 are separate entities. With such an anomaly icon 9, the user can recognize the deviation degree and the deviation direction.

As illustrated in (e) of FIG. 29, the anomaly icon 9 may have the deviation degree area 24 in a rectangular shape and the deviation direction area 25 in a shape of an arrow head, and the deviation degree area 24 and the deviation direction area 25 may be separate entities. With such an anomaly icon 9, the user can recognize the deviation degree and the deviation direction. Besides, the anomaly icon 9 may have a plurality of deviation direction areas 25 in the shape of the arrow head, and it is acceptable to indicate the horizontal deviation amount 22 by the number of the deviation direction areas 25 each having the shape of the arrow head.

As illustrated in (0 of FIG. 29, the anomaly icon 9 may have an arrow shape in which an arrow support part and an arrow head are separated from each other. Here, a size of the deviation degree area 24 of the anomaly icon 9 in the horizontal direction indicates the horizontal deviation amount 22, and a size of the deviation direction area 25 of the anomaly icon 9 in the vertical direction indicates the vertical deviation amount 23. With such an anomaly icon 9, the user can recognize the deviation degree by the size of the arrow and the deviation direction by the direction of the arrow. The anomaly icon 9 may have a plurality of the deviation direction areas 25 in the shape of the arrow head, and it is acceptable to indicate the horizontal deviation amount 22 by the number of the deviation direction areas 25 each having the shape of an arrow head.

Fifth Embodiment

In the fourth embodiment, an embodiment has been described in which the anomaly icon 9 superimposed on the display screen is the anomaly icon 9 that covers the actual measurement value signal 8 that is superimposed. In the fifth embodiment, an embodiment will be described in which the anomaly icon 9 superimposed on the display screen is an anomaly icon 9 having a transmission part which can prevent the superimposed actual measurement value signal 8 from being covered. Since the configuration of the display system 100, the configuration of the prediction value calculation apparatus 3, the configuration of the display apparatus 4, the normal model generation process in the prediction value calculation apparatus 3, the prediction value calculation process in the prediction value calculation apparatus 3, and the display screen generation process in the display apparatus 4, are the same as those in the first embodiment, the descriptions are omitted.

Examples of the anomaly icon 9 will be described with reference to FIG. 30. FIG. 30 is an explanatory diagram illustrating the examples of the anomaly icon according to the fifth embodiment of the present invention. (a) and (b) of FIG. 30 are examples in each of which an outer shape indicates the deviation degree and the deviation direction, and (c) and (d) of FIG. 30 are examples in each of which an internal transmission part indicates the deviation degree and the deviation direction. Here, FIG. 30 is a diagram in which only shapes of the anomaly icons 9 are extracted for explanations, and the dash lines inside the anomaly icons 9 are auxiliary lines for explanations.

As illustrated in (a) of FIG. 30, the anomaly icon 9 has the deviation degree area 24 in a rectangular shape, the deviation direction area 25 in a triangular shape, and a transmission part 27 in a rectangular shape. Here, the transmission part 27 is transparent, and a depiction below is visually recognizable even when the transmission part 27 is superimposed. With such an anomaly icon 9, because of the transmission unit 27, the user can visually recognize the actual measurement value signal 8 on which the anomaly icon 9 is superimposed even in the superimposed display screen on which the anomaly icon 9 is superimposed, and the user can recognize the change timing in the signal value of the actual measurement value of the log data of the control apparatus 2. Besides, although a case has been described where the anomaly icon 9 has a shape in which the deviation degree area 24 in a rectangular shape and the deviation direction area 25 in a triangular shape are integrated, it is not limited to the shape in which the deviation degree area 24 in the rectangular shape and the deviation direction area 25 in the triangular shape are integrated, and the deviation degree area 24 and the deviation direction area 25 may be the same as those in the anomaly icon 9 illustrated in FIG. 29. Further, the deviation degree area 24 and the deviation direction area 25 may be filled with black or the like in order to emphasize the anomaly icon 9.

As illustrated in (b) of FIG. 30, the anomaly icon 9 has the deviation degree area 24 in a rectangular shape, the deviation direction area 25 in a triangular shape, and the transmission part 27 in an arrow shape indicating the same direction as the direction indicated by the deviation direction area 25. Here, the transmission part 27 is transparent, and the depiction below is visually recognizable even when the transmission part 27 is superimposed. With such an anomaly icon 9, because of the transmission unit 27, the user can visually recognize the actual measurement value signal 8 on which the anomaly icon 9 is superimposed even in the superimposed display screen on which the anomaly icon 9 is superimposed, and the user can recognize the change timing in the signal value of the actual measurement value of the log data of the control apparatus 2. Also, the user can visually recognize the deviation direction by two of the deviation direction area 25 and the transmission part 27, thus can more reliably recognize the deviation direction. Besides, although a case has been described where the anomaly icon 9 has a shape in which the deviation degree area 24 in the rectangular shape and the deviation direction area 25 in the triangular shape are integrated, it is not limited to the shape in which the deviation degree area 24 in the rectangular shape and the deviation direction area 25 in the triangular shape are integrated, and the deviation degree area 24 and the deviation direction area 25 may be the same as those in the anomaly icon 9 illustrated in FIG. 29. Further, although a case has been described where the transmission part 27 has the arrow shape, the shape is not limited to the arrow shape and may be any shape such as a triangle as long as it indicates a direction. Further, the deviation degree area 24 and the deviation direction area 25 may be filled with black or the like in order to emphasize the anomaly icon 9.

As illustrated in (c) of FIG. 30, the anomaly icon 9 has the deviation degree area 24, the deviation direction area 25, and a peripheral part 28 in a rectangular shape. Here, the deviation degree area 24 and the deviation direction area 25 form the transmission part 27 in an arrow shape. Further, the transmission part 27 is transparent, and a depiction below is visually recognizable even when the transmission part 27 is superimposed. With such an anomaly icon 9, because of the transmission part 27, the user can visually recognize the actual measurement value signal 8 on which the anomaly icon 9 is superimposed even in the superimposed display screen on which the anomaly icon 9 is superimposed, and the user can recognize the change timing in the signal value of the actual measurement value of the log data of the control apparatus 2. Further, with such an anomaly icon 9, the user can recognize the deviation degree by the size of the arrow and the deviation direction by the direction of the arrow. Besides, although a case has been described where the anomaly icon 9 has the transmission part 27 in the arrow shape formed by the deviation degree area 24 and the deviation direction area 25, it is not limited to the transmission part 27 in the arrow shape formed by the deviation degree area 24 and the deviation direction area 25. The transmission part 27 may be formed by the deviation degree area 24 and the deviation direction area 25 similar to those in the anomaly icon 9 illustrated in FIG. 29. Further, the peripheral part 28 may be filled with black or the like in order to emphasize the anomaly icon 9.

As illustrated in (d) of FIG. 30, the anomaly icon 9 has the deviation degree area 24, the deviation direction area 25, and a peripheral part 28 in a circular shape. Here, the deviation degree area 24 and the deviation direction area 25 form the transmission part 27 in an arrow shape. Further, the transmission part 27 is transparent, and a depiction below is visually recognizable even when the transmission part 27 is superimposed. With such an anomaly icon 9, because of the transmission part 27, the user can visually recognize the actual measurement value signal 8 on which the anomaly icon 9 is superimposed even in the superimposed display screen on which the anomaly icon 9 is superimposed, and the user can recognize the change timing in the signal value of the actual measurement value of the log data of the control apparatus 2. Also, with such an anomaly icon 9, the user can recognize the deviation degree by the size of the arrow and the deviation direction by the direction of the arrow. Also, with such an anomaly icon 9, the user can more reliably recognize a presence of the anomaly icon 9 because the peripheral part 28 being in the circular shape can emphasize a difference in shape from the prediction value area 7 and the actual measurement value signal 8 that tend to be a straight line shape. Besides, although a case has been described where the anomaly icon 9 has the transmission part 27 in the arrow shape formed by the deviation degree area 24 and the deviation direction area 25, it is not limited to the transmission part 27 in the arrow shape formed by the deviation degree area 24 and the deviation direction area 25. The transmission part 27 may be formed by the deviation degree area 24 and the deviation direction area 25 similar to those in the anomaly icon 9 illustrated in FIG. 21. Further, the peripheral part 28 may be filled with black or the like in order to emphasize the anomaly icon 9.

As described above, according to the display apparatus 4 of the fifth embodiment, the display apparatus which displays the superimposed display screen for the log data that is a binary digital signal, can indicate that the log data deviates from the normal state, a magnitude of the deviation, a direction in which the log data deviates from the normal state, and the change timing in the actual measurement value of the log data, when the log data is in the anomalous state.

REFERENCE SIGNS LIST

1: device, 2: control apparatus, 3: prediction value calculation apparatus, 4: display apparatus, 5: network, 31, 41: control unit, 32, 42: storage, 33, 43: memory, 34,44: communication unit, 35, 45: input unit, 46: display unit, 100: display system

The invention claimed is:

1. A display apparatus displaying log data having at least one of input data to a device or output data from the device, the log data being a binary digital signal, the display apparatus comprising:
 a memory to store prediction data including a signal value of a prediction value of the log data and accuracy degree of the prediction value both calculated based on machine learning, and a signal value of an actual measurement value of the log data; and
 processing circuitry
  to generate a prediction screen on which a prediction value area indicating an area having a predefined width centered on a prediction value signal of the log data in a normal state is depicted based on the stored prediction data;
  to correct the predetermined width of the prediction value area corresponding to a change timing at which the signal value of the prediction value signal changes based on an accuracy degree of the predicted value stored in memory;
  to generate a display screen on which a signal wavelength of the signal value of the actual measurement value is depicted on the corrected prediction screen; and
  to display the generated display screen.

2. The display apparatus according to claim 1, wherein the processing circuitry generates, when the signal value of the actual measurement value deviates from the prediction value area, a superimposed display screen on which an anomaly icon is superimposed on the display screen, the anomaly icon indicating anomalous degree at which the signal value of the actual measurement value deviates from the prediction value area and a deviation direction in which the signal value of the actual measurement value deviates from the prediction value area.

3. The display apparatus according to claim 2, wherein the anomaly icon has a transmission part which is transparent.

4. A display system comprising:
 the display apparatus according to claim 1;
 a plurality of output apparatuses; and
 a control apparatus to control the output apparatuses.

5. The display system according to claim 4, comprising
 a prediction value calculation apparatus to generate the prediction data,
 wherein the display apparatus acquires the prediction data from the prediction value calculation apparatus.

6. A display apparatus displaying log data having at least one of input data to a device or output data from the device, the log data being a binary digital signal, the display apparatus comprising:
 a memory to store prediction data including a signal value of a prediction value of the log data and accuracy degree of the prediction value both calculated based on statistical processing, and a signal value of an actual measurement value of the log data; and
 processing circuitry
  to generate a prediction screen on which a prediction value area indicating an area having a predefined shape and width centered on a prediction value signal of the log data in a normal state is depicted based on the stored prediction data;
  to correct the predetermined shape and width of the prediction value area corresponding to a change timing at which the signal value of the prediction value signal changes based on an accuracy degree of the predicted value stored in memory;
  to generate a display screen on which a signal wavelength of the signal value of the actual measurement value is depicted on the corrected prediction screen; and
  to display the generated display screen,
  wherein the predefined shape of the prediction value area is corrected based on a normal distribution calculated based on the accuracy degree of the prediction value included in the prediction data, and the predetermined size of the prediction value area is corrected based on the accuracy degree of the prediction value.

7. The display apparatus according to claim 6, wherein the processing circuitry generates, when the signal value of the actual measurement value deviates from the prediction value area, a superimposed display screen on which an anomaly icon is superimposed on the display screen, the anomaly icon indicating anomalous degree at which the signal value of the actual measurement value deviates from the prediction value area and a deviation direction in which the signal value of the actual measurement value deviates from the prediction value area.

8. The display apparatus according to claim 7, wherein the anomaly icon has a transmission part which is transparent.

9. A display system comprising:
 the display apparatus according to claim 6;
 a plurality of output apparatuses; and
 a control apparatus to control the output apparatuses.

10. The display system according to claim 9, comprising
 a prediction value calculation apparatus to generate the prediction data,
 wherein the display apparatus acquires the prediction data from the prediction value calculation apparatus.

11. A display screen generation method for generating a display screen by a display apparatus which displays log data having at least one of input data to a device or output data from the device, the log data being a binary digital signal, the display screen generation method comprising:
 a prediction screen generation process of generating a prediction screen on which a prediction value area having a predefined width centered on a prediction value signal is depicted based on stored prediction data including a signal value of a prediction value of the log data and accuracy degree of the prediction value both calculated based on machine learning;

a prediction screen correction process of correcting the predefined width of the prediction value area corresponding to a change timing at which the signal value of the prediction value signal changes based on an accuracy degree of the predicted value stored in memory; and a display screen generation process of generating a display screen by depicting on the corrected prediction screen, a signal wavelength of a signal value of an actual measurement value of the log data, based on the signal value of the actual measurement value of the log data.

12. A display screen generation method for generating a display screen by a display apparatus which displays log data having at least one of input data to a device or output data from the device, the log data being a binary digital signal, the display screen generation method comprising:

a prediction screen generation process of generating a prediction screen on which a prediction value area having a predefined shape and width centered on a prediction value signal is depicted based on prediction data including a signal value of a prediction value of the log data and accuracy degree of the prediction value both calculated based on statistical processing;

a prediction screen correction process of correcting the predefined width of the prediction value area corresponding to a change timing at which the signal value of the prediction value signal changes based on an accuracy degree of the predicted value stored in memory; and a display screen generation process of generating a display screen depicting on the corrected prediction screen, a signal wavelength of a signal value of an actual measurement value of the log data, based on the signal value of the actual measurement value of the log data, wherein the predetermined shape of the prediction value area is corrected based on a normal distribution calculated based on the accuracy degree of the prediction value included in the prediction data, and the predetermined size of the prediction value area is corrected based on the accuracy degree of the prediction value.

* * * * *